US009438686B2

(12) United States Patent
Ogawa et al.

(10) Patent No.: US 9,438,686 B2
(45) Date of Patent: Sep. 6, 2016

(54) CONTENT CONTROL DEVICE, TERMINAL DEVICE, CONTENT CONTROL METHOD, AND COMPUTER-READABLE RECORDING MEDIUM

(71) Applicant: Panasonic Intellectual Property Corporation of America, Torrance, CA (US)

(72) Inventors: Kento Ogawa, Osaka (JP); Yasuhiro Yuki, Kanagawa (JP); Shunji Harada, Osaka (JP); Masaru Moriwaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 232 days.

(21) Appl. No.: 14/240,154

(22) PCT Filed: Jun. 24, 2013

(86) PCT No.: PCT/JP2013/003918
§ 371 (c)(1),
(2) Date: Feb. 21, 2014

(87) PCT Pub. No.: WO2014/002462
PCT Pub. Date: Jan. 3, 2014

(65) Prior Publication Data
US 2014/0222922 A1    Aug. 7, 2014

(30) Foreign Application Priority Data

Jun. 28, 2012    (JP) ................................. 2012-144957

(51) Int. Cl.
*G06F 15/16*    (2006.01)
*H04L 29/08*    (2006.01)
(Continued)

(52) U.S. Cl.
CPC ......... *H04L 67/22* (2013.01); *G06F 17/30029* (2013.01); *G06Q 50/01* (2013.01);
(Continued)

(58) Field of Classification Search
CPC . G06Q 10/10; H04L 29/06; H04L 29/08072; H04L 29/0809; H04L 29/06027; H04L 12/581
See application file for complete search history.

(56) References Cited

U.S. PATENT DOCUMENTS 7,248,832 B2 *  7/2007  Ikeda ..................... H04H 60/27
                                                                455/39
9,098,385 B2 *  8/2015  Inoue ..................... G06F 17/30
(Continued)

FOREIGN PATENT DOCUMENTS

JP    2004-62479     2/2004
JP    2007-41930     2/2007
(Continued)

OTHER PUBLICATIONS

International Search Report issued Sep. 17, 2013 in International (PCT) Application No. PCT/JP2013/003918.

*Primary Examiner* — Philip Chea
*Assistant Examiner* — Van Kim T Nguyen
(74) *Attorney, Agent, or Firm* — Wenderoth, Lind & Ponack, L.L.P.

(57) ABSTRACT

A content control device is provided with a receiving content accumulation unit which accumulates contents received from a terminal device connected via a network, an operation history information managing unit which manages operation history information indicative of a history on operations with respect to a first content accumulated in the receiving content accumulation unit, and a content control unit which generates control information for controlling a second content based on the operation history information, the second content corresponding to the first content and accumulated in the terminal device.

14 Claims, 48 Drawing Sheets

(51) Int. Cl.
*G06Q 50/00* (2012.01)
*G11B 27/10* (2006.01)
*G11B 27/34* (2006.01)
*G06F 17/30* (2006.01)
*G11B 27/11* (2006.01)
*G11B 27/32* (2006.01)
*H04N 21/4335* (2011.01)
*H04N 21/442* (2011.01)
*H04N 21/475* (2011.01)
*H04N 21/4788* (2011.01)
*H04N 21/658* (2011.01)

(52) U.S. Cl.
CPC ............ *G11B 27/105* (2013.01); *G11B 27/11* (2013.01); *G11B 27/322* (2013.01); *G11B 27/34* (2013.01); *H04N 21/4335* (2013.01); *H04N 21/44222* (2013.01); *H04N 21/4756* (2013.01); *H04N 21/4788* (2013.01); *H04N 21/6582* (2013.01)

(56) References Cited

U.S. PATENT DOCUMENTS

| | | | |
|---|---|---|---|
| 2003/0097423 A1* | 5/2003 | Ozawa | H04N 7/163 709/219 |
| 2004/0019499 A1 | 1/2004 | Murashita | |
| 2007/0031109 A1 | 2/2007 | Tsuboi et al. | |
| 2008/0065659 A1* | 3/2008 | Watanabe | G06F 17/30997 |
| 2009/0234876 A1* | 9/2009 | Schigel | G06F 17/30873 |
| 2010/0262658 A1* | 10/2010 | Mesnage | G06Q 10/06 709/204 |
| 2010/0293157 A1 | 11/2010 | Ito | |
| 2011/0231431 A1* | 9/2011 | Kamiwada | G06F 17/30699 707/769 |
| 2012/0023204 A1* | 1/2012 | Takemura | G06F 17/30038 709/219 |
| 2012/0259975 A1* | 10/2012 | Le | H04L 63/1408 709/224 |
| 2012/0296978 A1 | 11/2012 | Inoue et al. | |

FOREIGN PATENT DOCUMENTS

| | | |
|---|---|---|
| JP | 2009-245234 | 10/2009 |
| JP | 2009-251757 | 10/2009 |
| JP | 2010-267018 | 11/2010 |
| JP | 2011-70316 | 4/2011 |
| JP | 2012-38273 | 2/2012 |
| WO | 2012/073470 | 6/2012 |

* cited by examiner

FIG. 3

FIRST CONTENT INFORMATION TABLE

| CONTENT ID | STORAGE PATH IN TERMINAL DEVICE | SIZE | PHOTOGRAPHING DATE AND TIME | CONTENT TYPE |
|---|---|---|---|---|
| C-00001 | 132.124.123.1:80/data | 2.1MB | 2012/4/7 14:33 | image |
| C-00002 | 132.124.123.1:80/data | 2.5MB | 2012/4/14 19:12 | image |
| C-00003 | 132.124.123.1:80/data | 4.7MB | 2012/4/20 11:47 | image |
| C-00004 | 132.124.123.1:80/data | 1.8MB | 2012/4/21 13:08 | image |
| C-00005 | 132.124.123.1:80/data | 0.9MB | 2012/4/28 18:56 | image |

FIG. 4

FIRST SERVER INFORMATION TABLE

| SERVER ID | CONTENT RECEIVING URL OF SERVER DEVICE | RECEIVABLE CONTENT TYPE | CONTENT SIZE LIMIT | CAPACITY LIMIT | REMAINING CAPACITY |
|---|---|---|---|---|---|
| S-001 | http://api.s1.com/content | image/movie | 5MB | 5GB | 3.5GB |

FIG. 5

SECOND SERVER INFORMATION TABLE

| SERVER ID | LEVEL OF CONTENT DISCLOSURE RANGE | USER RELATIONSHIP INFORMATION ||
|---|---|---|---|
| | | NUMBER OF FRIENDS | FRIEND NAME |
| S-001 | ALL/FRIEND OF FRIEND/FRIEND /SPECIFIC FRIEND/NON-DISCLOSURE | 10 | B, C, D, E, F, G, H, I, J, K |

FIG. 6

FRIEND INTIMACY TABLE

| SERVER ID | OWNER USER \ FRIEND | A | B | C | D | E | F | G | H | I | J | K |
|---|---|---|---|---|---|---|---|---|---|---|---|---|
| S-001 | A | – | 2.2 | 0.5 | 0.9 | 1.5 | 0.3 | 2.7 | 0.7 | 0.8 | 1.1 | 0.1 |

FIG. 7

THIRD SERVER INFORMATION TABLE

| SERVER ID | CONTENT RECEIVING URL OF SERVER DEVICE | RECEIVABLE CONTENT TYPE | CONTENT SIZE LIMIT | CAPACITY LIMIT | REMAINING CAPACITY |
|---|---|---|---|---|---|
| S-001 | http://api.s1.com/content | image/movie | 5MB | 5GB | 3.5GB |
| S-002 | https://s2.graph.com/upload | image/movie | 10MB | UNLIMITED | UNLIMITED |
| S-003 | http://s3.api.com/contents | image | 3MB | 2GB | 1.3GB |

FIG. 8

FOURTH SERVER INFORMATION TABLE

| SERVER ID | LEVEL OF CONTENT DISCLOSURE RANGE | USER RELATIONSHIP INFORMATION | |
|---|---|---|---|
| | | NUMBER OF FRIENDS | FRIEND NAME |
| S-001 | ALL/FRIEND OF FRIEND/FRIEND /SPECIFIC FRIEND/NON-DISCLOSURE | 10 | B, C, D, E, F, G, H, I, J, K |
| S-002 | ALL/FRIEND OF FRIEND/FRIEND /SPECIFIC FRIEND/NON-DISCLOSURE | 7 | L, M, N, O, P, Q, R |
| S-003 | ALL/FRIEND OF FRIEND /FRIEND/NON-DISCLOSURE | 4 | S, T, U, V |

FIG. 9

FRIEND INTIMACY TABLE

| SERVER ID | OWNER USER \ FRIEND | A | B | C | D | E | F | G | H | I | J | K |
|---|---|---|---|---|---|---|---|---|---|---|---|---|
| S-001 | A | – | 2.2 | 0.5 | 0.9 | 1.5 | 0.3 | 2.7 | 0.7 | 0.8 | 1.1 | 0.1 |

| SERVER ID | OWNER USER \ FRIEND | A | L | M | N | O | P | Q | R |
|---|---|---|---|---|---|---|---|---|---|
| S-002 | A | – | 1.3 | 2.7 | 1.4 | 0.3 | 0.7 | 2.2 | 1.9 |

| SERVER ID | OWNER USER \ FRIEND | A | S | T | U | V |
|---|---|---|---|---|---|---|
| S-003 | A | – | 0.4 | 1.2 | 2.0 | 1.1 |

FIG. 10

TRANSMISSION TIME INFORMATION TABLE

| CONTENT ID | STORAGE PATH IN TERMINAL DEVICE | SIZE | PHOTOGRAPHING DATE AND TIME | CONTENT TYPE | RECIPIENT SERVER ID | CONTENT RECEIVING URL OF SERVER DEVICE | CONTENT DISCLOSURE RANGE | TRANSMISSION DATE AND TIME |
|---|---|---|---|---|---|---|---|---|
| C-00001 | 132.124.123.1:80/data | 2.1MB | 2012/4/7 14:33 | image | S-001 | http://api.s1.com/content | FRIEND | 2012/5/1 17:00 |
| C-00002 | 132.124.123.1:80/data | 2.5MB | 2012/4/14 19:12 | image | S-001 | http://api.s1.com/content | FRIEND | 2012/5/2 22:00 |
| C-00005 | 132.124.123.1:80/data | 0.9MB | 2012/4/28 18:56 | image | S-001 | http://api.s1.com/content | FRIEND | 2012/5/3 21:00 |

FIG. 11

CONTENT INFORMATION TABLE (「S-001」)

| SERVER ID | CONTENT ID | STORAGE PATH IN TERMINAL DEVICE | SIZE | PHOTOGRAPHING DATE AND TIME | CONTENT TYPE | CONTENT STORAGE PATH IN SERVER DEVICE | CONTENT DISCLOSURE RANGE | RECEIVING DATE AND TIME |
|---|---|---|---|---|---|---|---|---|
| S-001 | C-00001 | 132.124.123.1:80/data | 2.1MB | 2012/4/7 14:33 | image | http://s1/content/uploaded | FRIEND | 2012/5/1 17:00 |
| | C-00002 | 132.124.123.1:80/data | 2.5MB | 2012/4/14 19:12 | image | http://s1/content/uploaded | FRIEND | 2012/5/2 22:00 |
| | C-00005 | 132.124.123.1:80/data | 0.9MB | 2012/4/28 18:56 | image | http://s1/content/uploaded | FRIEND | 2012/5/3 21:00 |

FIG. 12

FIRST OPERATION HISTORY INFORMATION TABLE (LIKE)

| SERVER ID | CONTENT ID | "LIKE" ID | INPUT DATE AND TIME | INPUT USER NAME |
|---|---|---|---|---|
| S-001 | C-00001 | L-P10001 | 2012/5/1 17:10 | B |
| | | L-P10002 | 2012/5/2 13:45 | E |
| | | L-P10003 | 2012/5/4 19:56 | G |
| | | L-P10004 | 2012/5/6 22:09 | I |
| | | L-P10005 | 2012/5/8 14:12 | J |
| | | L-P10006 | 2012/5/10 12:30 | H |
| | | ... | ... | ... |

FIG. 13

FIRST OPERATION HISTORY INFORMATION TABLE (COMMENT)

| SERVER ID | CONTENT ID | COMMENT ID | INPUT DATE AND TIME | INPUT USER NAME | NUMBER OF AFFIRMATIVE EXPRESSIONS | NUMBER OF NEGATIVE EXPRESSIONS |
|---|---|---|---|---|---|---|
| S-001 | C-00001 | M-P10001 | 2012/5/1 19:15 | D | 1 | 0 |
| | | M-P10002 | 2012/5/1 21:31 | F | 1 | 0 |
| | | ... | ... | ... | ... | ... |

FIG. 14

FIRST OPERATION HISTORY INFORMATION TABLE (BROWSING)

| SERVER ID | CONTENT ID | BROWSING ID | BROWSING DATE AND TIME | BROWSING USER NAME | BROWSING TIME |
|---|---|---|---|---|---|
| S-001 | C-00001 | W-P10001 | 2012/5/1 17:10 | B | 43 SEC |
| | | W-P10002 | 2012/5/1 18:11 | K | 1 MIN & 29 SEC |
| | | ... | ... | ... | ... |

FIG. 15

FIRST OPERATION HISTORY INFORMATION TABLE (DOWNLOAD)

| SERVER ID | CONTENT ID | DOWNLOAD ID | DOWNLOAD DATE AND TIME | DOWNLOAD USER NAME |
|---|---|---|---|---|
| S-001 | C-00001 | D-P10001 | 2012/5/3 13:59 | C |
| | | D-P10002 | 2012/5/4 20:11 | G |
| | | ... | ... | ... |

FIG. 16

FIRST EVALUATION PERIOD INFORMATION TABLE

| SERVER ID | CONTENT ID | PERIOD | EVALUATION PERIOD ID |
|---|---|---|---|
| S-001 | C-00001 | 2012/5/1 17:00 ~ 2012/5/8 17:00 | V1 |
| | C-00002 | 2012/5/2 22:00 ~ 2012/5/9 22:00 | V2 |
| | C-00005 | 2012/5/3 21:00 ~ 2012/5/10 21:00 | V3 |

FIG. 17

SECOND OPERATION HISTORY INFORMATION TABLE

| SERVER ID | CONTENT ID | EVALUATION PERIOD ID | "LIKE" ID | INPUT USER NAME |
|---|---|---|---|---|
| S-001 | C-00001 | V1 | L-P10001 | B |
| | | | L-P10002 | E |
| | | | L-P10003 | G |
| | | | L-P10004 | I |
| | | | L-P10005 | J |
| | C-00002 | V2 | L-P20001 | F |
| | C-00005 | V3 | L-P30001 | C |
| | | | L-P30002 | D |
| | | | L-P30003 | E |
| | | | L-P30004 | F |
| | | | L-P30005 | I |

FIG. 18

ACCUMULATED OPERATION HISTORY INFORMATION TABLE

| SERVER ID | CONTENT ID | EVALUATION PERIOD ID | NUMBER OF "LIKES" | NUMBER OF COMMENTS | NUMBER OF AFFIRMATIVE EXPRESSIONS | NUMBER OF NEGATIVE EXPRESSIONS | NUMBER OF TIMES OF BROWSING OPERATIONS | BROWSING TIME | NUMBER OF TIMES OF DOWNLOAD OPERATIONS |
|---|---|---|---|---|---|---|---|---|---|
| S-001 | C-00001 | V1 | 5 | 12 | 6 | 0 | 24 | 28 MIN & 10 SEC | 4 |
| | C-00002 | V2 | 1 | 2 | 0 | 1 | 8 | 4 MIN & 41 SEC | 0 |
| | C-00005 | V3 | 5 | 7 | 3 | 1 | 16 | 15 MIN & 32 SEC | 1 |

FIG. 19

CONTROL INFORMATION TABLE

| SERVER ID | CONTROL INFORMATION ID | CONTENT ID | STORAGE PATH IN TERMINAL DEVICE | CONTROL CONTENTS |
|---|---|---|---|---|
| S-001 | O-00001 | C-00001 | 132.124.123.1:80/data | VALIDATE CONTENT PROTECTING FUNCTION |
| | O-00002 | C-00002 | 132.124.123.1:80/data | DELETE |
| | O-00003 | C-00005 | 132.124.123.1:80/data | DO NOTHING |

FIG. 20

SECOND EVALUATION PERIOD INFORMATION TABLE

| SERVER ID | CONTENT ID | PERIOD | EVALUATION PERIOD ID |
|---|---|---|---|
| S-001 | C-00001 | 2012/5/8 17:00 ~ 2012/5/15 17:00 | V1-1 |
| | C-00002 | 2012/5/9 22:00 ~ 2012/5/16 22:00 | V2-1 |
| | C-00005 | 2012/5/10 21:00 ~ 2012/5/17 21:00 | V3-1 |

FIG. 21

ACCUMULATED OPERATION HISTORY INFORMATION TABLE

| SERVER ID | CONTENT ID | EVALUATION PERIOD ID | NUMBER OF "LIKES" | NUMBER OF COMMENTS | NUMBER OF AFFIRMATIVE EXPRESSIONS | NUMBER OF NEGATIVE EXPRESSIONS | NUMBER OF TIMES OF BROWSING OPERATIONS | BROWSING TIME | NUMBER OF TIMES OF DOWNLOAD OPERATIONS |
|---|---|---|---|---|---|---|---|---|---|
| S-001 | C-00001 | V1-1 | 6 | 6 | 3 | 0 | 12 | 16 MIN & 06 SEC | 2 |
| | C-00002 | V2-1 | 12 | 9 | 5 | 1 | 20 | 20 MIN & 24 SEC | 4 |
| | C-00005 | V3-1 | 1 | 1 | 1 | 2 | 5 | 3 MIN & 53 SEC | 0 |

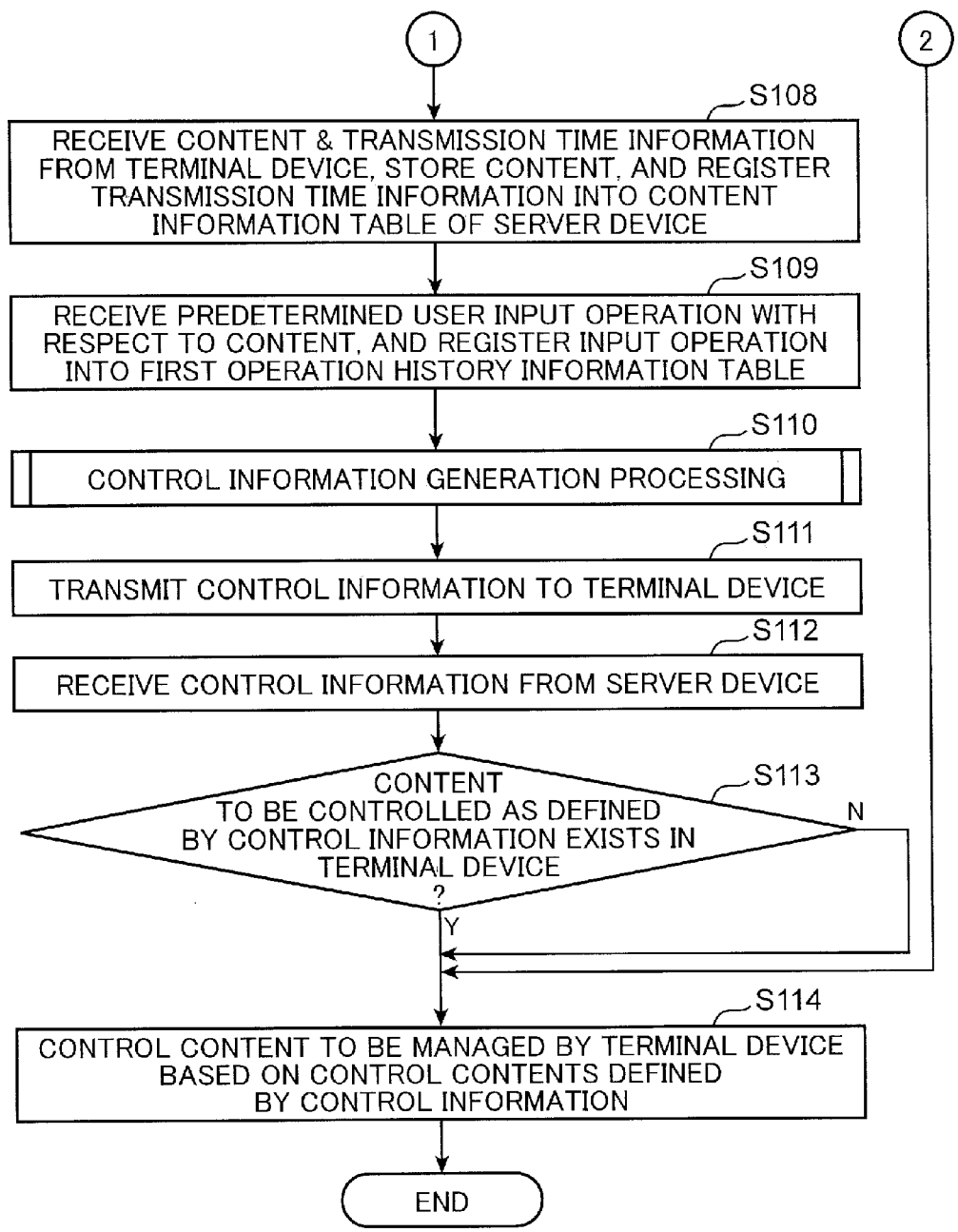

| | | COMMENT | | |
|---|---|---|---|---|
| | SUM | S1 | S2 | S3 |
| | 29 | 12 | 7 | 10 |
| | SUM | S1 | S2 | S3 |
| | 20 | 8 | 0 | 12 |
| | SUM | S1 | S2 | S3 |
| | 12 | 12 | 0 | 0 |
| | SUM | S1 | S2 | S3 |
| | 8 | 3 | 4 | 1 |
| LIKE | COMMENT | AFFIRMATIVE | NEGATIVE | NUMBER OF TIMES OF BROWSING | BROWSING TIME | NUMBER OF TIMES OF DOWNLOAD |

FIG. 32

| | | | | NUMBER OF TIMES OF BROWSING | BROWSING TIME | NUMBER OF TIMES OF DOWNLOAD |
|---|---|---|---|---|---|---|
| LIKE | COMMENT | AFFIRMATIVE | NEGATIVE | | | |

(COMMENT section with USER B and USER C checkboxes)

FIG. 35

SECOND CONTENT INFORMATION TABLE

| CONTENT ID | OPERATION HISTORY | | TRANSMISSION HISTORY | |
|---|---|---|---|---|
| | BROWSING TIME | NUMBER OF TIMES OF BROWSING OPERATIONS | RECIPIENT SERVER ID | TRANSMISSION DATE AND TIME |
| C-00001 | 7 MIN & 25 SEC | 25 | – | – |
| C-00002 | 50 SEC | 5 | – | – |
| C-00003 | 3 MIN & 08 SEC | 14 | S-002 | 2012/4/20 17:00 |
| C-00004 | 4 MIN & 12 SEC | 17 | S-002 | 2012/4/21 15:15 |
| C-00005 | 1 MIN & 01 SEC | 4 | – | – |

FIG. 36

FIRST TERMINAL DEVICE INFORMATION TABLE

| TERMINAL DEVICE ID | SCREEN RESOLUTION | CAPACITY LIMIT | REMAINING CAPACITY | PLACE INFORMATION |
|---|---|---|---|---|
| D-001 | 800 × 480 PIXELS | 16GB | 5.6GB | (35.358256, 138.677559) |

FIG. 37

SECOND TERMINAL DEVICE INFORMATION TABLE

| TERMINAL DEVICE ID | SCHEDULE ID | SCHEDULE DATE AND TIME |
|---|---|---|
| D-001 | P-00001 | 2012/5/26  13:00 |
| | P-00002 | 2012/6/2   17:00 |
| | P-00003 | 2012/6/16  14:30 |
| | P-00004 | 2012/7/7   15:00 |
| | P-00005 | 2012/7/21  19:30 |

FIG. 38

THIRD TERMINAL DEVICE INFORMATION TABLE

| SERVER ID | TERMINAL DEVICE ID | SCREEN RESOLUTION | CAPACITY LIMIT | REMAINING CAPACITY | PLACE INFORMATION |
|---|---|---|---|---|---|
| S-001 | D-001 | 800 × 480 PIXELS | 16GB | 5.6GB | (35.358256, 138.677559) |

FIG. 39

FOURTH TERMINAL DEVICE INFORMATION TABLE

| SERVER ID | TERMINAL DEVICE ID | SCHEDULE ID | SCHEDULE DATE AND TIME |
|---|---|---|---|
| S-001 | D-001 | P-00001 | 2012/5/26 13:00 |
| | | P-00002 | 2012/6/2 17:00 |
| | | P-00003 | 2012/6/16 14:30 |
| | | P-00004 | 2012/7/7 15:00 |
| | | P-00005 | 2012/7/21 19:30 |

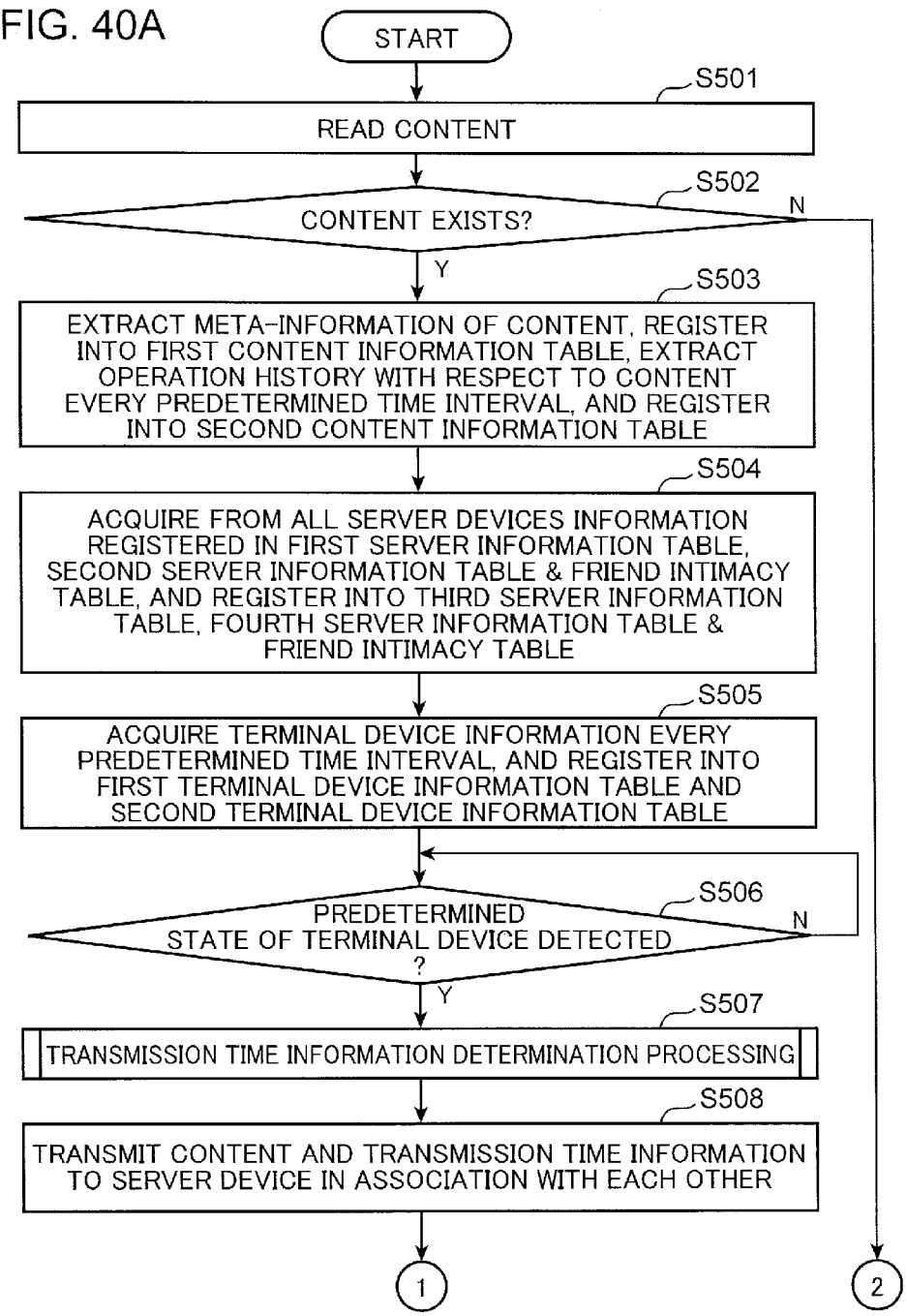

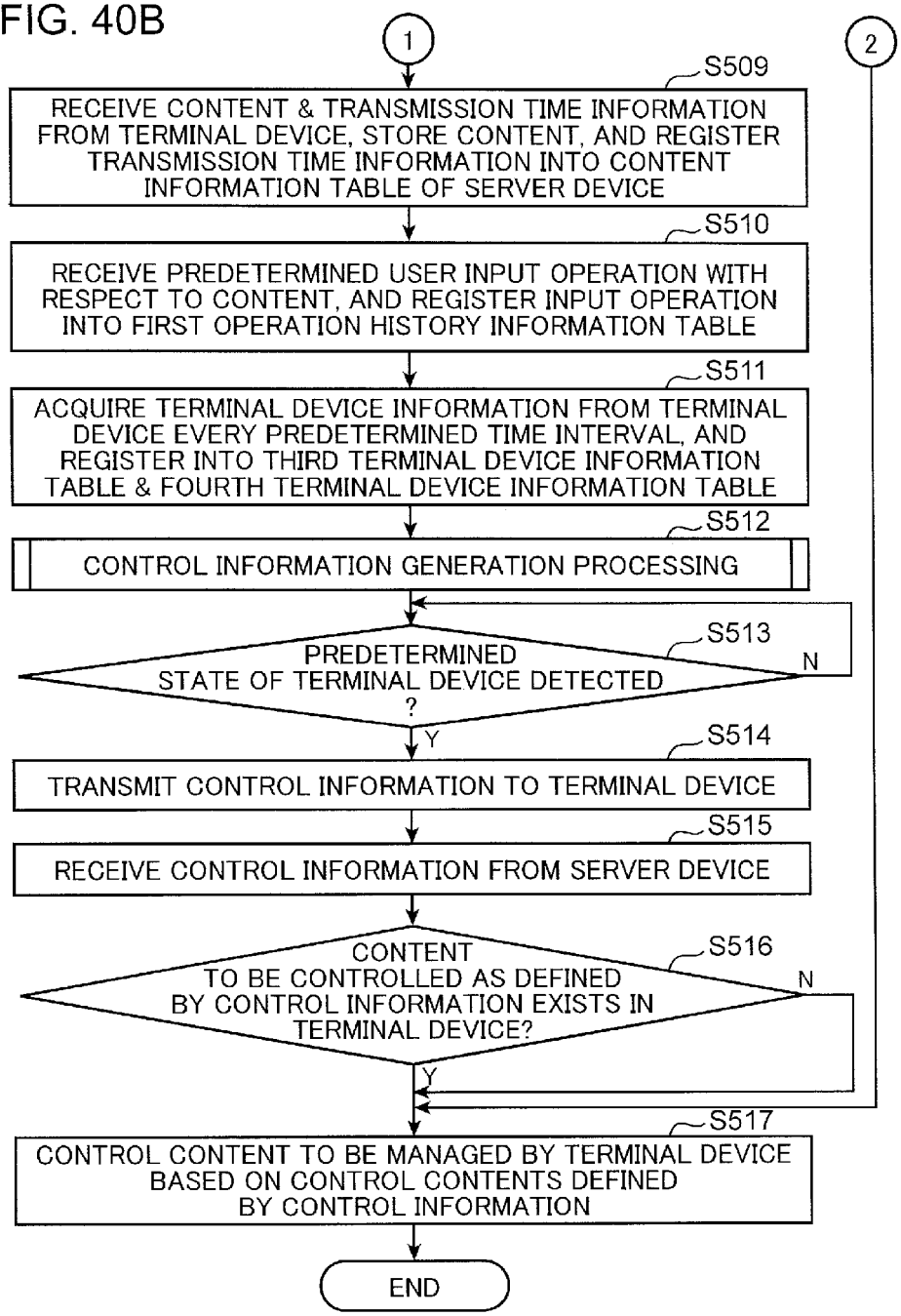

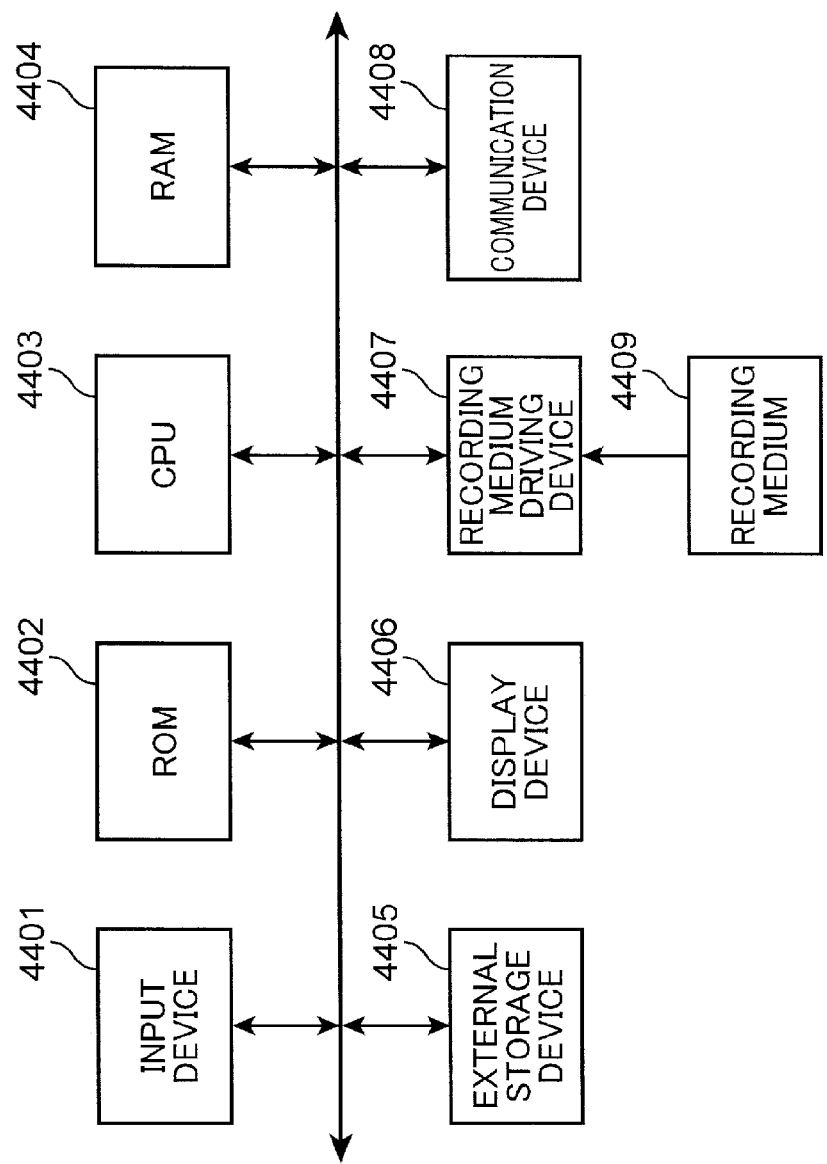

CONTENT CONTROL DEVICE, TERMINAL DEVICE, CONTENT CONTROL METHOD, AND COMPUTER-READABLE RECORDING MEDIUM

TECHNICAL FIELD

The present disclosure relates to a content control device connected to a terminal device via a network for controlling contents such as still images or moving images accumulated in the terminal device.

BACKGROUND ART

In recent years, with use of an imaging apparatus such as a digital still camera, a digital video camera, or a camera built in a smartphone, a mobile phone, or a tablet terminal, users can take high-definition photographs or moving images, and contents such as still images or moving images photographed at various events such as trips or wedding ceremonies are increasing.

In addition, there have been spread services, with which the users can easily share contents, as exemplified by an SNS (Social Networking Service), with which the users can easily build friendships on the Internet, and share photographs and messages between the friends. The number of users who utilize a plurality of content sharing services is increasing.

Under the circumstances as mentioned above, it is difficult for the users to specify a content of interest, out of a huge amount of contents.

In view of the above, there is proposed a technology of distributing contents or recommendation information on contents to the users, based on preference information or interest information of the users (see e.g. patent literature 1 and patent literature 2).

However, in the conventional technology, it is impossible to specify a content of interest, based on information other than the preference information and the interest information of the users.

CITATION LIST

Patent Literature

Patent literature 1: Japanese Unexamined Patent Publication No. 2012-38273
Patent literature 2: Japanese Unexamined Patent Publication No. 2009-245234

SUMMARY OF INVENTION

An object of the disclosure is to provide a technology of specifying a content of high interest, out of the contents accumulated in a terminal device, based on information other than preference information and interest information.

In view of the above, a content control device according to an aspect of the invention is a content control device connected to a terminal device via a network. The content control device is provided with a receiving content accumulation unit which accumulates contents received from the terminal device; an operation history information managing unit which manages operation history information indicative of a history on user input operations with respect to a first content accumulated in the receiving content accumulation unit through an operation input device and the terminal device connected via the network; a control information generating unit which generates control information for controlling a second content, based on the operation history information, the second content being a content corresponding to the first content and accumulated in the terminal device; and a content control unit which transmits the generated control information to the terminal device.

According to the above configuration, it is possible to specify a content of high interest, based on the operation history information indicative of a history on user operations with respect to the contents accumulated in the content control device.

BRIEF DESCRIPTION OF DRAWINGS

FIG. 3 is a diagram showing an example of a first content information table to be managed by a terminal device in the first embodiment;

FIG. 4 is a diagram showing an example of a first server information table to be managed by the server device of server ID "S-001" in the first embodiment;

FIG. 5 is a diagram showing an example of a second server information table to be managed by the server device of server ID "S-001" in the first embodiment;

FIG. 6 is a diagram showing an example of a friend intimacy table of the user "A" in the server device of server ID "S-001" in the first embodiment;

FIG. 7 is a diagram showing an example of a third server information table to be managed by the terminal device in the first embodiment;

FIG. 8 is a diagram showing an example of a fourth server information table to be managed by the terminal device in the first embodiment;

FIG. 9 is a diagram showing an example of a friend intimacy table of the user "A" in the terminal device in the first embodiment;

FIG. 10 is a diagram showing an example of a transmission time information table in the first embodiment;

FIG. 11 is a diagram showing an example of a content information table to be managed by the server device of server ID "S-001" in the first embodiment;

FIG. 12 is a diagram showing an example of a first operation history information table of a user concerning "LIKE" with respect to the content of content ID "C-00001" in the server device of server ID "S-001" in the first embodiment;

FIG. 13 is a diagram showing an example of a first operation history information table of a user concerning a comment with respect to the content of content ID "C-00001" in the server device of server ID "S-001" in the first embodiment;

FIG. 14 is a diagram showing an example of a first operation history information table of a user concerning browsing of the content of content ID "C-00001" in the server device of server ID "S-001" in the first embodiment;

FIG. 15 is a diagram showing an example of a first operation history information table of a user concerning downloading of the content of content ID "C-00001" in the server device of server ID "S-001" in the first embodiment;

FIG. 16 is a diagram showing an example of a first evaluation period information table of each of the contents to be managed by the server device of server ID "S-001" in the first embodiment;

FIG. 17 is a diagram showing an example of a second operation history information table of a user with respect to each of the contents to be managed by the server device of server ID "S-001" during each of the evaluation periods of evaluation period IDs "V1", "V2", and "V3" in the first embodiment;

FIG. 18 is a diagram showing an example of an accumulated operation history information table of a user concerning "LIKE" with respect to each of the contents to be managed by the server device of server ID "S-001" during each of the evaluation periods of evaluation period IDs "V1", "V2", and "V3" in the first embodiment;

FIG. 19 is a diagram showing an example of a control information table to be managed by the server device of server ID "S-001" in the first embodiment;

FIG. 20 is a diagram showing an example of a second evaluation period information table with respect to each of the contents to be managed by the server device of server ID "S-001" in the first embodiment;

FIG. 21 is a diagram showing an example of an accumulated operation history information table of a user with respect to each of the contents to be managed by the server device of server ID "S-001" during each of the evaluation periods of evaluation period IDs "V1-1", "V2-1", and "V3-1" in the first embodiment;

FIG. 24B is a flowchart showing a second half of the flow of the first content processing in the first embodiment;

FIG. 31 is a diagram showing an example of a fifth content browsing screen with use of the content management application of the terminal device in the first embodiment;

FIG. 32 is a diagram showing an example of a sixth content browsing screen with use of the content management application of the terminal device in the first embodiment;

FIG. 35 is a diagram showing an example of a second content information table to be managed by a terminal device in the second embodiment;

FIG. 36 is a diagram showing an example of a first terminal device information table to be managed by the terminal device in the second embodiment;

FIG. 37 is a diagram showing an example of a second terminal device information table to be managed by the terminal device in the second embodiment;

FIG. 38 is a diagram showing an example of a third terminal device information table to be managed by the server device of server ID "S-001" in the second embodiment;

FIG. 39 is a diagram showing an example of a fourth terminal device information table to be managed by the server device of server ID "S-001" in the second embodiment;

FIG. 40A is a flowchart showing a first half of a flow of content processing in the second embodiment;

FIG. 40B is a flowchart showing a second half of the flow of the content processing in the second embodiment;

FIG. 45 is a block diagram showing an example of a hardware configuration of a computer to be applied to a terminal device, a server device, and an operation input device according to the first and second embodiments.

DESCRIPTION OF EMBODIMENTS

Preface for Embodiments of the Invention

Figure 1:
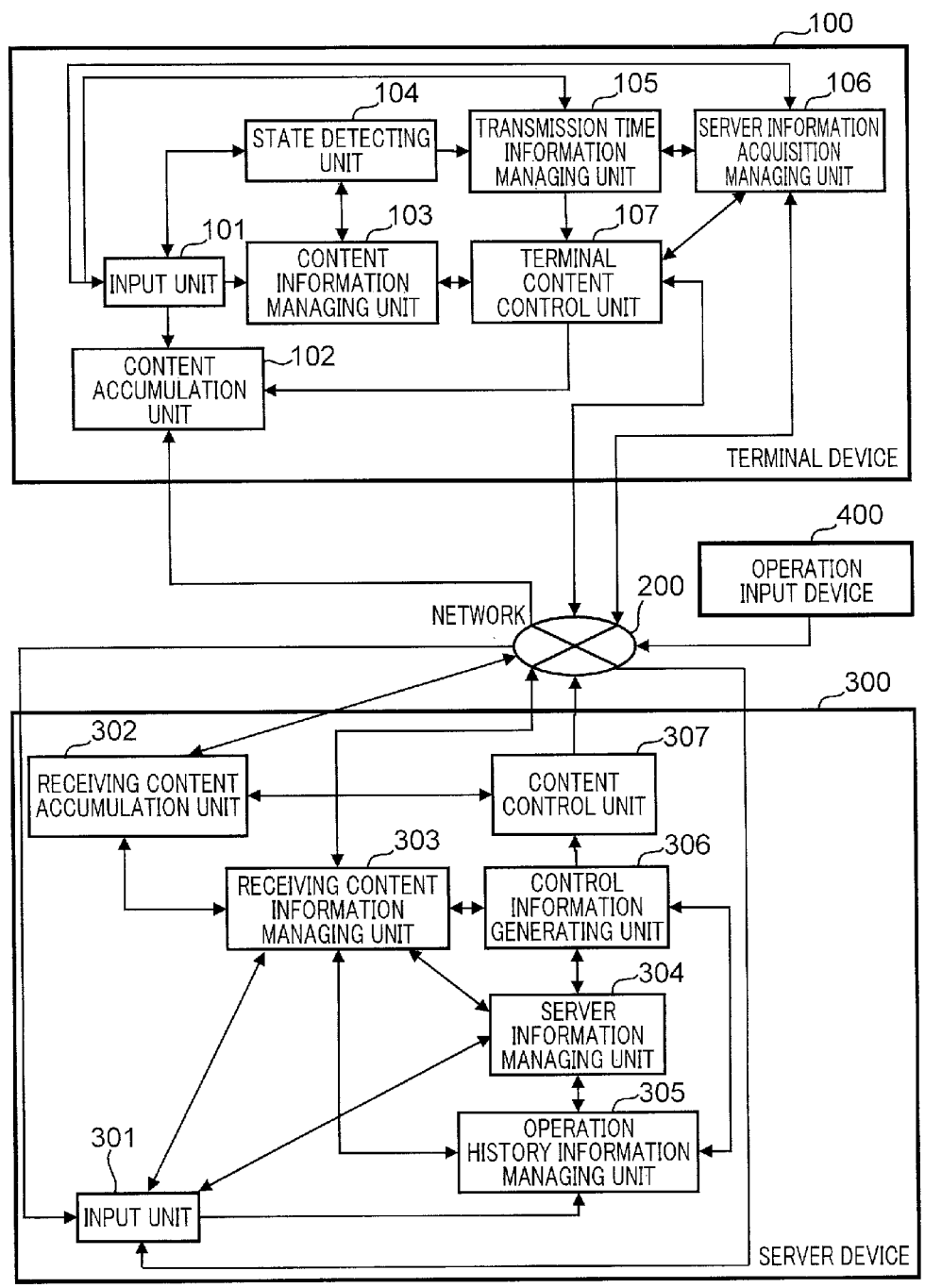
FIG. 1 is a block diagram showing an example of a configuration of a system including a content control device according to a first embodiment.

As described above, as the opportunity of sharing contents with other people by a content sharing service such as an SNS is increasing, the users may feel like to browse the contents which have already been shared, out of the enormous amount of contents owned by the users, or may feel like to browse a content of interest, out of the shared contents. However, in the case where the amount of contents accumulated in a content managing device is enormous, it is difficult to retrieve and browse a content of interest, out of the enoinious amount of contents.

Further, as the amount of contents increases, the capacity of a storage device equipped in a terminal device for accumulating the contents may be insufficient. In order to avoid such a situation, there is an idea of securing the capacity of a storage device by uploading the contents to a service device providing a content sharing service such as an SNS, and by deleting the contents corresponding to the uploaded contents from a terminal device. In this case, the uploaded contents are gone from the terminal device, and the user cannot browse the shared contents, or a content of interest out of the shared contents, with use of the terminal device. Further, in this case, the user may access the server device providing the content sharing service via the network from the terminal device in an attempt to browse the contents accumulated in the server device. However, in the case where the user is not in a network accessible environment, the user cannot browse the contents. Further, in the case where the network frequency band is narrow, there is a time delay in acquiring the contents, which makes it difficult to browse the contents.

Through a series of studies and investigations, the inventors of the present application have found that it is easy to retrieve, from a terminal device, shared contents, or a content of interest out of the shared contents by controlling the contents accumulated in the terminal device and corresponding to the shared contents, based on the information relating to the operations after sharing of the shared contents, and achieved the invention.

The inventors also have found that the risk of shortage of the capacity of a storage device equipped in a terminal device can be avoided, while making it easy to retrieve, from the terminal device, shared contents, or a content of interest out of the shared contents by controlling the contents accumulated in the terminal device and corresponding to the shared contents, based on the information relating to the operations after sharing of the shared contents, and achieved the invention.

In the following, embodiments of the invention are described referring to the accompanying drawings. In the embodiments, like constituent elements are indicated by like reference numerals, and repeated description thereof is omitted herein.

First Embodiment

FIG. 1 is a block diagram showing a configuration of a system including a content control device according to the first embodiment of the invention. The system shown in FIG. 1 is provided with a terminal device 100, a server device 300, and an operation input device 400. The terminal device 100, the server device 300, and the operation input device 400 are connected to each other via a network 200. In this embodiment, the server device 300 corresponds to a content control device.

Examples of the terminal device 100 include a device capable of storing images or moving image contents such as a personal computer, a video recorder, a BD recorder, or a home server; a device capable of photographing still images or moving images such as a digital still camera or a digital video camera, and a mobile terminal such as a mobile phone, a smartphone, or a tablet terminal.

An example of the server device 300 is a Web server which provides a service with which contents can be shared, such as an SNS (Social Networking Service). An example of the contents to be shared by the server device 300 is, for instance, a content that has been shared as a result of transmittance and accumulation from the terminal device 100 to the server device 300.

Examples of the operation input device 400 are a personal computer and a mobile terminal in which a browser or an application for utilizing various Web services is installed. The user utilizes a service provided by the server device 300 by way of the operation input device 400. Specifically, the user performs an operation with respect to a content disclosed by the service provided by the server device 300, with use of the operation input device 400 and the terminal device 100. Examples of an operation with respect to a content include browsing a content, inputting agreement information (such as "LIKE") with respect to a content, writing a comment with respect to a content, and downloading a content.

Figure 2:
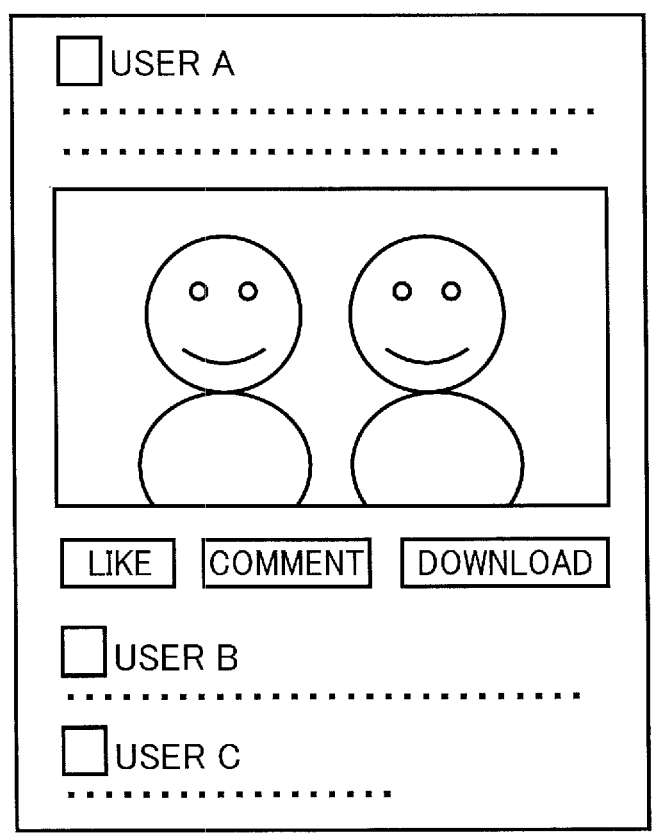
FIG. 2 is a diagram showing an example of an input screen to be used by a user in inputting an operation with respect to a content in a service provided by a server device in the first embodiment.

FIG. 2 is a diagram showing an example of an input screen to be used by a user in inputting an operation with respect to a content in a service provided by the server device 300. For instance, let it be assumed that plural users input a predetermined operation through the input screen shown in FIG. 2 with use of a browser or an application of plural operation input devices 400. In the example of FIG. 2, a content posted by the user "A" is displayed, and the user "B" and the user "C" have inputted their comments with respect to the content. On the input screen, there are displayed buttons with which the users can input "LIKE", "COMMENT", and "DOWNLOAD" with respect to the displayed content. In response to user's pressing the "LIKE" button, "LIKE" is inputted with respect to the content. In response to user's pressing the "COMMENT" button, a textbox in which the user is allowed to input a comment with respect to the content is presented, and the user is allowed to input a comment. Further, in response to user's pressing the "DOWNLOAD" button, the user is allowed to download the content, and the content is stored in the operation input device 400.

In the following, a configuration of the terminal device 100 is described.

The terminal device 100 is provided with an input unit 101, a content accumulation unit 102, a content information managing unit 103, a state detecting unit 104, a transmission time information managing unit 105, a server information acquisition managing unit 106, and a terminal content control unit 107.

The input unit 101 receives input of a content to be processed. The input unit 101 transfers the received content to the content accumulation unit 102. Further, the input unit 101 receives input of information (e.g. a content ID) for identifying a content to be shared between the server devices 300, and outputs the received input to the content information managing unit 103. Further, the input unit 101 receives input of transmission time information (e.g. a server ID for identifying the server device 300 as a recipient, or disclosure range information for defining the range of users to whom a content is to be disclosed), which is setting information relating to transmission in transmitting a content to the server device 300; and outputs the received input to the transmission time information managing unit 105.

The input unit 101 may be implemented by an input device of an external storage medium, a camera module built in the terminal device 100, a keyboard, a touch panel, an RFID (Radio Frequency IDentification) reader, a touch pad, or a mouse.

Input of a content is performed by one of the following methods (1) to (5).

(1) An external storage medium which stores contents in advance is connected to the terminal device 100 for reading a content.

(2) Wireless communication with use of a wireless communication module built in the terminal device 100 is performed for reading a content.

(3) A content to be inputted is selected from among the contents stored in a storage medium such as a PC, a mobile device, or an external hard disk on an Internet site connectable to the terminal device 100 via the network 200, and the selected content is transmitted to the terminal device 100 via the network 200.

(4) A content is photographed by a camera module built in the terminal device 100, and the photographed content is stored in the terminal device 100.
(5) Content information such as URL (Uniform Resource Locator) information, in which a content is stored in advance, is recorded in an RFID tag, the URL information of the content is acquired from the RFID tag with use of an RFID reader built in the terminal device 100 to allow the terminal device 100 to acquire and store the content stored in the URL via the network 200.

Input of transmission time information, which is setting information relating to transmission in transmitting, to the server device 300, information relating to a content to be shared between the server devices 300, and the content, is performed by one of the following methods (1) to (6).
(1) The user directly inputs information to the terminal device 100 with use of a keyboard, a touch panel, or a mouse.
(2) The user operates a GUI (Graphical User Interface) presented by the terminal device 100 for selecting the information.
(3) The user inputs information on an Internet site connectable to the terminal device 100 via the network 200 for transmitting the information to the terminal device 100 via the network 200.
(4) Information is recorded in advance, and the user operates the camera module built in the terminal device 100 to read the barcode information such as a QR (Quick Response) code stored in the mobile terminal of the user for inputting the information.
(5) The user operates the RFID reader built in the terminal device 100 to read the RFID tag in which information is recorded in advance for inputting the information.
(6) The user inputs information by voice recognition with use of a microphone module built in the terminal device 100, or character recognition with use of a touch pad built in the terminal device 100.

The content accumulation unit 102 accumulates a content transferred from the input unit 101 in the format, in which the content is re-storable into a storage medium constituted of a hard disk or a flash memory.

The content information managing unit 103 reads a content received by the input unit 101, analyzes meta-information (e.g. a content ID, a photographing date and time, and a storage path) of the content, and manages the analyzed meta-information as content information.

The state detecting unit 104 detects a state (e.g. an operation of selecting a content to be shared, or an operation of validating automatic content upload setting by the user) on user operations with respect to a content in the terminal device 100, and outputs content information relating to a content to be operated to the transmission time information managing unit 105.

The transmission time information managing unit 105 manages transmission time information (e.g. a server ID for identifying the server device 300 as a recipient, or disclosure range information for defining the range of users to whom a content is to be disclosed) received by the input unit 101, and content information (e.g. a content ID to be transmitted) outputted from the state detecting unit 104.

The server information acquisition managing unit 106 manages server information, which is acquired from the server device 300, and is the information relating to the server device 300 as a content recipient. Examples of the server information include information (e.g. a domain name of the server device 300, or a URL of a Web site provided by the server device 300) for identifying the server device 300, information (e.g. a type of service or a service name) for identifying a service provided by the server device 300, performance information of the server device 300, use state information of the server device 300, and user relationship information to be managed by the server device 300. In the case where there are plural server devices 300 as a content recipient, the server information acquisition managing unit 106 manages server information relating to the plural server devices 300. Alternatively, the server information acquisition managing unit 106 may not manage server information, and may request a server device from which server information is to be received at a timing when server information is necessary to acquire the server information.

The terminal content control unit 107 controls a content accumulated in the content accumulation unit 102, based on operation history information with respect to a content shared between the server devices 300. The control with respect to a content may be performed by receiving, from the server device 300, control information that has been generated based on operation history information indicative of a history on user input operations with respect to shared contents with use of the terminal device 100 and the operation input device 400. Examples of the control with respect to a content include attaching identification information to a content, deleting a content, and locking and protecting a content from content deletion. In the invention, "delete a content" includes, in addition to physically deleting a content, deleting a content from the terminal device 100 by transferring the content to another storage medium (e.g. a PC, a mobile device, an external hard disk, or a memory card).

Further, the terminal content control unit 107 transmits, to the server device 300 defined by the transmission time information to be managed by the transmission time information managing unit 105, a content and transmission time information in association with each other in detecting a predetermined state (e.g. an operation of selecting a content to be shared between the users, or an operation of validating automatic content upload setting by the user) by the state detecting unit 104.

In the following, a configuration of the server device 300 is described.

The server device 300 is provided with an input unit 301, a receiving content accumulation unit 302, a receiving content information managing unit 303, a server information managing unit 304, an operation history information managing unit 305, a control information generating unit 306, and a content control unit 307.

The receiving content accumulation unit 302 accumulates a content received from the terminal device 100.

The receiving content information managing unit 303 manages the received content information, based on the transmission time information received from the terminal device 100.

The server information managing unit 304 manages server information relating to the server device 300. Examples of the server information include information (e.g. a domain name of the server device 300, or a URL of a Web site provided by the server device 300) for identifying the server device 300, information (e.g. a type of service or a service name) for identifying a service provided by the server device 300, performance information of the server device 300, use state information of the server device 300, and user relationship information to be managed by the server device 300.

The input unit 301 receives input of user operations (e.g. input of "LIKE" or input of a comment) with respect to a content accumulated in the receiving content accumulation unit 302. An example of the user input operation is an input through a browser or an application operated on the operation input device 400. The input unit 301 outputs the received operation information to the operation history information managing unit 305. It should be noted that the user operation received by the input unit 301 may be an operation by all the users who operate a content, or an operation by a user or users included in the user relationship information to be managed by the server information managing unit 304.

The operation history information managing unit 305 accumulates and manages operation history information, which is outputted from the input unit 301 and indicative of a history on user operations with respect to a content. Examples of the operation history information to be accumulated include information indicating user operations (e.g. input of "LIKE" or input of a comment) with respect to a content to be managed by a service provided by the server device 300, which is received by the input unit 101 through the operation input device 400 and the terminal device 100. The user inputs an operation with respect to a content managed by the server device 300 by operating a browser or an application installed in the operation input device 400 and the terminal device 100.

The control information generating unit 306 calculates an evaluation value of a content accumulated in the server device 300, based on the operation history information to be managed by the operation history information managing unit 305, and generates control information with respect to the content, based on the calculated evaluation value. In this example, the control information includes control contents with respect to a content, and content information on a content to be controlled. Examples of the control contents include attaching identification information to a content, deleting a content, and locking and protecting a content from content deletion. Examples of the content information include a content ID and a storage path. Further, the evaluation value indicates a degree of user's interest in a content. The larger the evaluation value is, the higher the user's interest is.

The content control unit 307 transmits the control information generated by the control information generating unit 306 to the terminal device 100.

FIG. 3 is a diagram showing an example of a first content information table to be managed by the terminal device 100 in the first embodiment. The first content information table is a table to be generated and managed by the content information managing unit 103, and manages the meta-information included in a content acquired by the input unit 101. The first content information table shown in FIG. 3 is provided with, as meta-information, the elements "CONTENT ID", "STORAGE PATH IN TERMINAL DEVICE", "SIZE", "PHOTOGRAPHING DATE AND TIME", and "CONTENT TYPE". "CONTENT ID" is identification information of a content. "STORAGE PATH IN TERMINAL DEVICE" is information indicating a storage site of a content in the terminal device 100. "SIZE" is the amount of data of a content. "PHOTOGRAPHING DATE AND TIME" indicates a timing at which a content has been photographed. "CONTENT TYPE" indicates the type of a content such as a moving image or a still image.

For instance, the content of content ID "C-00001" is such that "STORAGE PATH IN TERMINAL DEVICE" is "132.124.123.1:80/data", the size of the content is 2.1 MB (megabytes), the photographing date and time of the content is 2012/4/7 14:33, and the type of the content is "image", which indicates a still image.

FIG. 4 is a diagram showing an example of a first server information table to be managed by the server device 300 of server ID "S-001" in the first embodiment. FIG. 5 is a diagram showing an example of a second server information table to be managed by the server device 300 of server ID "S-001". These server information tables are generated and managed by the server information managing unit 304.

The first server information table shown in FIG. 4 is provided with the elements "SERVER ID", "CONTENT RECEIVING URL (Uniform Resource Locator) OF SERVER DEVICE", "RECEIVABLE CONTENT TYPE", "CONTENT SIZE LIMIT", "CAPACITY LIMIT", and "REMAINING CAPACITY".

"SERVER ID" is identification information of the server device 300. "CONTENT RECEIVING URL OF SERVER DEVICE" is a URL to be utilized by the server device 300 in receiving a content from the terminal device 100. "RECEIVABLE CONTENT TYPE" indicates the type of a content receivable by the server device 300. "CONTENT SIZE LIMIT" is a maximum content size per content receivable by the server device 300. "CAPACITY LIMIT" is a maximum value of the capacity of contents storable in the server device 300. "REMAINING CAPACITY" is a value obtained by subtracting, from the value of capacity limit, the sum of the sizes of the contents stored in the server device 300, and is a value indicating the remaining amount of data storable in the server device 300 as contents.

For instance, the server device 300 of server ID "S-001" is such that the content receiving URL is "http://api.s1.com/content", the receivable content type is "image" and "movie", which indicate a still image and a moving image, the content size limit is 5 MB, the capacity limit is 5 GB (gigabytes), and the remaining capacity is 3.5 GB.

In the first server information table shown in FIG. 4, the elements other than "REMAINING CAPACITY" are generated based on the information set by the service provider in line with a service operation guideline. Further, the element "REMAINING CAPACITY" is generated by the server device 300 by subtracting, from the value of "CAPACITY LIMIT", the sum of the sizes of the contents stored in the server device 300.

The second server information table shown in FIG. 5 is provided with the elements "SERVER ID", "LEVEL OF CONTENT DISCLOSURE RANGE", and "USER RELATIONSHIP INFORMATION". "SERVER ID" is identification information of the server device 300. "LEVEL OF CONTENT DISCLOSURE RANGE" is information for defining the level of disclosure range settable by the server device 300 with respect to a content. In "USER RELATIONSHIP INFORMATION", "NUMBER OF FRIENDS", and "FRIEND NAME" are registered in association with each other. "NUMBER OF FRIENDS" is the number of friends who are registered in each of the server devices 300, and who are the friends of the user who owns the terminal device 100. "FRIEND NAME" is the name of a friend who is registered in each of the server devices 300, and is the name of a friend of the user who owns the terminal device 100. In this example, the user who owns the terminal device 100 is the user "A", and the names of the friends of the user "A" are registered. Further, "ALL" in the content disclosure range indicates that a content is disclosed to all the users registered in the server device 300. "FRIEND OF FRIEND" indicates that a content is disclosed to the friends of the friends of the user who transmitted the content to the server device 300, out of the users registered in the server device 300. Further, "FRIEND" indicates that a content is disclosed to the friends of the user who transmitted the content to the server device 300, out of the users registered in the server device 300. "SPECIFIC USER" indicates that a content is disclosed to a specific friend or friends designated by the user, out of the friends of the user who transmitted the content to the server device 300. "NON-DISCLOSURE" indicates that a content is not disclosed to any of the users registered in the server device 300, but is disclosed only to the user who transmitted the content to the server device 300. It should be noted that the user to whom a content is disclosed is allowed to input any operation with respect to the content. In this example, the server device 300 of server ID "S-001" is such that the disclosure range settable with respect to a content is one of "ALL", "FRIEND OF FRIEND", "FRIEND", "SPECIFIC FRIEND", and "NON-DISCLOSURE", the number of friends of the user "A" who owns the terminal device 100 is ten, and the names of the friends are the user "B", the user "C", the user "D", the user "E", the user "F", the user "G", the user "H", the user "I", the user "J", and the user "K".

In the second server information table shown in FIG. 5, the elements other than "USER RELATIONSHIP INFORMATION" are generated based on the information set by the service provider in line with a service operation guideline. Further, "USER RELATIONSHIP INFORMATION" is generated by a user operation indicative of friend request on a service provided by the server device 300 concerning the friend name, for instance. For instance, the user "A" requests to be friends with the user "B". When the request was accepted by the user "B", the user "B" is registered in "FRIEND NAME" of "USER RELATIONSHIP INFORMATION" of the user "A", and the user "A" is registered in "FRIEND NAME" of "USER RELATIONSHIP INFORMATION" of the user "B". Further, the number of friends is calculated from the number of friends registered in "USER RELATIONSHIP INFORMATION", which has been generated in the server device 300 by user operation.

FIG. 6 is a diagram showing an example of a friend intimacy table of the user "A" to be managed by the server device 300 of server ID "S-001" in the first embodiment. As well as the first and second server information tables shown in FIG. 4 and FIG. 5, the friend intimacy table is generated and managed by the server information managing unit 304. For instance, the friend intimacy table shown in FIG. 6 is generated by associating, on a service provided by the server device 300, a friend name with a degree of intimacy calculated based on the number of messages sent/received between the users registered as friends, or based on the number of specific characters used in the messages.

In this example, the degree of intimacy is a numerical value indicating a degree of intimacy between a owner user who owns the terminal device 100, and a friend of the owner user registered in the second server information table shown in FIG. 5. In this example, the owner user of the terminal device 100 is the user "A". Accordingly, degrees of intimacy between the user "A" and the friends are registered in the friend intimacy table by defining the user "A" in a column, and the friends of the user "A" in a row. The degree of intimacy between the user "A" and the user "A" is described as "-". For instance, the degree of intimacy between the user "A" and the user "B" is set to "2.2".

The degrees of intimacy are such that the higher (closer to 3) the numerical value is, the closer the relationship between the users is; and the lower (closer to 0) the numerical value is, the farther the relationship between the users is. The degree of intimacy may be set, on a service provided by the server device 300, based on the number of messages sent/received between the users, or based on the number of specific characters (e.g. emoticons) used in the messages between the users. In this example, the degree of intimacy is expressed in tennis of a numerical value which is not smaller than 0 but not larger than 3. The method for managing the degree of intimacy is not limited to the above, but may be a point system configured in such a manner that the score increases without an upper limit, or may be a system comprised of several levels such as levels A to E, whose granularity lowers stepwise. Further, in this example, the degree of intimacy with the user himself or herself is not taken into consideration. Alternatively, for instance, the degree of intimacy with the user himself or herself may be set to a predetermined value such as "1.0".

In the embodiment, the server information includes performance information of the server device 300, use state information of the server device 300, and user relationship information to be managed by the server device 300. In the examples shown in FIGS. 4 to 6, the performance information of the server device 300 corresponds to "RECEIVABLE CONTENT TYPE", "CONTENT SIZE LIMIT", and "CAPACITY LIMIT" in FIG. 4, and to "LEVEL OF CONTENT DISCLOSURE RANGE" in FIG. 5. Further, in the examples shown in FIGS. 4 to 6, the use state information of the server device 300 corresponds to "REMAINING CAPACITY" in FIG. 4. Further, in the examples shown in FIGS. 4 to 6, the user relationship information corresponds to "USER RELATIONSHIP INFORMATION" shown in FIG. 5, and to the degrees of intimacy registered in the friend intimacy table shown in FIG. 6.

FIG. 7 is a diagram showing an example of a third server information table to be managed by the terminal device 100 in the first embodiment. FIG. 8 is a diagram showing an example of a fourth server information table to be managed by the terminal device 100 in the first embodiment. The third and fourth server information tables are generated and managed by the server information acquisition managing unit 106. The third and fourth server information tables are tables obtained by acquiring and collecting server information to be managed by the respective server information managing units 304 of one or more server devices 300 connected to the terminal device 100 via the network 200, with use of the terminal device 100 every predetermined time interval. In this example, the server information corresponds to performance information of the server device 300, use state information of the server device 300, and user relationship information to be managed by the server device 300. The detailed contents of the server information are as follows. In this example, the server information acquisition managing unit 106 acquires server information to be managed by the respective server information managing units 304 of the three server devices 300 of server IDs "S-001", "S-002", and "S-003". The elements in each of the tables are substantially the same as those in the first and second server information tables of the server device 300 shown in FIG. 4 and FIG. 5, and accordingly, the description thereof is omitted herein. Further, referring to FIG. 7, "UNLIMITED" described in "CAPACITY LIMIT" and in "REMAINING CAPACITY" of the server device 300 of server ID "S-002" indicates that there is no limit in the capacity.

FIG. 9 is a diagram showing an example of a friend intimacy table of the user "A" in the terminal device 100 in the first embodiment. As well as the third and fourth server information tables shown in FIG. 7 and FIG. 8, the friend intimacy table is a table to be generated and managed by the server information acquisition managing unit 106. In this example, the friend intimacy table shown in FIG. 9 is a table obtained by acquiring and collecting server information to be managed by the respective server information managing units 304 of one or more server devices 300 connected to the terminal device 100 via the network 200, with use of the terminal device 100 every predetermined time interval. FIG. 9 shows an example of the friend intimacy table obtained by collecting the friend intimacy tables of the user "A" to be managed by the server devices 300 of server IDs "S-001", "S-002", and "S-003".

The elements in the friend intimacy table are substantially the same as those in the friend intimacy table of the user "A" in the server device 300 of server ID "S-001" shown in FIG. 6, and accordingly, the description thereof is omitted herein.

FIG. 10 is a diagram showing an example of a transmission time information table in the first embodiment. The transmission time information table is a table to be generated and managed by the transmission time information managing unit 105, with use of the content information registered in the first content information table shown in FIG. 3, and with use of the server information registered in the third server information table shown in FIG. 7 and in the fourth server information table shown in FIG. 8, based on user operation detected by the state detecting unit 104.

The transmission time information table shown in FIG. 10 is provided with the elements "CONTENT ID", "STORAGE PATH IN TERMINAL DEVICE", "SIZE", "PHOTOGRAPHING DATE AND TIME", "CONTENT TYPE", "RECIPIENT SERVER ID", "CONTENT RECEIVING URL OF SERVER DEVICE", "CONTENT DISCLOSURE RANGE", and "TRANSMISSION DATE AND TIME". "CONTENT ID" is identification information of a content to be transmitted. "STORAGE PATH IN TERMINAL DEVICE" indicates a storage site of a content in the terminal device 100. "SIZE" is the capacity of a content. "PHOTOGRAPHING DATE AND TIME" indicates a timing at which a content has been photographed. "CONTENT TYPE" indicates the type of a content such as a moving image or a still image. "RECIPIENT SERVER ID" is identification information of the server device 300 as a content recipient. "CONTENT RECEIVING URL OF SERVER DEVICE" is a URL indicating a storage site of a content of the server device 300 as a content recipient. "CONTENT DISCLOSURE RANGE" indicates a disclosure range of a content to be transmitted within the server device 300. "TRANSMISSION DATE AND TIME" indicates a date and time when a content has been transmitted. Examples of "TRANSMISSION DATE AND TIME" are a date and time inputted by the user through the input unit 101 of the terminal device 100, and a date and time acquired by the terminal device 100 via the network 200 from the server device 300 which notifies the date and time.

For instance, the content of content ID "C-0001" is transmitted to the content receiving URL "http://api.s1.com/content" of the server device 300 of server ID "S-001" on 2012/5/1 17:00 in a condition that the content disclosure range is "FRIEND" and in association with "SIZE", "PHOTOGRAPHING DATE AND TIME", "CONTENT TYPE", and "STORAGE PATH IN TERMINAL DEVICE".

FIG. 11 is a diagram showing an example of a content information table to be managed by the server device 300 of server ID "S-001" in the first embodiment. The content information table to be managed by the server device 300 is a table to be generated and managed by the receiving content information managing unit 303, based on the transmission time information table transmitted from the terminal device 100 to the server device 300. The contents of the table are substantially the same as the elements in the transmission time information table shown in FIG. 10, except for "CONTENT STORAGE PATH IN SERVER DEVICE" and "RECEIVING DATE AND TIME", and accordingly, the description thereof is omitted herein.

In the content information table shown in FIG. 11, "CONTENT STORAGE PATH IN SERVER DEVICE" is a storage site of a content in the server device 300 in receiving the content from the terminal device 100. In the example shown in FIG. 11, the content of content ID "C-00001" which has been received by the server device 300 of server ID "S-001" from the terminal device 100 is stored in the storage path "http://s1/content/uploaded" on the server device 300. Further, in the content information table shown in FIG. 11, "RECEIVING DATE AND TIME" indicates a date and time when the server device 300 of server ID "S-001" has received a content from the terminal device 100. In the example shown in FIG. 11, receiving of the content of content ID "C-00001" from the terminal device 100 by the server device 300 of server ID "S-001" has been completed on 2012/5/1 17:00. Examples of "RECEIVING DATE AND TIME" are a date and time inputted by the user through the input unit 301 of the server device 300, and a date and time received by the server device 300 from another server device 300 which notifies the date and time via the network 200.

In the example shown in FIG. 11, the content ID to be managed by the server device 300 is unchanged from the content ID to be managed by the terminal device 100. However, the server device 300 ordinarily receives contents from plural terminal devices 100. Further, there is a case that contents to be transmitted from the terminal devices 100 are such that information corresponding to content IDs overlap each other. In view of the above, the server device 300 may change the content ID of a content received from one of the terminal devices 100 to another content ID in order to uniquely manage the content. In this case, for instance, in the content information table shown in FIG. 11, the server device 300 may register a content ID to be managed by the server device 300, and a content ID to be managed by the terminal device 100 in association with each other.

In the following, an example of an operation history information table to be managed by the operation history information managing unit 305 in the first embodiment is described with reference to FIGS. 12 to 15. For instance, the operation history information table is generated with use of the information relating to inputted operations, in the case where the user inputs various operations through an input screen shown in FIG. 2. FIGS. 12 to 15 are examples of operation history information to be managed by the server device 300 of server ID "S-001".

FIG. 12 is a diagram showing an example of a first operation history information table concerning "LIKE" with respect to the content of content ID "C-00001". The first operation history information table shown in FIG. 12 is provided with the elements "SERVER ID", "CONTENT ID", "LIKE" ID, "INPUT DATE AND TIME", and "INPUT USER NAME". "SERVER ID" is identification information of the server device 300. "CONTENT ID" is identification information of a content. "LIKE" ID is identification information of "LIKE". "INPUT DATE AND TIME" is a date and time when "LIKE" has been inputted. "INPUT USER NAME" is the name of the user who has inputted "LIKE". In this example, concerning the content of content ID "C-00001" of the server device 300 of server ID "S-001", "LIKE" having "LIKE" ID "L-P10001" has been inputted by the user "B" on 2012/5/1 17:10. It should be noted that, as a representative example, only the operation history information concerning six "LIKEs" is described in the order from an oldest input date and time to a latest input date and time, out of the operation history information concerning "LIKE" which has been inputted with respect to the content of content ID "C-00001".

FIG. 13 is a diagram showing an example of a first operation history information table of a user concerning a comment with respect to the content of content ID "C-00001". The first operation history information table shown in FIG. 13 is provided with the elements "SERVER ID", "CONTENT ID", "COMMENT ID", "INPUT DATE AND TIME", "INPUT USER NAME", "NUMBER OF AFFIRMATIVE EXPRESSIONS", and "NUMBER OF NEGATIVE EXPRESSIONS". "COMMENT ID" is identification information of a comment. "INPUT DATE AND TIME" is a date and time when a comment has been inputted. "INPUT USER NAME" is the name of the user who has inputted a comment. "NUMBER OF AFFIRMATIVE EXPRESSIONS" is the number of affirmative expressions used in an inputted comment. "NUMBER OF NEGATIVE EXPRESSIONS" is the number of negative expressions used in an inputted comment. The elements other than the above are the same as those shown in FIG. 12.

For instance, the content of content ID "C-00001" of the server device 300 of server ID "S-001" is such that the comment of "COMMENT ID" "M-P10001" has been inputted by the user "D" on 2012/5/1 19:15, the number of affirmative expressions included in the inputted comment is one, and the number of negative expressions included in the inputted comment is zero. It should be noted that, as a representative example, there are described only the operation history information concerning two comments in the order from an oldest input date and time to a latest input date and time, out of the operation history information concerning comments which have been inputted with respect to the content of content ID "C-00001".

FIG. 14 is a diagram showing an example of a first operation history information table concerning browsing of the content of content ID "C-00001". The first operation history information table shown in FIG. 14 is provided with the elements "SERVER ID", "CONTENT ID", "BROWSING ID", "BROWSING DATE AND TIME", "BROWSING USER NAME", and "BROWSING TIME".

"BROWSING ID" is identification information of a browsing operation. "BROWSING DATE AND TIME" is a date and time when a browsing operation has been inputted. "BROWSING USER NAME" is the name of the user who performed a browsing operation. "BROWSING TIME" is a period of time from start to end of a browsing operation of a content. The elements other than the above are the same as those in FIG. 13.

In this example, a browsing operation identified by browsing ID "W-P10001" with respect to the content of content ID "C-00001" of the server device 300 of server ID "S-001" has been inputted by the user "B" on 2012/5/1 17:10, and the time required for the browsing operation is 43 seconds. It should be noted that, as a representative example, there are described only the operation history information concerning two browsing operations in the order from an oldest browsing date and time to a latest browsing date and time, out of the operation history information concerning browsing operations which have been inputted with respect to the content of content ID "C-00001".

FIG. 15 is a diagram showing an example of a first operation history information table concerning downloading of the content of content ID "C-00001". The first operation history information shown in FIG. 15 is provided with the elements "SERVER ID", "CONTENT ID", "DOWNLOAD ID", "DOWNLOAD DATE AND TIME", and "DOWNLOAD USER NAME".

"DOWNLOAD ID" is identification information of a download operation. "DOWNLOAD DATE AND TIME" is a date and time when a download operation has been inputted. "DOWNLOAD USER NAME" is the name of the user who performed a download operation. For instance, a download operation identified by download ID "D-P1001" with respect to the content of content ID "C-00001" of the server device 300 of server ID "S-001" has been inputted by the user "C" on 2012/5/3 13:59. In the example shown in FIG. 15, as a representative example, there are described only the operation history information concerning two browsing operations in the order from an oldest download date and time to a latest download date and time, out of the operation history information concerning download operations which have been inputted with respect to the content of content ID "C-00001".

FIG. 16 is a diagram showing an example of a first evaluation period information table which manages an evaluation period of each of the contents to be managed by the server device 300 of server ID "S-001". The first evaluation period information table is a table to be generated and managed by the control information generating unit 306 of the server device 300. The first evaluation period information table is generated based on information set by a service provider or a user every predetermined evaluation period, for instance. The first evaluation period information table shown in FIG. 16 is provided with the elements "SERVER ID", "CONTENT ID", "PERIOD", and "EVALUATION PERIOD ID". "CONTENT ID" is identification information of a content received from the terminal device 100 by the server device 300. "PERIOD" indicates a period of time from start to end of an evaluation period. "EVALUATION PERIOD ID" is identification information of an evaluation period. In this example, an evaluation period is one week from "RECEIVING DATE AND TIME" in the content information table shown in FIG. 11, which is managed by the server device 300. For instance, a period of time from 2012/5/1 17:00 to 2012/5/8 17:00 is an evaluation period of evaluation period ID "V1" with respect to the content of content ID "C-00001" of the server device 300 of server ID "S-001".

FIG. 17 is a diagram showing an example of a second operation history information table concerning "LIKE" during the evaluation periods of evaluation period IDs "V1", "V2", and "V3" of each of the contents to be managed by the server device 300 of server ID "S-001". The second operation history information table is a table to be generated and managed by the control information generating unit 306. The control information generating unit 306 extracts, from the first operation history information tables (see FIGS. 12 to 15), operation history information of each of the evaluation periods set in the first evaluation period information table (see FIG. 16), and generates the second operation history information table. The second operation history information table shown in FIG. 17 is provided with the elements "SERVER ID", "CONTENT ID", "EVALUATION PERIOD ID", "LIKE" ID, and "INPUT USER NAME".

For instance, "LIKE" operations from the user with respect to the content of content ID "C-00001" included in the evaluation period of evaluation period ID "V1" are identified by "LIKE" IDs "L-P10001", "L-P10002", "L-P10003", "L-P10004", and "L-P10005", and the users who have inputted these "LIKE" operations are the user "B", the user "E", the user "G", the user "I", and the user "J" in this order.

In the example shown in FIG. 17, only the information concerning "LIKE" is described out of the operation history elements in the first operation history information table of a user shown in FIGS. 12 to 15. It should be noted that the second operation history information table is also generated concerning the other operation history elements i.e. a comment, a browsing operation, and a download operation substantially in the same manner as the operation history element "LIKE". For instance, concerning the operation history element "COMMENT", the control information generating unit 306 extracts, from the first operation history information table shown in FIG. 13, the operation history information during each of the evaluation periods set in the first evaluation period information table, and generates the second operation history information table.

FIG. 18 is a diagram showing an example of an accumulated operation history information table during the evaluation periods of evaluation period IDs "V1", "V2", and "V3" of the contents to be managed by the server device 300 of server ID "S-001" in the first embodiment. The accumulated operation history information table is a table to be generated and managed by the control information generating unit 306.

The control information generating unit 306 is generated by calculating the sum of the numbers/times of each of the operation history elements during each of the evaluation periods set in the first evaluation period information table (see FIG. 16) from the second operation history information table (see FIG. 17).

For instance, concerning "LIKE" during the evaluation period of evaluation period ID "V1" of the content of content ID "C-00001", five "LIKEs" identified by "LIKE" IDs "L-P10001", "L-P10002", "L-P10003", "L-P10004", and "L-P10005" are registered in the second operation history information table shown in FIG. 17. Accordingly, the control information generating unit 306 calculates the sum of "LIKEs" as "5", and registers "5" in the column of the number of "LIKEs" during the evaluation period of evaluation period ID "V1" of the content of content ID "C-00001" in the accumulated operation history information table shown in FIG. 18.

The accumulated operation history information table shown in FIG. 18 is provided with the elements "SERVER ID", "CONTENT ID", the number of "LIKEs", "NUMBER OF COMMENTS", "NUMBER OF AFFIRMATIVE EXPRESSIONS", "NUMBER OF NEGATIVE EXPRESSIONS", "NUMBER OF TIMES OF BROWSING OPERATIONS", "BROWSING TIME", and "NUMBER OF TIMES OF DOWNLOAD OPERATIONS".

The number of "LIKEs" is the number of inputs of agreement information "LIKE" with respect to a content. "NUMBER OF AFFIRMATIVE EXPRESSIONS" is the number of expressions having an affirmative meaning included in an inputted comment. "NUMBER OF NEGATIVE EXPRESSIONS" is the number of expressions having a negative meaning included in an inputted comment. "NUMBER OF TIMES OF BROWSING OPERATIONS" is the number of times of browsing a content. "BROWSING TIME" is an accumulated period of time when a content was browsed. "NUMBER OF TIMES OF DOWNLOAD OPERATIONS" is the number of times of downloading a content. For instance, concerning an accumulation result on operation history information with respect to the content of content ID "C-00001" during the evaluation period of evaluation period ID "V1", the number of "LIKEs" is 5, the number of comments is 12, the number of affirmative expressions is 6, the number of negative expressions is 0, the number of times of browsing operations is 24, the browsing time is 28 minutes and 10 seconds, and the number of times of download operations is 4.

FIG. 19 is a diagram showing an example of a control information table to be managed by the server device 300 of server ID "S-001" in the first embodiment. The control information table is a table to be generated and managed by the control information generating unit 306. For instance, the control information table is generated based on information set by a service provider or a user concerning a control with respect to the contents accumulated in the terminal device 100. The control information table shown in FIG. 19 is provided with the elements "SERVER ID", "CONTROL INFORMATION ID", "CONTENT ID", "STORAGE PATH IN TERMINAL DEVICE", and "CONTROL CONTENTS". "CONTROL INFORMATION ID" is identification information of control information. "CONTENT ID" is identification information of a content to be controlled. "STORAGE PATH IN TERMINAL DEVICE" is a storage path in the terminal device 100 in which a content is to be controlled. "CONTROL CONTENTS" is control contents to be applied to a content. The control information of control information ID "0-00001" of the server device 300 of server ID "S-001" has the control contents such that a content protecting function is validated with respect to the content of content ID "C-00001", which is stored in the storage path "132.124.123.1:80/data" in the terminal device 100.

FIG. 20 is a diagram showing an example of a second evaluation period information table of each of the contents to be managed by the server device 300 of server ID "S-001" in the first embodiment. The second evaluation period information table is a table to be generated and managed by the control information generating unit 306 of the server device 300. For instance, the second evaluation period information table is generated based on information relating to an evaluation period set by a server provider or a user. The elements in the second evaluation period information table shown in FIG. 20 are substantially the same as those shown in FIG. 16, and accordingly, the description thereof is omitted herein.

FIG. 21 is a diagram showing an example of an accumulated operation history information table during the evaluation periods of evaluation period IDs "V1-1", "V2-1", and "V3-1" of each of the contents to be managed by the server device 300 of server ID "S-001" in the first embodiment. The accumulated operation history information table is a table to be generated and managed by the control information generating unit 306. The control information generating unit 306 generates the accumulated operation history information table by calculating the sum of the numbers/times of each of the operation history elements during each of the evaluation periods set in the second evaluation period information table (see FIG. 20), using the first operation history information tables (see FIGS. 12 to 15). The elements in the accumulated operation history information table shown in FIG. 21 are substantially the same as those shown in FIG. 18, and accordingly, the description thereof is omitted herein.

In the following, content processing to be performed by the system including the content control device according to the first embodiment is described referring to FIGS. 22 to 32.

First of all, an outline of content processing to be performed in this embodiment is described.

Figure 22:
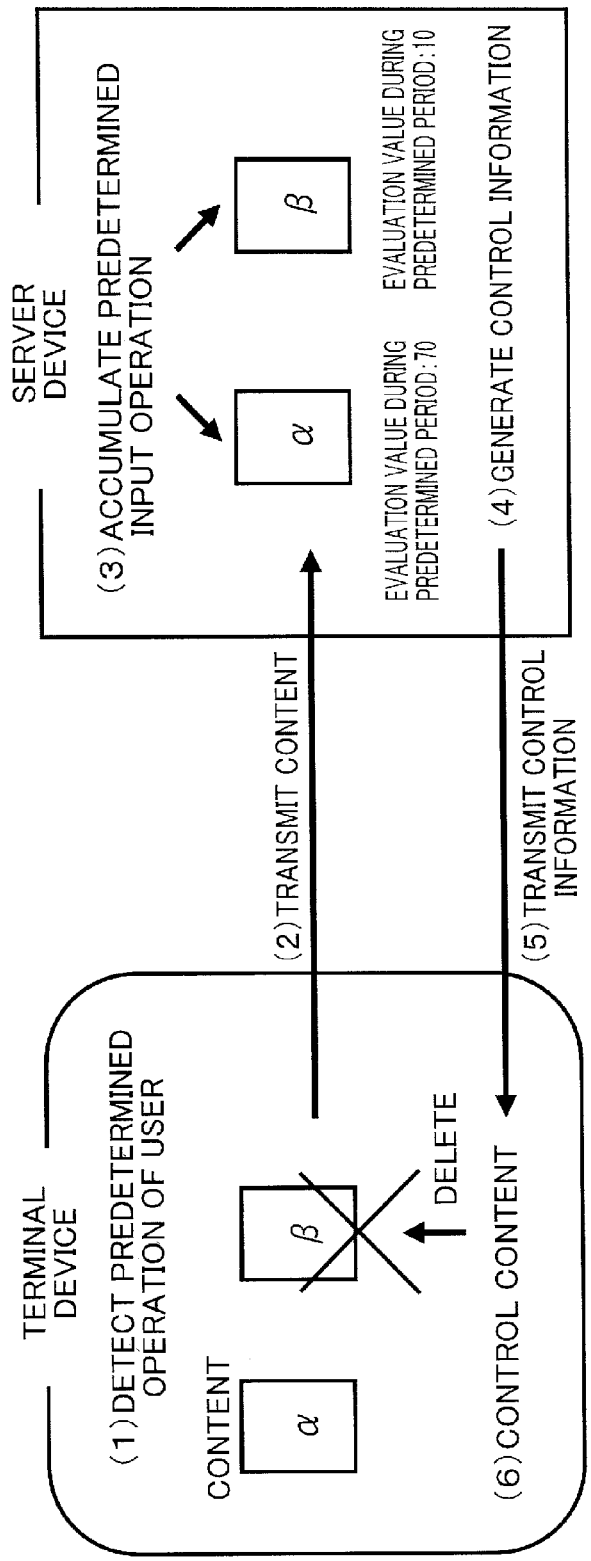
FIG. 22 is a diagram showing an outline of first content processing in the first embodiment.

FIG. 22 is a diagram showing an outline of the first content processing to be performed in the first embodiment. The numbers (1) to (6) denote the order of processing. Further, the content α and the content β are contents to be processed.

Specifically, in (1), the terminal device 100 detects input of a predetermined user operation (e.g. an operation of selecting a content and transmission time information, pressing the "TRANSMISSION" button or pressing the "VALIDATION" button for automatic content upload setting). Subsequently, in (2), the terminal device 100 transmits to the server device 300 the content and the transmission time information. Subsequently, in (3), the server device 300 receives input of a predetermined user operation (e.g. input of "LIKE" or input of comment with respect to a content from a friend), and accumulates the predetermined operation as an operation history. Subsequently, in (4), the server device 300 calculates an evaluation value with respect to a content from the operation history with respect to the content during a predetermined period, specifies the content to be controlled based on the evaluation value, and generates control information for controlling the content of the terminal device 100 corresponding to the specified content (e.g. deleting a content, protecting a content from deletion, converting the format of a content to a data format in which the data amount is small, or attaching information to a content). Subsequently, in (5), the server device 300 transmits the generated control information to the terminal device 100. Lastly, in (6), the terminal device 100 controls the content based on the control information.

In the example of FIG. 22, the evaluation value of the content α is 70 and the evaluation value of the content β is 10 during a predetermined period. In this example, in the case where the control contents are set such that a content whose evaluation value is smaller than 30 should be deleted, control information "DELETE CONTENT β" is generated and transmitted to the terminal device 100. Upon receiving the control information, the terminal device 100 deletes the content β from the terminal device 100.

By the first content processing shown in FIG. 22, the terminal device 100 transmits a content to the server device 300 for sharing the content between the users. This makes it possible to perform controls such that the terminal device 100 can easily identify a content in which the users are interested after the sharing, a content other than the content in which the users are interested is deleted from the terminal device 100, or the data capacity of contents to be accumulated in the terminal device 100 is reduced.

Figure 23:
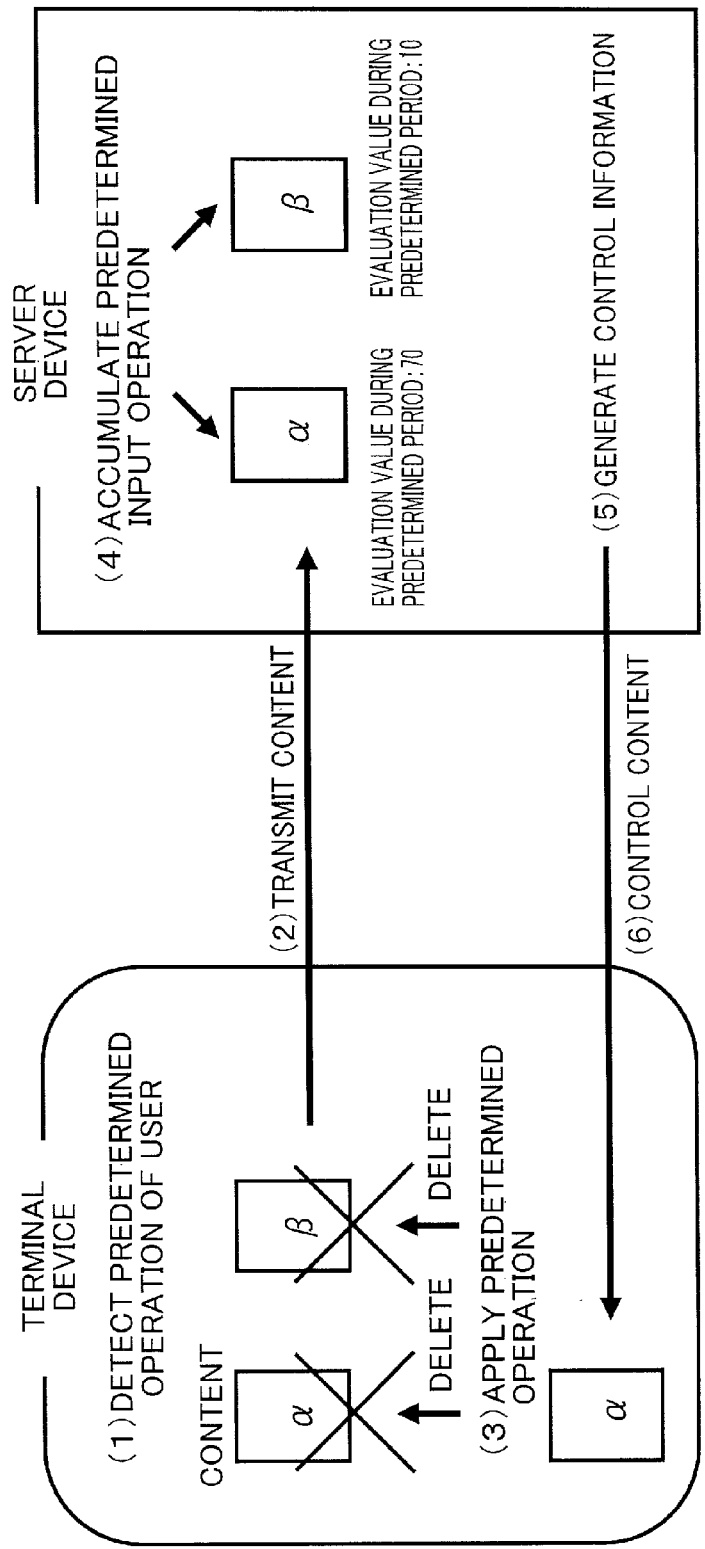
FIG. 23 is a diagram showing an outline of second content processing in the first embodiment.

FIG. 23 is a diagram showing an outline of the second content processing to be performed in the first embodiment. The numbers (1) to (6) denote the order of processing. Further, the content α and the content β are contents to be processed.

Specifically, in (1), the terminal device 100 detects input of a predetermined user operation (e.g. an input operation of selecting a content and transmission time information, and pressing the "TRANSMISSION" button). Subsequently, in (2), the terminal device 100 transmits to the server device 300 the selected content and transmission time information. Subsequently, in (3), the terminal device 100 applies a predetermined operation to the content transmitted to the server device 300 (e.g. an operation of deleting a content, or converting the format of a content to a data format in which the data amount is small). In the example shown in FIG. 23, the content α and the content β are deleted from the terminal device 100. Subsequently, in (4), the server device 300 receives input of a predetermined user operation (e.g. input of "LIKE" or input of a comment with respect to a content from a friend), and accumulates the predetermined operation as an operation history. Subsequently, in (5), the server device 300 calculates an evaluation value of the content from the operation history with respect to the content during a predetermined period, specifies a content to be controlled based on the evaluation value, and generates control information for controlling the content to be stored in the terminal device 100 corresponding to the specified content. For instance, there is generated control information such that a content transmitted in association with the control information is accumulated in a predetermined region of the terminal device 100, or a content to be identified by the control information is downloaded from the server device 300.

Lastly, in (6), the server device 300 controls the content based on the control information. In the example of FIG. 23, the evaluation value of the content α is 70 and the evaluation value of the content β is 10 during a predetermined period. In this example, in the case where the control contents are set such that a content whose evaluation value is not smaller than 60 is transmitted to the terminal device 100, there is generated control information having the control contents "ACCUMULATE TRANSMITTED CONTENT α TOGETHER WITH CONTROL INFORMATION IN TERMINAL DEVICE 100". Then, the control information is transmitted to the terminal device 100 together with the content α. Upon receiving the control information, the terminal device 100 accumulates the content α in accordance with the control information.

By the second content processing shown in FIG. 23, after the terminal device 100 transmits a content to the server device 300 for sharing the content between the users, the terminal device 100 deletes the transmitted content or reduces the data capacity. Thereafter, the terminal device 100 can perform a control such that a content in which the users are interested after the sharing in the server device 300 is returned to the terminal device 100.

The following is the details of the first and second content processings whose outlines have been described referring to FIG. 22 and FIG. 23.

First of all, the details of the first content processing described referring to FIG. 22 are described.

In the following description, let it be assumed that the user who owns the terminal device 100 is the user "A", the server devices 300 connected to the terminal device 100 via the network 200 are the server device 300 of server ID "S-001", the server device 300 of server ID "S-002", and the server device 300 of server ID "S-003".

Figure 24A:
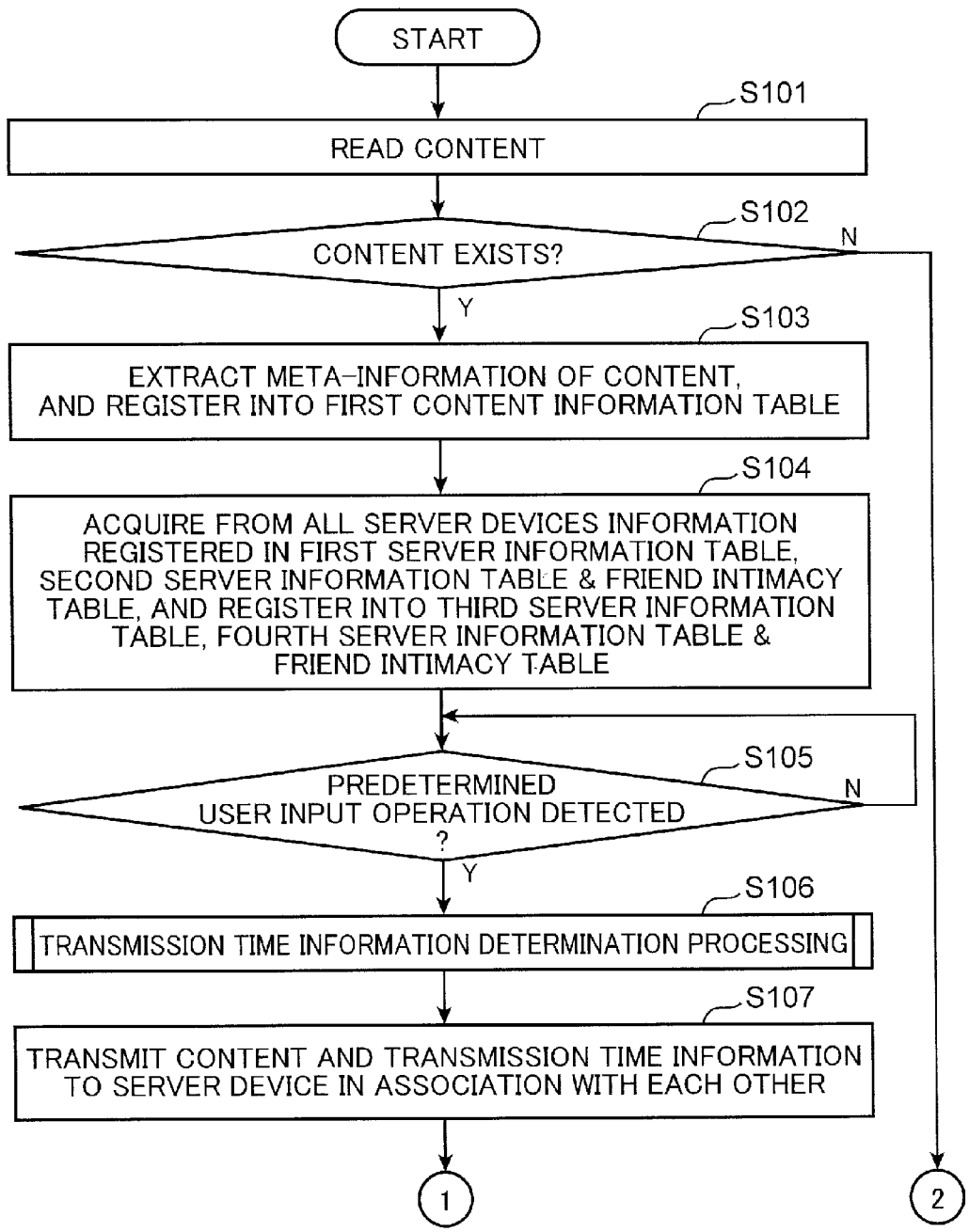
FIG. 24A is a flowchart showing a first half of a flow of the first content processing in the first embodiment.

FIG. 24A and FIG. 24B are a flowchart showing an example of an overall operation of the first content processing to be performed in the first embodiment.

At first, the input unit 101 reads a content accumulated in the content accumulation unit 102 (Step S101). For instance, the input unit 101 performs this processing, triggered by connection to an external storage medium in which a content is stored, or a user operation indicative of a photographing operation with use of a camera module built in the terminal device 100.

Subsequently, the input unit 101 checks whether the content accumulation unit 102 accumulates at least one or more contents (Step S102). In the case where the content accumulation unit 102 does not store a content (N in Step S102), the input unit 101 finishes the content processing. On the other hand, in the case where the content accumulation unit 102 accumulates a content (Y in Step S102), the content information managing unit 103 generates the first content information table (see FIG. 3), and registers meta-information extracted from the content into the first content information table (Step S103).

The content information managing unit 103 may extract, as meta-information, "CONTENT NAME", "STORAGE PATH IN TERMINAL DEVICE", "SIZE", "PHOTOGRAPHING DATE AND TIME", and "CONTENT TYPE" from EXIF (Exchangeable Image File Format) information recorded in a content with respect to all the contents accumulated in the content accumulation unit 102, for instance.

Subsequently, the server information acquisition managing unit 106 acquires the information registered in the first server information table (see FIG. 4), the second server information table (see FIG. 5), and the friend intimacy table of user "A" (see FIG. 6) to be managed by the server information managing units 304 of all the server devices 300 every predetermined period, and registers the acquired information into the corresponding columns of the third server information table (see FIG. 7), the fourth server information table (see FIG. 8), and the friend intimacy table of user "A" (see FIG. 9) (Step S104). In this example, the unit of the predetermined period may be one day, one week, or one month.

Specifically, the server information acquisition managing unit 106 registers the information "SERVER ID", "CONTENT RECEIVING URL OF SERVER DEVICE", "RECEIVABLE CONTENT TYPE", "CONTENT SIZE LIMIT", "CAPACITY LIMIT", and "REMAINING CAPACITY", which have been registered in the first server information table (see FIG. 4), into the corresponding columns of server ID "001" in the third server information table.

Further, the server information acquisition managing unit 106 registers the information "SERVER ID", "LEVEL OF CONTENT DISCLOSURE RANGE", and "USER RELATIONSHIP INFORMATION", which have been registered in the second server information table (see FIG. 5), into the corresponding columns of server ID "S-001" in the fourth server information table (see FIG. 8).

Further, the server information acquisition managing unit 106 registers the degrees of intimacy, which have been registered in the friend intimacy table (see FIG. 6), into the corresponding columns of server ID "S-001" in the friend intimacy table (see FIG. 9).

Subsequently, the state detecting unit 104 detects whether a a predetermined user operation has been inputted through the input unit 101 (Step S105). An example of the predetermined operation is an operation of selecting a content to be shared between the server devices 300, a server device 300 as a content recipient, and a content disclosure range, and of pressing the "TRANSMISSION" button through an application installed in the terminal device 100.

In performing the above operation, a content selectable as a content to be shared between the users is a content registered in the first content information table (see FIG. 3). Further, a server device 300 designatable by the user as a recipient server device is the server device 300 whose server ID is registered in the third server information table. Further, the user can select a content disclosure range from the information registered in "LEVEL OF CONTENT DISCLOSURE RANGE" in the fourth server information table (see FIG. 8).

In the example shown in FIG. 3, the contents selectable by the user are five contents of content IDs "C-00001", C-00002", "C-00003", "C-00004", and "C-00005". Further, in the example shown in FIG. 7, the server devices 300 designatable by the user as recipient server devices are the server devices 300 of server IDs "S-001", "S-002", and "S-003".

Further, in the example shown in FIG. 8, the content disclosure range selectable by the user is one of "ALL", "FRIEND OF FRIEND", "FRIEND", "SPECIFIC FRIEND", and "NON-DISCLOSURE" in the server device 300 of server ID "S-001"; is one of "ALL", "FRIEND OF FRIEND", "FRIEND", "SPECIFIC FRIEND", and "NON-DISCLOSURE" in the server device 300 of server ID "S-002"; and is one of "ALL", "FRIEND OF FRIEND", "FRIEND", and "NON-DISCLOSURE" in the server device 300 of server ID "S-003".

Subsequently, in the case where an input of a predetermined user operation has not been detected (N in Step S105), the state detecting unit 104 performs the processing of Step S105 of detecting whether a predetermined user operation has been inputted through the input unit 101.

On the other hand, in the case where the state detecting unit 104 detects an input indicative of a predetermined user operation (Y in Step S105), the transmission time information managing unit 105 performs transmission time information determination processing (Step S106). The details of the transmission time information determination processing will be described later referring to FIG. 25.

Subsequently, the terminal content control unit 107 transmits, to the server device 300, the transmission time information in the transmission time information table generated by the transmission time information determination processing of Step S106, and the material of the content to be managed by the content accumulation unit 102 in association with each other (Step S107).

For instance, in the transmission time information table shown in FIG. 10, the content of content ID "C-00001" has the content disclosure range thereof set to "FRIEND", and is transmitted to the content receiving URL "http://api.s1.com/content" in the server device 300 of server ID "S-001". In transmission, the content of content ID "C-00001" is transmitted in such a manner that the storage path "132.124.123.1:80/data" in the terminal device 100, the content size "2.1 MB", the content photographing date and time "2012/4/7 14:33", and the content type "image" are transmitted in association with the content material.

In this example, in transmitting a content to the server device 300, the terminal content control unit 107 may execute a predetermined processing with respect to the content, based on the transmission time information registered in the transmission time information table shown in FIG. 10, and based on the server information registered in the third server information table shown in FIG. 7, and may transmit the processed content to the server device 300. According to the above configuration, for instance, in the case where the size of a content to be transmitted is larger than the content size limit registered in the third server information table shown in FIG. 7, the terminal content control unit 107 may compress the size of the content to a size not larger than the content size limit. By performing the above processing, it is possible to prevent transmission, to the server device 300, of a content of a size larger than the content size receivable by the server device 300. Thus, it is possible to avoid a possibility that a content of a size larger than the storage capacity of the server device 300 is transmitted to the server device 300, and to reduce a possibility that content transmission results in failure.

Subsequently, the receiving content accumulation unit 302 in the server device 300 accumulates the content material received from the terminal device 100, and the receiving content information managing unit 303 registers the transmission time information received from the terminal device 100 into the content information table (see FIG. 11) (Step S108). In registration, the receiving content information managing unit 303 registers a current date and time to be managed by the server device 300 into the content information table (see FIG. 11) as the content receiving date and time.

Examples of the current date and time to be managed by the server device 300 are a current date and time inputted by the user through the input unit 301 of the server device 300, and a current date and time acquired by the server device 300 via the network from another server device 300 which notifies the current date and time.

Subsequently, the operation history information managing unit 305 receives, through the input unit 301, an input indicative of a predetermined user operation with respect to a content which has been received from the terminal device 100, and whose sharing is permitted as defined in "CONTENT DISCLOSURE RANGE" of the content information table (see FIG. 11), and registers the received predetermined operation into the first operation history information tables (see FIGS. 12 to 14), as operation history information, in association with the input date and time of the predetermined operation, and the name of the user who performed the predetermined operation (Step S109).

For instance, in the content information table of the server device 300 shown in FIG. 11, the user whose input of a predetermined operation is permitted with respect to the content of content ID "C-00001" is the friend of the user "A" in accordance with the definition registered in "CONTENT DISCLOSURE RANGE".

In the content information table to be managed by the server device 300 shown in FIG. 11, the content of content ID "C-00001" is transmitted to the server device 300 of server ID "S-001" and is managed by the server device 300 of server ID "S-001. Accordingly, in this example, "FRIEND" in the content information table shown in FIG. 11 is the friend of the user "A" to be managed by the server device 300 of server ID "S-001".

In the example shown in FIG. 8, the user "B", the user "C", the user "D", the user "E", the user "F", the user "G", the user "H", the user "I", the user "J", and the user "K" are registered in the column "FRIEND NAME" of "USER RELATIONSHIP INFORMATION" of the server device 300 of server ID "S-001" in the fourth server information table. Accordingly, the users whose input of a predetermined operation with respect to the content of content ID "C-00001" is permitted are the user "B", the user "C", the user "D", the user "E", the user "F", the user "G", the user "H", the user "I", the user "J", and the user "K".

In the foregoing description, the user "A" himself or herself is eliminated from the users whose input of a predetermined operation with respect to a content is permitted. This is merely an example. The user "A" himself or herself may be included as a user whose input of a predetermined operation with respect to a content is permitted, regardless of the definition registered in "CONTENT DISCLOSURE RANGE" shown in FIG. 11.

Examples of the predetermined operation include an operation of inputting "LIKE", which means agreement with respect to a content, an operation of inputting a comment with respect to a content, an operation of browsing a content, and an operation of downloading a content. Specifically, concerning "LIKE", the receiving content information managing unit 303 registers the "LIKE" ID of "LIKE", an input date and time of "LIKE", and the name of the user who inputted "LIKE" into the first operation history information table concerning "LIKE" (see FIG. 12) as operation history information in association with each other.

Further, concerning a comment, the receiving content information managing unit 303 calculates the number of affirmative expressions and the number of negative expressions included in the comment, in addition to the comment ID of the comment, an input date and time of the comment, and the name of the user who inputted the comment by analyzing the text of the comment. Then, the receiving content information managing unit 303 registers these information into the first operation history information table concerning a comment (see FIG. 13) as operation history information in association with each other. Examples of the affirmative expressions are "like", "beautiful", "good", and "superb"; and examples of the negative expressions are "dislike", "kind of dislike", "bad", and "no way".

Further, concerning a browsing operation, the receiving content information managing unit 303 registers a browsing time in addition to the browsing ID identifying browsing of the content, a browsing date and time when the content has been browsed, and the name of the user who browsed the content into the first operation history information table concerning browsing (see FIG. 14) as operation history information in association with each other.

Concerning a download operation, the receiving content information managing unit 303 registers the download ID identifying downloading of the content, a download date and time when the content was downloaded, and the name of the user who downloaded the content into the first operation history information concerning downloading (see FIG. 15) as operation history information in association with each other.

Examples of the user operation history information to be managed by the operation history information managing unit 305 are an input operation of "LIKE", an input operation of a comment, a browsing operation, and a download operation. The operation history information is not limited to the above.

Further, a predetermined operation to be accumulated by the operation history information managing unit 305 as operation history information is inputted by the user through a browser or an application activated in the plural operation unit devices 400. An example of the input screen indicative of user operation and to be displayed by the browser or the application is the input screen shown in FIG. 2.

Subsequently, the control information generating unit 306 performs control information generation processing (Step S110). The details of the control information generation processing will be described later referring to FIG. 26.

Subsequently, the content control unit 307 of the server device 300 transmits, to the terminal device 100, the information registered in the control information table generated by the control information generation processing of Step S110 (Step S111).

Subsequently, the terminal content control unit 107 of the terminal device 100 receives the control information transmitted from the content control unit 307 of the server device 300 (Step S112).

Subsequently, the terminal content control unit 107 checks whether the terminal device 100 has a content to be controlled as defined by the received control information (Step S113). In the case where there is no content to be controlled (N in Step S113), the content processing is finished. On the other hand, in the case where there is a content to be controlled (Y in Step S113), the terminal content control unit 107 controls the content to be managed by the terminal device 100 in accordance with the control contents defined by the received control information, and controls the content to be managed by the terminal device 100 (Step S114). Thus, the first content processing is finished.

For instance, let it be assumed that the terminal device 100 has received the control information of control information ID "O-00001", which is registered in the control information table shown in FIG. 19. In this case, the terminal content control unit 107 checks whether there is the content of content ID "C-00001" in "132.124.123.1:80/data", which is registered in "STORAGE PATH IN TERMINAL DEVICE". In the case where there is such a content, the terminal control unit 107 validates the content protecting function with respect to the content.

In the following, a flow of the transmission time information determination processing shown in Step S106 is described referring to FIG. 25.

First of all, the transmission time information managing unit 105 extracts the content ID of a content to be shared, the server ID of a server device 300 as a recipient, and the disclosure range of the content, which have been inputted by the user through the input unit 101 and detected by the state detecting unit 104, (Step S201).

For instance, let it be assumed that the user "A" has selected the content of content ID "C-00001" as a content to be shared through the application installed in the terminal device 100, has selected the server device 300 of server ID "S-001" as a content recipient server device 300, and has selected "FRIEND" as the content disclosure range in the server device 300.

In the above case, in Step S201, content ID "C-00001" is extracted, server ID "S-001" is extracted, and the content disclosure range "FRIEND" is extracted. In this example, it is assumed that the user "A" himself or herself has selected all the information i.e. a content to be shared between the server devices 300, a server device 300 as a content recipient, and a content disclosure range. This is merely an example. The user "A" does not have to select all the information, and does not have to select one of the information. In the above configuration, a predetermined value may be set to the information that has not been selected by the user "A".

Further, a content to be transmitted may be automatically determined by the transmission time information managing unit 105, based on the first content information table to be managed by the terminal device 100 shown in FIG. 3, without relying on user selection. For instance, the transmission time information managing unit 105 may determine contents of a predetermined number as a content to be transmitted in the descending order of "SIZE" registered in the first content information table shown in FIG. 3. Alternatively, the transmission time information managing unit 105 may determine contents of a predetermined number as a content to be transmitted in the order from an oldest date and time to a latest date and time of "PHOTOGRAPHING DATE AND TIME" registered in the first content information table shown in FIG. 3.

Specifically, the transmission time information managing unit 105 selects the content of content ID "C-00003" whose size is 4.7 MB i.e. largest as a content to be transmitted, or selects the content of content ID "C-00001" whose photographing date and time is 2012/4/7 14:33 i.e. oldest as a content to be transmitted.

Further, the transmission time information managing unit 105 may determine a content to be transmitted, based on the first content information table shown in FIG. 3 and based on the third server information table shown in FIG. 7, without relying on user selection.

For instance, the transmission time information managing unit 105 can determine a content to be transmitted in the descending order of "SIZE" registered in the first content information table to be managed by the terminal device 100 shown in FIG. 3 from a largest size, as far as the largest size does not exceed "CONTENT SIZE LIMIT" registered in the third server information table shown in FIG. 7.

Specifically, in the case where the content recipient is the server device 300 of server ID "S—003", 3 MB is registered in "CONTENT SIZE LIMIT". Accordingly, the transmission time information managing unit 105 selects as a content to be transmitted the content of content ID "C-00002" whose size is 2.5 MB i.e. largest but not larger than 3 MB.

Further, the transmission time information managing unit 105 may automatically determine the server device 300 as a content recipient, based on the third server information table shown in FIG. 7, without relying on user selection. For instance, the transmission time information managing unit 105 may determine the server device 300 as a recipient in the descending order of a value registered in "CONTENT SIZE LIMIT" in the third server information table shown in FIG. 7. Alternatively, the transmission time information managing unit 105 may determine the server device 300 as a recipient in the descending order of "REMAINING CAPACITY" registered in the third server information table shown in FIG. 7.

Specifically, the transmission time information managing unit 105 may select the server device 300 of server ID "S-002" whose "CONTENT SIZE LIMIT" registered in the third server information table is largest i.e. 10 MB. Alternatively, the transmission time information managing unit 105 may select the server device 300 of server ID "S-002", whose "REMAINING CAPACITY" registered in the third server information table is unlimited and accordingly largest.

Alternatively, the transmission time information managing unit 105 may automatically determine the server device 300 as a content recipient, based on the fourth server information table shown in FIG. 8, without relying on user operation. For instance, the transmission time information managing unit 105 may determine the server device 300 as a content recipient in the descending order of "FRIEND NUMBER" in "USER RELATIONSHIP INFORMATION" registered in the fourth server information table shown in FIG. 8. Specifically, the transmission time information managing unit 105 may select, as a recipient server device 300, the server device 300 of server ID "S-001" whose "FRIEND NUMBER" is ten i.e. largest in the fourth server information table.

Subsequently, the transmission time information managing unit 105 extracts, from the first content information table, the content information of the content ID extracted in Step S201, and registers the extracted content information into the transmission time information table (see FIG. 10) (Step S202). In the example shown in FIG. 3, the content information to be extracted is "STORAGE PATH IN TERMINAL DEVICE", "SIZE", "PHOTOGRAPHING DATE AND TIME", and "CONTENT TYPE". Specifically, in Step S201, let it be assumed that the transmission time information managing unit 105 has extracted content ID "C-00001". Then, in the example shown in FIG. 3, the transmission time information managing unit 105 extracts "132.124.123.1:80/data" as "STORAGE PATH IN TERMINAL DEVICE", extracts 2.1 MB as "SIZE", extracts 2012/4/7 14:33 as "PHOTOGRAPHING DATE AND TIME", and extracts image as "CONTENT TYPE". Then, the transmission time information managing unit 105 registers the extracted information relating to content ID "C-00001" into the transmission time information table (see FIG. 10) in association with the content ID.

Subsequently, the transmission time information managing unit 105 extracts the server information of the server ID extracted in Step S201 from the third server information table (see FIG. 7), and registers the extracted server information into the transmission time information table (Step S203).

In the example shown in FIG. 7, the server information includes "CONTENT RECEIVING URL OF SERVER DEVICE". Specifically, let it be assumed that the transmission time information managing unit 105 has extracted "S-001" as the server ID. Then, the transmission time information managing unit 105 extracts "http://api.s1/com/content" as the content receiving URL of the server device 300 from the third server information table shown in FIG. 7, and registers the extracted information into the transmission time information table in association with server ID "S-001".

Subsequently, the transmission time information managing unit 105 registers information "CONTENT DISCLOSURE RANGE" extracted in Step S201 into the transmission time information table as a content disclosure range (Step S204). Specifically, in the case where "FRIEND" is extracted as "CONTENT DISCLOSURE RANGE" in Step S201, the transmission time information managing unit 105 registers "FRIEND" into "CONTENT DISCLOSURE RANGE" of the transmission time information table (see FIG. 10).

Subsequently, the transmission time information managing unit 105 registers a current date and time to be managed by the terminal device 100 into the transmission time information table as the transmission date and time of the content (Step S205), and finishes the transmission time information determination processing. Examples of the current date and time are a date and time inputted by the user through the input unit 101 of the terminal device 100, and a date and time received by the terminal device 100 via the network 200 from the server device 300 which notifies the date and time.

In the example shown in FIG. 10, transmission time information determination processing of the content of content ID "C-00001" has been performed on 2012/5/1/ 17:00. Accordingly, the information 2012/5/1 17:00 is registered in "TRANSMISSION DATE AND TIME". Further, in the example of the transmission time information table shown in FIG. 10, the dates and times when the transmission time information determination processing has been performed with respect to the content of content ID "C-00002" and the content of content ID "C-00005" are also registered in "TRANSMISSION DATE AND TIME".

In the following, a flow of the control information generation processing to be performed by the control information generating unit 306 shown in Step S110 is described referring to FIG. 26. In this example, a content of which control information is generated is the content of content ID "C-00001" in the server device 300 of server ID "S-001".

First of all, the control information generating unit 306 extracts "RECEIVING DATE AND TIME" registered in the content information table (see FIG. 11) to be managed by the server device 300 with respect to a content of which control information is generated, a predetermined period from the receiving date and time is set as an evaluation period, and the evaluation period is registered into the first evaluation period information table (Step S301). Specifically, first of all, the control information generating unit 306 extracts the information 2012/5/1/ 17:00, as "RECEIVING DATE AND TIME" registered in the content information table shown in FIG. 11 with respect to the content of content ID "C-00001".

Subsequently, if the predetermined period from the extracted "RECEIVING DATE AND TIME" is one week, the control information generating unit 306 sets a period of one week from 2012/5/1 17:00 (in other words, a period from 2012/5/1 17:00 to 2012/5/8 17:00) as the evaluation period, and registers the set evaluation period into the first evaluation period information table together with the evaluation period ID. In the example shown in FIG. 16, the evaluation period of the content of content ID "C-00001" in the server device 300 of server ID "S-001" is from 2012/5/1 17:00 to 2012/5/8 17:00, and the evaluation period is registered in association with evaluation period ID "V1".

In this example, the evaluation period is one week. Alternatively, the evaluation period may be any predetermined value such as one day or one month.

Further, in this example, a predetermined period from a receiving date and time is set as an evaluation period. The evaluation period setting method is not limited to the above. For instance, a predetermined period after lapse of a predetermined period from a receiving date and time may be set as an evaluation period. For instance, if one week after lapse of one week from 2012/5/1 17:00, which is the date and time when the content of content ID "C-00001" was received, is set as an evaluation period, the control information generating unit 306 sets the period from 2012/5/8 17:00 to 2012/5/15 17:00 as the evaluation period. By performing the above control, it is possible to determine whether the content is of high interest between the users, even after lapse of a predetermined period from the date and time when the content was received.

Subsequently, the control information generating unit 306 checks whether the evaluation period registered in the first evaluation period information table shown in FIG. 16 is over, with use of the current date and time to be managed by the server device 300 (Step S302). In the case where the evaluation period is not over (N in Step S302), the control information generating unit 306 returns the processing to Step S302. In other words, the control information generating unit 306 performs the processing of Step S113 of checking whether the evaluation period registered in the first evaluation period information table shown FIG. 16 is over, with use of the current date and time to be managed by the server device 300. On the other hand, in the case where the evaluation period is over (Y in Step S302), the control information generating unit 306 extracts, from the operation history information registered in the first operation history information tables shown in FIGS. 12 to 15, the operation history information inputted with respect to the content during the evaluation period, and registers the extracted operation history information into the second operation history information table (Step S303).

In the example shown in FIG. 16, the evaluation period of the content of content ID "C-00001" in the server device 300 of server ID "S-001" is from 2012/5/1 17:00 to 2012/5/8 17:00. Further, in the first operation history information table shown in FIG. 12, the user operation history information concerning "LIKE", which has been inputted with respect to the content of content ID "C-00001" is accumulated in the order from an oldest input date and time to a latest input date and time i.e. in the order of "L-P10001", "L-P10002", "L-P10003", "L-P10004", "L-P10005", and "L-P10006" in terms of "LIKE" IDs.

Accordingly, the control information generating unit 306 extracts, from these operation history information, the operation history information to be included in the evaluation period of evaluation ID "V1" i.e. from 2012/5/1 17:00 to 2012/5/8 17:00, referring to "INPUT DATE AND TIME" registered in the first operation history information table shown in FIG. 12. Specifically, the control information generating unit 306 extracts operation history information concerning five "LIKEs", namely, from "LIKE" having "LIKE" ID "L-P1001", which has been inputted on 2012/5/1 17:10 to "LIKE" having "LIKE" ID "L-P1005", which has been inputted on 2012/5/8 14:12.

Subsequently, the control information generating unit 306 registers the extracted operation history information concerning "LIKE" into the second operation history information table (see FIG. 17) in association with the server ID, the content ID, the evaluation period ID, the "LIKE" ID, and the input user name of "LIKE". In this example, only the operation history information concerning "LIKE", which has been registered in the first operation history information table shown in FIG. 12, is registered in the second operation history information table. This is merely an example. The control information generating unit 306 may extract other operation history information to be included in the evaluation period, such as a comment, a browsing operation, and a download operation shown in FIGS. 13 to 15 substantially in the same manner as the operation history information concerning "LIKE", and may register the extracted operation history information into the second operation history information table (see FIG. 17).

Subsequently, the control information generating unit 306 calculates the sum of the contents during each of the evaluation periods of the operation history information registered in the second operation history information table (see FIG. 17), and registers the calculation result into an accumulated operation history information table (Step S304). Specifically, the control information generating unit 306 calculates the sum of the pieces of operation history information or the sum of the browsing times concerning each of "LIKE", a comment, a browsing operation, and a download operation, which are registered in the second operation history information table, and registers the calculated sum into the accumulated operation history information table (see FIG. 18).

In the example of the second operation history information table shown in FIG. 17, the operation history information concerning "LIKE" of "LIKE" IDs "L-P10001", "L-P10002", "L-P10003", "L-P10004", and "L-P10005" during the evaluation period of evaluation ID "V1" of the content of content ID "C-00001" is registered. Accordingly, the control information generating unit 306 calculates the sum of "LIKEs" during the evaluation period of evaluation period ID "V1" of the content of content ID "C-00001" as "5", and registers the value "5" into the corresponding column in the accumulated operation history information table (see FIG. 18).

In this example, only the sum of the pieces of operation history information concerning "LIKE" registered in the second operation history information table shown in FIG. 17 is registered in the accumulated operation history information table. This is merely an example. The control information generating unit 306 may calculate the sum of the pieces of other operation history information such as a comment, a browsing operation, and a download operation substantially in the same manner as the operation history information concerning "LIKE", using the second operation history information table, and may register the calculated sum into the accumulated operation history information table.

Further, in calculating the sum of the pieces of operation history information registered in the second operation history information table shown in FIG. 17, the sum is calculated by simply adding the number of the pieces of operation history information or a browsing time, regardless of the type of the user who inputted the operation history information. This is merely an example. For instance, the control information generating unit 306 may calculate the sum by performing a weighting operation on the operation history information in accordance with the user who inputted the operation history information.

Specifically, the control information generating unit 306 calculates the sum by performing a predetermined weighting operation on operation history information of a friend whose degree of intimacy with the user "A" who owns the terminal device 100 is not smaller than a predetermined threshold value, or on operation history information of a specific user set in advance by the user "A". The following is a detailed example, in which the sum is calculated by performing a weighting operation on operation history information in accordance with the input user name.

In the example of the second operation history information table shown in FIG. 17, the users who inputted "LIKE" with respect to the content of content ID "C-00001" during the evaluation period of evaluation period ID "V1" in the server device 300 of server ID "S-001" are five users i.e. the user "B", the user "E", the user "G", the user "I", and the user "J". Further, the degrees of intimacy between the user "A", and each one of the five friends are respectively "2.2", "1.5", "2.7", "0.8", and "1.1" from the friend intimacy table shown in FIG. 6. In this example, let it be assumed that the threshold value of the degree of intimacy is 1.5. Then, the friends whose degree of intimacy is not smaller than 1.5 are the user "B", the user "E", and the user "G". In this case, the control information generating unit 306 calculates the sum of the pieces of operation history information by performing a predetermined weighting operation on these three friends. Specifically, the control information generating unit 306 may calculate the sum by multiplying a predetermined value (e.g. 2) with the number of pieces of corresponding operation history information or with a browsing time. The following is a detailed example.

(Sum of "LIKEs" during evaluation period of evaluation ID "V1" with respect to content of content ID "C-00001" in server device of server ID "S-001")

=2×(number of "LIKEs" of user "B")+2×(number of "LIKEs" of user "E")+2×(number of "LIKEs" of user "G")+(number of "LIKEs" of user "I")+(number of "LIKEs" of user "J")=8

Likewise, the sum of "LIKEs" during the evaluation period of evaluation period ID "V3" with respect to the content of content ID "C-00005" in the server device of server ID "S-001" is calculated as follows. The number of users who inputted "LIKE" are five i.e. the user "C", the user "D", the user "E", the user "F", and the user "I". The friend whose degree of intimacy is not smaller than the threshold value (=1.5) is only one i.e. the user "E" from the friend intimacy table shown in FIG. 6. Accordingly, a weighting operation is performed only on the operation history information concerning "LIKE" by the user "E", and the sum of "LIKEs" after the weighting operation is 6.

In this example, a weighting operation is performed on the operation history information of a friend whose degree of intimacy with the user "A" who owns the terminal device 100 is not smaller than a predetermined threshold value. Alternatively, the user of which a weighting operation is performed with respect to operation history information may be a friend specified by the user "A" in advance.

As described above, in the case where the sum is calculated without performing a weighting operation, the sum of "LIKEs" during the evaluation period of evaluation period ID "V1", and the sum of "LIKEs" during the evaluation period of evaluation period ID "V3" are both "5". On the other hand, in the case where the sum is calculated by performing a weighting operation on operation history information in accordance with the input user name, the sum of "LIKEs" during the evaluation period of evaluation period ID "V1" is "8", and the sum of "LIKEs" during the evaluation period of evaluation period ID "V3" is "6". In this way, by performing a weighting operation on operation history information, it is possible to increase the sum of the pieces of operation history information, as the number of friends having a high degree of intimacy with the user "A" who owns the terminal device 100 increases, out of the users who performed an input operation with respect to a content.

Subsequently, the control information generating unit 306 calculates an evaluation value of a content, based on the operation history information registered in the accumulated operation history information table (see FIG. 18) (Step S305). In the embodiment, a content of interest between the users is a content, in which a large amount of operation history information from the users is accumulated during a predetermined period, out of the contents to be managed by the server device 300. This is based on the idea that a content of which an input operation by the users such as friends has been frequently performed should be or may be a content of interest between the friends, and a content having a large number of pieces of operation history information should be or may be a content of interest among many friends. In view of the above, the evaluation value of a content is calculated by a computational algorithm, in which a content having a large sum registered in the accumulated operation history information table (see FIG. 18) is determined to be a content of high interest between the users, and accordingly, the evaluation value of the content is set to be high.

The following is a detailed example of content evaluation value calculation processing, with use of the operation history information registered in the accumulated operation history information table shown in FIG. 18. In the accumulated operation history information table shown in FIG. 18, there are registered the number of "LIKEs", the number of comments, the number of affirmative expressions, the number of negative expressions, the number of times of browsing operations, a browsing time, and the number of times of download operations. The following is some examples of the computational algorithm, in which a content having a large sum registered in the accumulated operation history information table is determined to be a content whose evaluation value is high.

For instance, there is proposed a computational algorithm, in which the evaluation value of a content is added by "1.0", each time the number of "LIKEs", the number of comments, the number of affirmative expressions, the number of times of browsing operations, and the number of times of download operations are incremented by one; the evaluation of a content is added by "0.01", each time the browsing time is incremented by one second; and the evaluation value of a content is subtracted by "1.0", each time the number of negative expressions is incremented by one.

For instance, the control information generating unit 306 calculates the evaluation value of the content of content ID "C-00001" during the evaluation period of evaluation period ID "V1" shown in FIG. 18 as follows.

(Evaluation value of content of content ID "C-00001" during evaluation period of evaluation period ID "V1")
=(evaluation value of content by number of "LIKEs" with respect to content of content ID "C-00001" during evaluation period of evaluation period ID "V1")+(evaluation value of content by number of comments with respect to content of content ID "C-00001" during evaluation period of evaluation period ID "V1")+(evaluation value of content by number of affirmative expressions with respect to content of content ID "C-00001" during evaluation period of evaluation period ID "V1")+(evaluation value of content by number of negative expressions with respect to content of content ID "C-00001" during evaluation period of evaluation period ID "V1")+(evaluation value of content by number of times of browsing operations of content of content ID "C-00001" during evaluation period of evaluation period ID "V1")+(evaluation value of content by browsing time of content of content ID "C-00001" during evaluation period of evaluation period ID "V1")+(evaluation value of content by number of times of download operations of content of content ID "C-00001" during evaluation period of evaluation period ID "V1")
$=(1.0 \times 5)+(1.0 \times 12)+(1.0 \times 6)+(-1.0 \times 0)+(1.0 \times 24)+(0.01 \times 1690)+(1.0 \times 4)=67.9$ Likewise, the evaluation value of the content of content ID "C-00002" during the evaluation period of evaluation period ID "V2" shown in FIG. 18 is calculated as follows.

(evaluation value of content of content ID "C-00002" during evaluation period of evaluation period ID "V2")
$=(1.0 \times 1)+(1.0 \times 2)+(1.0 \times 0)+(-1.0 \times 1)+(1.0 \times 8)+(0.01 \times 281)+(1.0 \times 0)=12.81$ Likewise, the evaluation value of the content of content ID "C-00005" during the evaluation period of evaluation period ID "V3" shown in FIG. 18 is calculated as follows.

(evaluation value of content of content ID "C-00005" during evaluation period of evaluation period ID "V3")
$=(1.0 \times 5)+(1.0 \times 7) \pm (1.0 \times 3)+(-1.0 \times 1)+(1.0 \times 16)+(0.01 \times 932)+(1.0 \times 1)=40.32$ In this example, a content evaluation value is uniformly added with respect to operation history information i.e. the number of "LIKEs", the number of comments, the number of affirmative expressions, the number of times of browsing operations, and the number of times of download operations. This is merely an example. For instance, the control information generating unit 306 may change the content evaluation value to be added in accordance with a degree of importance of operation history information. Likewise, the control information generating unit 306 may change the content evaluation value to be added or subtracted to or from the number of negative expressions and the browsing time in accordance with a degree of importance of operation history information.

Specifically, the control information generating unit 306 may add the content evaluation value by "1.0", each time the number of affirmative expressions is incremented by one; may add the content evaluation value by "0.7", each time the number of comments is incremented by one; may add the content evaluation value by "0.5", each time the number of "LIKEs" is incremented by one; may add the content evaluation value by "0.3", each time the number of times of download operations is incremented by one; may add the content evaluation time by "0.1", each time the number of times of browsing operations is incremented by one; may subtract the content evaluation value by "2.0", each time the number of negative expressions is incremented by one; and may add the content evaluation value by "0.01", each time the browsing time is incremented by one second.

Further, in this example, there is described a content evaluation value calculation method by utilizing all the pieces of operation history information registered in the accumulated operation history information table. The embodiment is not limited to the above. For instance, the control information generating unit 306 may calculate a content evaluation value by utilizing only the operation history information of a predetermined kind such as the number of "LIKEs" and the number of comments, out of the operation history information.

Further, in this example, there is described a content evaluation value calculation method by adding or subtracting the sum registered in the accumulated operation history information table. This is merely an example. For instance, the control infoi tation generating unit 306 may calculate the sum registered in the accumulated operation history information table, with use of other arithmetic method such as multiplication or division.

Further, in this example, there is described a content evaluation value calculation method by using the sum registered in the accumulated operation history information table. For instance, as far as the input user name in the second operation history information table shown in FIG. 17 includes a predetermined user name, the control information generating unit 306 may set a predetermined value such as "100" as the evaluation value of a content. Alternatively, the control information generating unit 306 may calculate the evaluation value of a content not only based on the sum registered in the accumulated operation history information table but also based on the content photographing date and time registered in the content information table (see FIG. 11) to be managed by the server device 300, the content receiving date and time in the server device 300, and the latest date and time in the evaluation period.

Specifically, the control information generating unit 306 may calculate the evaluation value of a content by a computational algorithm, in which if a difference between the content photographing date and time in the content information table and the latest date and time in the evaluation period is "sixth months", the content evaluation value is subtracted by "10.0"; and if the difference is "twelve months", the content evaluation value is subtracted by "20.0". This is based on the idea that the user may be less interested in the content, as the difference between the content photographing date and time registered in the content information table and the latest date and time in the evaluation period increases.

Subsequently, the control information generating unit 306 generates control information to be applied to a content, based on the content evaluation value calculated in Step S305, registers the control information into the control information table (Step S306), and finishes the control information generation processing.

Specifically, first of all, the control information generating unit 306 extracts, from the content information table to be managed by the server device 300 shown in FIG. 11, "CONTENT ID" and "STORAGE PATH IN TERMINAL DEVICE" of the content whose evaluation value has been calculated in Step S305, and registers the extracted information into the control information table (see FIG. 19) in association with the control information ID. Subsequently, the control information generating unit 306 generates control information to be applied to the content in accordance with the content evaluation value calculated in Step S305, and registers the control information into the control information table (see FIG. 19).

In this embodiment, the control information is defined such that a content having a large evaluation value is a content of interest between the users. Accordingly, a content having a high evaluation value is stored in the terminal device 100 so that the users can browse the content of interest between the users at any time. On the other hand, a content having a low evaluation value is deleted from the terminal device 100 based on the idea that a content having a low evaluation value is a content of less interest between the users so as to reduce the capacity of contents to be accumulated in the terminal device 100. The control information generating unit 306 calculates the evaluation value of a content and generates control information, based on the above idea.

The following is some examples of the control information generation method. For instance, in the case where the evaluation value of a content is smaller than 30, the control information generating unit 306 generates control information having the control contents "DELETE"; in the case where the evaluation value of a content is not larger than 30 but smaller than 60, the control information generating unit 306 generates control information having the control contents "DO NOTHING"; and in the case where the evaluation value of a content is not smaller than 60, the control information generating unit 306 generates control information having the control contents "VALIDATE CONTENT PROTECTING FUNCTION". In this example, the content protecting function is a function of blocking receiving an input operation of deleting a content so as to prevent inadvertent deletion of a content.

In the following, the control information generation method is described with use of the content of content ID "C-00001" during the evaluation period of evaluation period ID "V1", the content of content ID "C-00002" during the evaluation period of evaluation period ID "V2", and the content of content ID "C-00005" during the evaluation period of evaluation period ID "V3". The evaluation value of the content of content ID "C-00001" during the evaluation period of evaluation period ID "V1" is "67.9". Accordingly, in this case, the control information generating unit 306 generates control information having the control contents "VALIDATE CONTENT PROTECTING FUNCTION". Further, the evaluation value of the content of content ID "C-00002" during the evaluation period of evaluation period ID "V2" is "12.81". Accordingly, in this case, the control information generating unit 306 generates control information having the control contents "DELETE". Further, the evaluation value of the content of content ID "C-00005" during the evaluation period of evaluation period ID "V3" is "40.32". Accordingly, in this case, the control information generating unit 306 generates control information having the control contents "DO NOTHING". Then, the control information generating unit 306 registers these control information into the control information table (see FIG. 19).

In this example, as a control information generation method, one of the control contents "VALIDATE CONTENT PROTECTING FUNCTION", "DO NOTHING", and "DELETE" is determined in accordance with the evaluation value of a content. The embodiment is not limited to the above. For instance, the control information generating unit 306 may generate control information in such a manner that a content is compressed based on the idea that a high compression ratio is applied to a content having a high content evaluation value, and that a content is compressed based on the idea that a low compression ratio is applied to a content having a low content evaluation value.

For instance, the control information generating unit 306 determines a compression ratio as follows. In the case where the evaluation value of a content is smaller than 10, the compression ratio is set to "10%". In the case where the evaluation value of a content is not smaller than 10 but smaller than 20, the compression ratio is set to "20%". In the case where the evaluation value of a content is not smaller than 20 but smaller than 30, the compression ratio is set to "30%". In the case where the evaluation value of a content is not smaller than 30 but smaller than 40, the compression ratio is set to "40%". In the case where the evaluation value of a content is not smaller than 40 but smaller than 50, the compression ratio is set to "50%". In the case where the evaluation value of a content is not smaller than 50 but smaller than 60, the compression ratio is set to "60%". In the case where the evaluation value of a content is not smaller than 60 but smaller than 70, the compression ratio is set to "70%". In the case where the evaluation value of a content is not smaller than 70 but smaller than 80, the compression ratio is set to "80%". In the case where the evaluation value of a content is not smaller than 80 but smaller than 90, the compression ratio is set to "90%". In the case where the evaluation value of a content is not smaller than 90, the compression ratio is set to "100%". Then, the terminal content control unit 107 may compress the content, based on the determined compression ratio.

The aforementioned control information generation method is based on the idea that a content having a high evaluation value between the users is a content of interest between the users, and accordingly, the size of the content should be retained unchanged; whereas a content having a low evaluation value between the users is a content of less interest between the users, and accordingly, the content is compressed to reduce the content capacity of the teiniinal device 100.

In the following, the control information generation method is described with use of the content of content ID "C-0001" during the evaluation period of evaluation period ID "V1", the content of content ID "C-00002" during the evaluation period of evaluation period ID "V2", and the content of content ID "C-00005" during the evaluation period ID "V3".

The evaluation value of the content of content ID "C-00001" during the evaluation period of evaluation period ID "V1" is "67.9". Accordingly, the control information generating unit 306 sets the compression ratio to "70%", and generates control information having the control contents "COMPRESS TO 70%". Further, the evaluation value of the content of content ID "C-00002" during the evaluation period of evaluation period ID "V2" is "12.81". Accordingly, the control information generating unit 306 sets the compression ratio to "20%", and generates control information having the control contents "COMPRESS TO 20%". Further, the evaluation value of the content of content ID "C-00005" during the evaluation period of evaluation period ID "V3" is "40.32". Accordingly, the control information generating unit 306 sets the compression ratio to "50%", and generates control information having the control contents "COMPRESS TO 50%". Then, the control information generating unit 306 registers these control information into the control information table (see FIG. 19).

Figure 25:
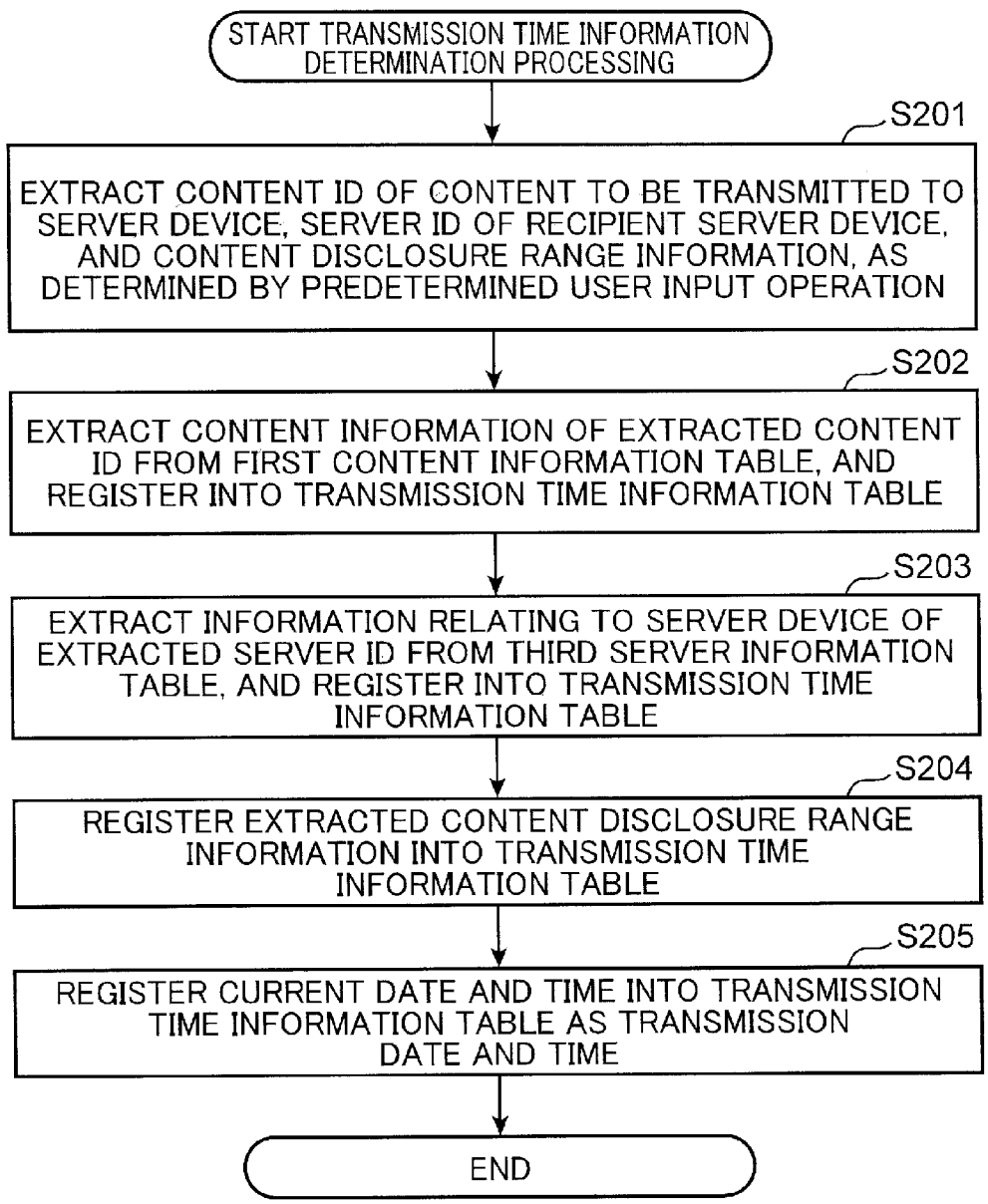
FIG. 25 is a flowchart showing a flow of transmission time information determination processing in the first embodiment.
Figure 26:
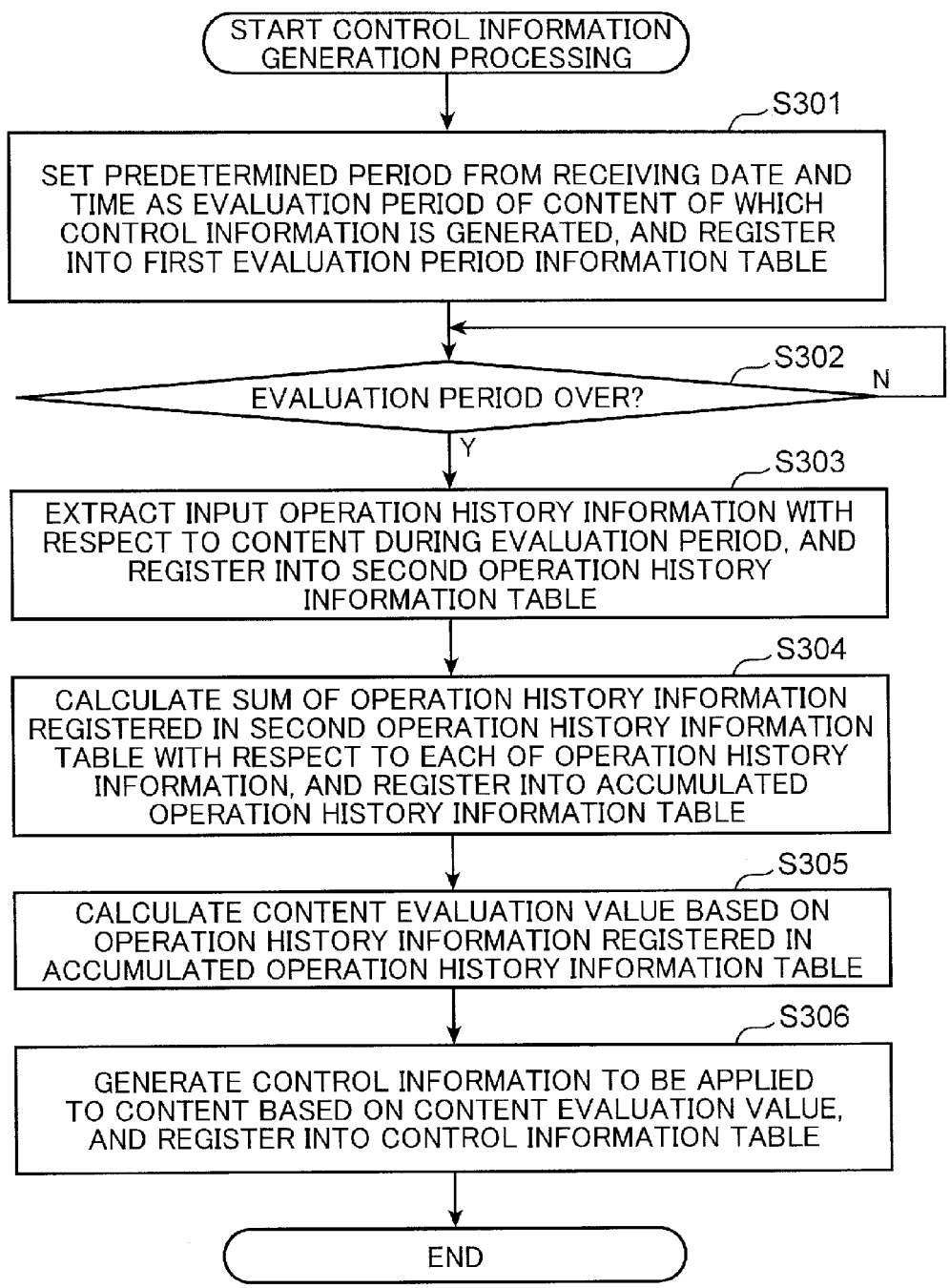
FIG. 26 is a flowchart showing a flow of control information generation processing in the first embodiment.

The foregoing is the description about the detailed operation of the first content processing shown in FIG. 22 with reference to FIGS. 24 to 26. The detailed operation of the first content processing is not limited to the above example. In the example shown in FIG. 22, a content specified by the control information is deleted from the contents accumulated in the terminal device 100. Alternatively, predetermined information may be added to these contents, without deleting a content specified by the control information.

For instance, the content control unit 307 may determine, as the control information, control information indicating "manage the recipient server ID to be managed in the transmission time information table in association with a content", regardless of the evaluation value of a content, and may transmit the recipient server ID and the control information to the terminal device 100 in association with each other in Step S111. In this case, the terminal device 100 may manage the service name (e.g. "S1" or "S2") or a logo image of a service, which is uniquely determined by the server ID. By the above configuration, the user can know which content is shared between the server devices 300, out of the contents to be managed by the terminal device 100, and the service name under which the content is shared, with use of a content management application of the terminal device 100.

Figure 27:
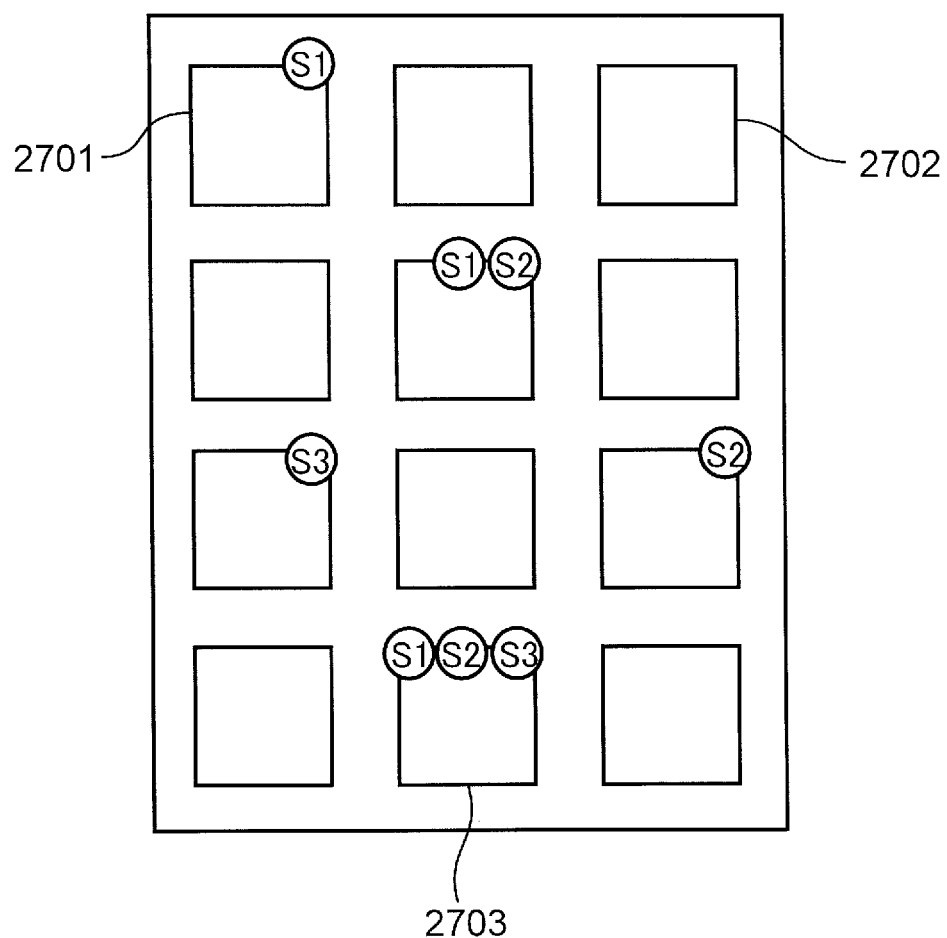
FIG. 27 is a diagram showing an example of first content browsing screen with use of a content management application of the terminal device in the first embodiment.

FIG. 27 is a diagram showing an example of a first content browsing screen with use of the content management application of the terminal device 100 in the first embodiment. FIG. 27 shows an example of a screen to be displayed in the case where a part of the contents in the terminal device 100 is transmitted to a part or all of the services "S1", "S2", and "S3" to be managed by server devices 300 of three kinds. A logo image representing a recipient service is superimposed on a content which has been transmitted to one or more services, and a logo image is not superimposed on a content which has not been transmitted to any of the services. For instance, the logo image of "S1" is superimposed and displayed on a content 2701 on the upper left corner of the screen. This shows that the content 2701 has been transmitted to the service "S1". Further, a logo image is not superimposed on a content 2702 on the upper right corner of the screen. This shows that the content 2702 has not been transmitted to any of the services. The logo images of "S1", "S2", and "S3" are superimposed on a content 2703 in the middle of the lowermost part of the screen. This shows that the content 2703 has been transmitted to the service "S1", the service "S2", and the service "S3".

Further, the control information generating unit 306 generates control information having the control contents "manage the sum with respect to a content registered in the accumulated operation history information table in association with the content", regardless of the evaluation value of a content. In Step S111, the content control unit 307 may transmit to the terminal device 100 the sum with respect to a content registered in the accumulated operation history information table and control information in association with each other. By performing the above control, it is possible to check user input operation with respect to each of the contents transmitted to the server device 300 during a predetermined period, out of the contents to be managed by the terminal device 100, with use of the content management application of the terminal device 100.

Further, for instance, the control information generating unit 306 may determine control information having the control contents "manage information indicative of a deletion candidate in association with a content", and in Step S111, the content control unit 307 may transmit to the terminal device 100 the information indicative of a deletion candidate and the control information in association with each other. In the above configuration, the terminal device 100 may store in advance a logo image (e.g. "x" mark) indicative of a deletion candidate. By performing the above control, in the case where a content is deleted with use of the content management application of the terminal device 100, the user can check which content should be deleted, out of the contents to be managed by the terminal device 100, and can delete the content at an intended timing.

The following is a description about an example of a content browsing screen with use of the content management application of the terminal device 100 with reference to FIGS. 28 to 32.

Figure 28:
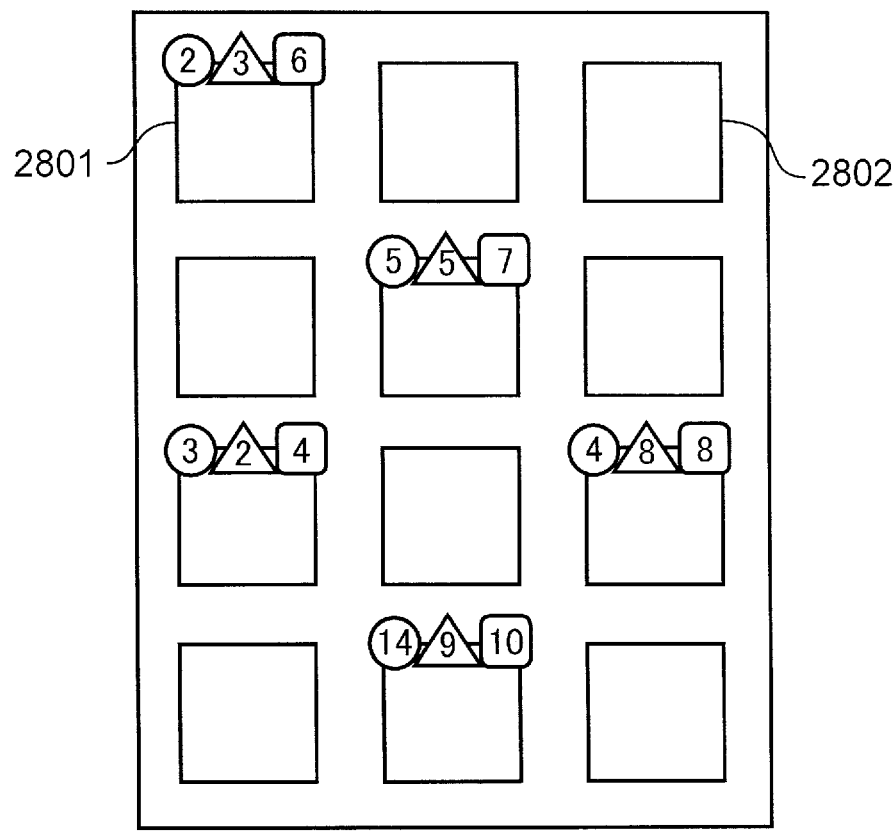
FIG. 28 is a diagram showing an example of a second content browsing screen with use of the content management application of the terminal device in the first embodiment.

FIG. 28 is a diagram showing an example of a second content browsing screen with use of the content management application of the terminal device 100 in the first embodiment. In this example, a part of the contents accumulated in the terminal device 100 is transmitted to one or more server devices 300. The sum of the numbers of "LIKEs", the sum of the numbers of comments, and the sum of the numbers of times of download operations, which are registered in a predetermined evaluation period of the accumulated operation history information table, are respectively indicated within the marks of circle, triangle, and square. One of the marks of circle, triangle, and square is superimposed on a content which has been transmitted to one or more server devices 300, and no mark is superimposed on a content which has not been transmitted to any of the services. For instance, a circle mark with the number "2" therein, a triangle mark with the number "3" therein, and a square mark with the number "6" therein are superimposed on a content 2801 on the upper left corner of the screen. This means that the sum of the numbers of "LIKEs" is "2", the sum of the numbers of comments is "3", and the sum of the numbers of times of download operations is "6". No mark is superimposed on a content 2802 on the upper right corner of the screen. Accordingly, no content has been transmitted to the server device 300. As described above, as shown in the example of FIG. 28, the embodiment makes it possible for the user to identify which content has been transmitted to the server device 300, out of the contents accumulated in the terminal device 100 by the presence or absence of mark. Further, the embodiment also makes it possible for the user to identify the kind of operation received by the server device 300 with respect to a content, by the shape of the mark, and to check the number of times of operations conducted by the user, by the number displayed in the mark.

Figure 29:
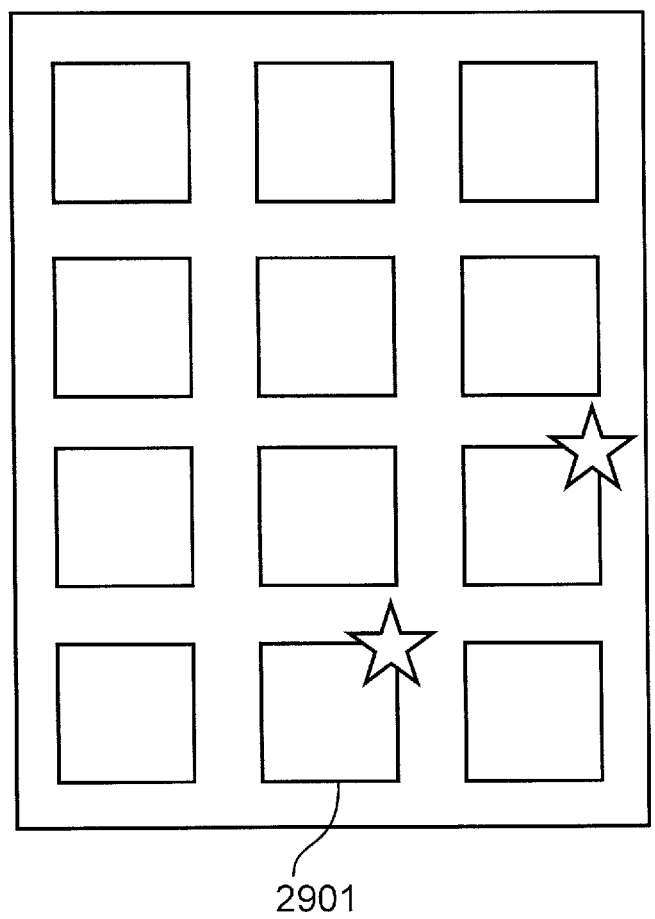
FIG. 29 is a diagram showing an example of a third content browsing screen with use of the content management application of the terminal device in the first embodiment.

FIG. 29 is a diagram showing an example of a third content browsing screen with use of the content management application of the terminal device 100 in the first embodiment. In this example, a part of the contents accumulated in the terminal device 100 is transmitted to one or more server devices 300. A star mark is superimposed on a content whose evaluation value is not smaller than a predetermined threshold value (e.g. 60). For instance, a star mark is superimposed on a content 2901 in the middle of the lowermost part of the screen. Accordingly, the evaluation value of the content 2901 is not smaller than 60. In the case where control information having the control contents "manage information indicative of a deletion candidate in association with a content" is generated, a "x" mark is superimposed on a content whose evaluation value is not larger than the predetermined threshold value (e.g. 30). As described above, as shown in the example of FIG. 29, the embodiment makes it possible for the user to identify a content with respect to which a predetermined operation has been received in the recipient server device 300, or a content with respect to which a predetermined operation has not been frequently received, out of the contents accumulated in the terminal device 100.

Figure 30:
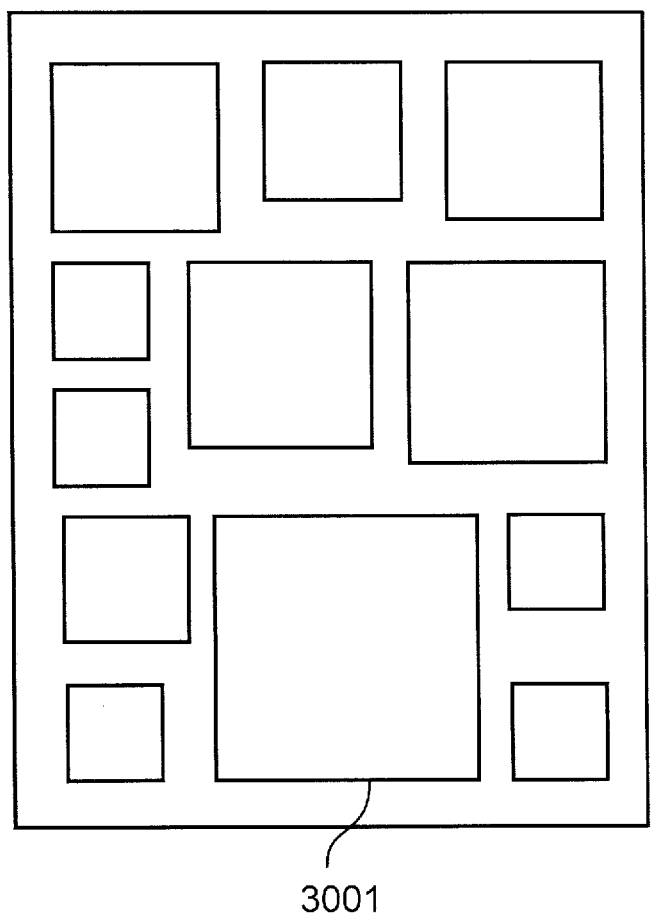
FIG. 30 is a diagram showing an example of a fourth content browsing screen with use of the content management application of the terminal device in the first embodiment.

FIG. 30 is a diagram showing an example of a fourth content browsing screen with use of the content management application of the terminal device 100 in the first embodiment. In this example, a part of the contents accumulated in the terminal device 100 is transmitted to one or more server devices 300. A content having a high evaluation value is displayed with a large size, and a content having a low evaluation value is displayed with a small size. For instance, a content 3001 in the middle of the lowermost part of the screen has a highest evaluation value. Accordingly, the content 3001 is displayed with a largest size. As described above, as shown in the example of FIG. 30, the embodiment makes it possible for the user to identify a content transmitted to the server device 300, and makes it possible for the owner user of the terminal device 100 to identify a content of high interest between the users in the recipient server device 300, out of the contents accumulated in the terminal device 100.

FIG. 31 is a diagram showing an example of a fifth content browsing screen with use of the content management application of the terminal device 100 in the first embodiment. In this example, a part of the contents accumulated in the terminal device 100 is transmitted to a part or all of the services "S1", "S2", and "S3" to be respectively managed by three server devices 300.

Specifically, the numbers of comments with respect to each of the contents in the services "S1", "S2", and "S3", and the sums of the numbers of comments in the services "S1", "S2", and "S3" are displayed in the descending order of sums. On the lowermost part of the screen, there are displayed buttons with which the user can select operation history information other than a comment, i.e., "LIKE", "NUMBER OF AFFIRMATIVE EXPRESSIONS", "NUMBER OF NEGATIVE EXPRESSIONS", "NUMBER OF TIMES OF BROWSING OPERATIONS", "BROWSING TIME", and "NUMBER OF TIMES OF DOWNLOAD OPERATIONS". When the user presses an intended button, the user can browse the operation history information corresponding to the pressed button. Further, the ongoing operation history information is displayed on the uppermost part of the screen. In this example, a comment is selected. Accordingly, "COMMENT" is displayed. Further, in the example shown in FIG. 31, the content whose sum of the numbers of comments is largest is the content whose sum of the numbers of comments in all the services "S1", "S2", and "S3" is "29", in view of a point that the number of comments in service "S1" is "12", the number of comments in service "S2" is "7", and the number of comments in service "S3" is "10".

FIG. 32 is a diagram showing an example of a sixth content browsing screen with use of the content management application of the terminal device 100 in the first embodiment. The sixth content browsing screen is displayed, in the case where the user has selected a certain content on the fifth content browsing screen shown in FIG. 31, for instance. The example shown in FIG. 32 illustrates a case, in which the user has selected "COMMENT" out of the operation history information. In this case, an enlarged image of the selected content, the names of the users who inputted a comment with respect to the selected content, and the details of the comment are displayed in association with each other.

In the foregoing, some examples of the browsing screen are described referring to FIGS. 27 to 32. These are merely examples. In the examples shown in FIGS. 27 to 29, only the contents having the marks attached thereto may be displayed. Further, in the examples shown in FIG. 27 and FIG. 28, it is possible to perform a switching control such that only a mark of a specific kind is attached, and marks of different kinds are attached only in response to user operation, in place of simultaneously attaching marks of different kinds. Further, it is possible to display a browsing screen obtained by combining different browsing screens, as necessary.

By performing these controls, the user can check content information indicative of a content shared between the server devices 300, service information indicative of a service in which a content is shared, and an input operation with respect to a content transmitted to the server device 300, with use of the application of the terminal device 100. This configuration makes it possible to provide the owner user of the terminal device 100 with information for making a decision such that a content which is frequently operated by the user should be stored, and a content which is less operated by the user should be deleted. Thus, the above configuration provides support for the owner user of the terminal device 100 in reducing the capacity of contents stored in the terminal device 100.

Further, "USER RELATIONSHIP INFORMATION" in the second server information table (see FIG. 5) to be managed by the server device 300 includes contact address information (e.g. an electronic mail address) of friends, in addition to "NUMBER OF FRIENDS" and "FRIEND NAME". The control information generating unit 306 may generate control information "TRANSMIT CONTENT TO CONTACT ADDRESS INFORMATION", in addition to ordinary control information "VALIDATE CONTENT PROTECTING FUNCTION", and in Step S111, the content control unit 307 may transmit these control information to the terminal device 100.

In the above case, the terminal content control unit 107 of the terminal device 100 receives control information from the content control unit 307 of the server device 300, and in the case where the terminal device 100 has a content to be controlled as defined by the control information, the terminal content control unit 107 performs a control of validating the content protecting function of the content, and a control of transmitting the content to the contact address information included in the control information. By performing these controls, the user can transmit a content of interest between the users not only to the terminal device 100 of the user himself or herself but also to the terminal device 100 of a third party such as a friend.

Further, for instance, "USER RELATIONSHIP INFORMATION" in the second server information table (see FIG. 5) to be managed by the server device 300 includes contact address information (e.g. an electronic mail address) of friends, in addition to "NUMBER OF FRIENDS" and "FRIEND NAME". The control information generating unit 306 also generates control information "CHECK PERMISSION TO TRANSMIT CONTENT TO CONTACT ADDRESS INFORMATION" in addition to ordinary control information "VALIDATE CONTENT PROTECTING FUNCTION". In Step S111, the content control unit 307 may transmit these control information to the terminal device 100.

In the above case, the terminal content control unit 107 of the terminal device 100 receives control information from the content control unit 307 of the server device 300, and in the case where the terminal device 100 has a content to be controlled as defined by the control information, the terminal content control unit 107 performs a control of validating the content protection function of the content, and a control of requesting the user utilizing the terminal device 100 for permission to transmit the content to the contact address information included in the control information. In the case where the input unit 101 of the terminal device 100 receives from the user an input indicative of permission to transmit the content to the contact address information, the terminal content control unit 107 of the terminal device 100 transmits to the server device 300 a control command indicative of transmitting the content to the contact address information. Then, the content control unit 307 of the server device 300 transmits the content to the contact address information.

On the other hand, in the case where the input unit 101 of the terminal device 100 has not received a user input indicative of permission to transmit the content to the contact address information, the terminal content control unit 107 of the terminal device 100 transmits to the server device 300 a control command indicative of not transmitting the content to the contact address information. Then, the content control unit 307 of the server device 300 finishes the processing, without transmitting the content to the contact address information. By performing the above control, it is possible to transmit a content of interest between the users at an intended timing not only to the terminal device 100 of the user himself or herself but also to the terminal device 100 of a third party such as a friend.

According to the above configuration, a content stored in the terminal device 100 is transmitted to the server device 300, in the case where the user selects the content to be shared between the server devices 300 with use of the terminal device 100. Then, the evaluation value of the content is calculated, based on the operation history information with respect to the content during a predetermined period in the server device 300, and the content stored in the terminal device 100 is controlled based on the calculated evaluation value. Accordingly, for instance, it is possible to delete from the terminal device 100 a content having a low evaluation value between the users on the SNS during a predetermined period. On the other hand, it is possible to add the information clearly showing a high evaluation value to a content having a high evaluation value, or to store the content into the terminal device 100 as it is, or to validate the content protecting function of the content. Accordingly, it is possible to suppress the capacity of contents to be accumulated in the terminal device 100 as much as possible, while reducing cumbersome operations of the user. Further, it is possible to provide support for the user in reducing the capacity of contents to be accumulated in the terminal device 100. Furthermore, the above configuration makes it possible for the user to browse a content of interest between the users at any time.

The foregoing is the detailed description on the first content processing described referring to FIG. 22.

The following is the details of the second content processing described referring to FIG. 23.

Figure 33A:
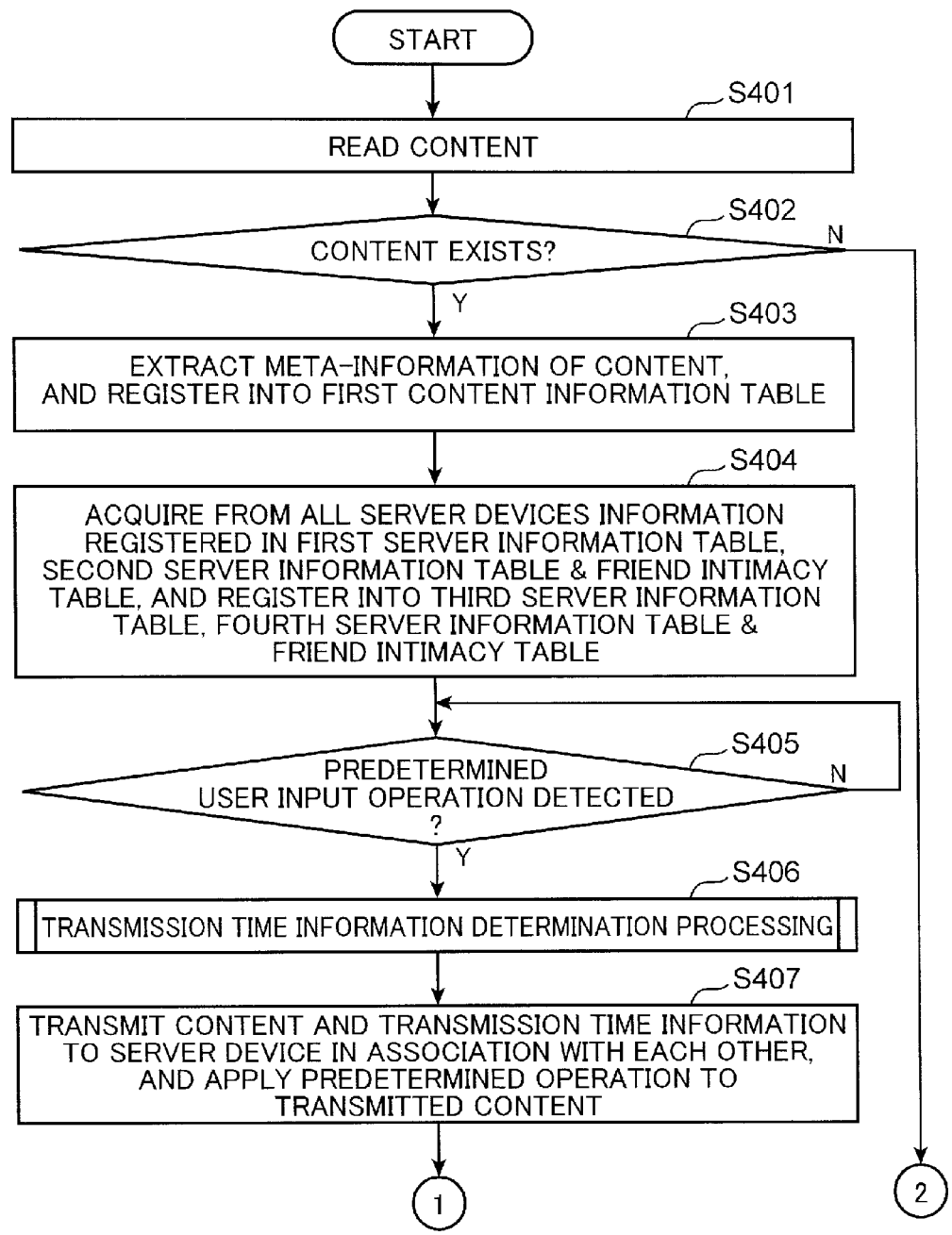
FIG. 33A is a flowchart showing a first half of a flow of the second content processing in the first embodiment.
Figure 33B:
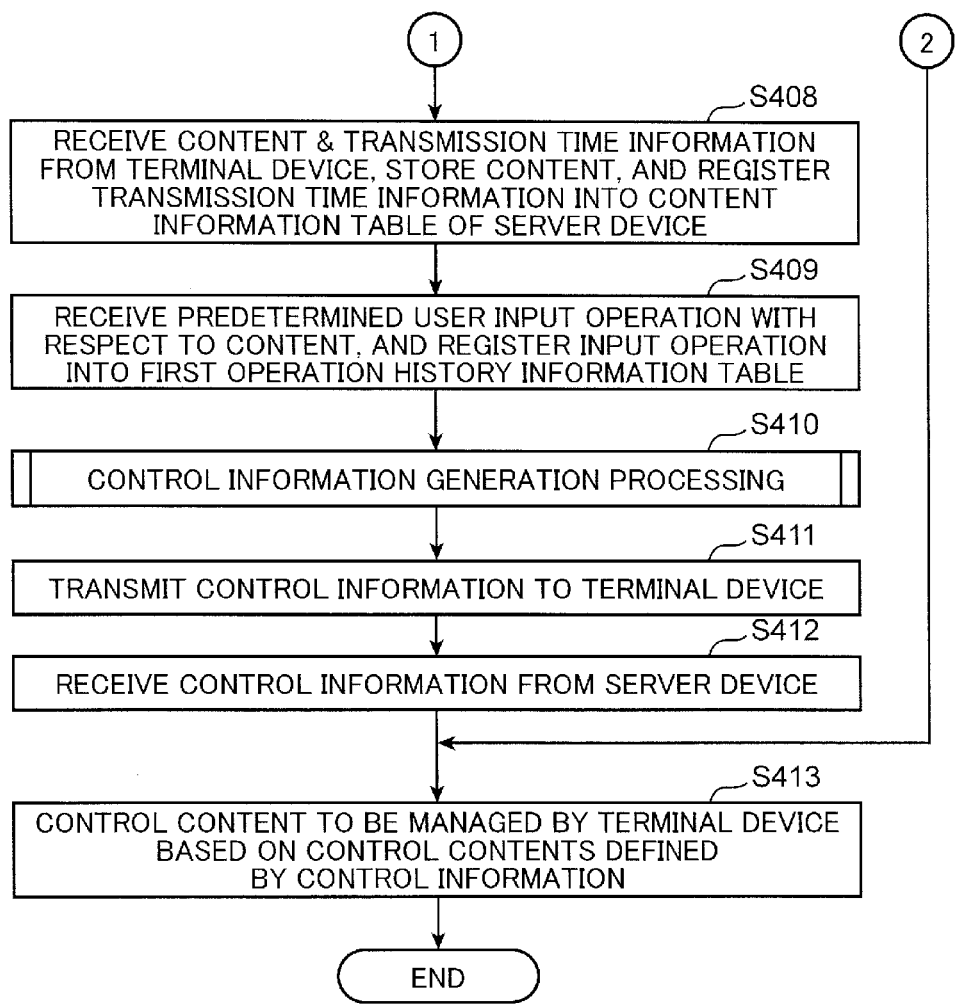
FIG. 33B is a flowchart showing a second half of the flow of the second content processing in the first embodiment.

FIGS. 33A and 33B are a flowchart showing an example of an overall operation of the second content processing to be performed in the first embodiment.

Since Steps S401 to S406 are substantially the same as Steps S101 to S106 in FIG. 24, the description thereof is omitted herein.

After Step S406, the terminal device 100 transmits a content and transmission time information to the server device 300 in association with each other, and then, applies a predetermined operation to the transmitted content (Step S407). In this example, the predetermined operation is an operation of deleting a content or an operation of compressing a content for reducing the capacity of contents accumulated in the terminal device 100.

Since Steps S408 to S409 following Step S407 are substantially the same as Steps S108 to S109 in FIG. 24, the description thereof is omitted herein.

Subsequently, the control information generating unit 306 performs control information generation processing (Step S410). Specifically, as described above, a content having a high evaluation value is determined to be a content of interest between the users. In view of the above, a content having a high evaluation value is stored in the terminal device 100 so that the user can browse the content of interest between the users at any time. On the other hand, a content having a low evaluation value is determined to be a content of less interest between the users, and is handled as an object to be deleted from the terminal device 100 for reducing the capacity of contents to be accumulated in the terminal device 100. Control information is generated in accordance with a content evaluation value, based on the above idea.

For instance, in the case where a content evaluation value is smaller than 30, the control information generating unit 306 generates control information having the control contents "DO NOTHING", in the case where a content evaluation value is not smaller than 30 but smaller than 60, the control information generating unit 306 generates control information having the control contents "TRANSMIT CONTENT TO TERMINAL DEVICE", and in the case where a content evaluation value is not smaller than 60, the control information generating unit 306 generates control information having the control contents "VALIDATE CONTENT PROTECTING FUNCTION, AND TRANSMIT CONTENT TO TERMINAL DEVICE". Validation of the content protecting function may be controlled on the server device 300 side, or may be controlled on the terminal device 100 side.

In the example shown in FIG. 18, the content evaluation value of the content of content ID "C-00001" during the evaluation period of evaluation period ID "V1" is "67.9", the content evaluation value of the content of content ID "C-00002" during the evaluation period of evaluation period ID "V2" is "12.81", and the content evaluation value of the content of content ID "C-00005" during the evaluation period of evaluation period ID "V3" is "40.32". Accordingly, the control information generating unit 306 generates control information having the control contents "VALIDATE CONTENT PROTECTING FUNCTION, AND TRANSMIT CONTENT TO TERMINAL DEVICE", "DO NOTHING", and "TRANSMIT CONTENT TO TERMINAL DEVICE" with respect to the contents of content IDs "C-00001", "C-00002", and "C-00005", respectively.

In this example, the control information generation method is a method for generating control information to be applied to a content, based on a content evaluation value to be managed by the server device 300. The embodiment is not limited to the above. For instance, the control information generating unit 306 may generate control information, based on "REMAINING CAPACITY" in the second server information table shown in FIG. 4, in addition to a content evaluation value.

In the above configuration, the control information generating unit 306 can generate control information indicative of deleting a content having a low content evaluation value from the server device 300, in the case where the remaining capacity of the server device 300 is equal to or lower than a predetermined threshold value (e.g. 0.5 GB).

Referring back to FIG. 33B, the content control unit 307 of the server device 300 transmits control information to the terminal device 100 (Step S411). In performing the above operation, the server device 300 may also perform a control of contents to be accumulated in the server device 300, based on the control contents defined by the control information. For instance, in the case where a content is transmitted together with control information, the content control unit 307 may copy or process the content to be transmitted.

Subsequently, the terminal content control unit 107 of the terminal device 100 receives control information from the content control unit 307 of the server device 300 (Step S412).

Subsequently, the terminal content control unit 107 controls a content to be managed by the terminal device 100 in accordance with the control contents defined by the received control information (Step S413), and finishes the second content processing. For instance, in the case where the received control information has the control contents "ACCUMULATE TRANSMITTED CONTENT TOGETHER WITH CONTROL INFORMATION IN TERMINAL DEVICE", the terminal content control unit 107 accumulates the received content in the content accumulation unit 102. Further, in the case where the received control information has the control contents "ACCESS FROM TERMINAL DEVICE TO SERVER DEVICE, AND DOWNLOAD CONTENT", the terminal content control unit 107 accesses to the server device 300, downloads the content designated by the control information from the server device 300, and accumulates the downloaded content in the content accumulation unit 102. In this example, in the case where the terminal device 100 does not have a content as a result of deleting the content from the terminal device 100 by the predetermined operation in Step S407, the deleted content is accumulated in the content accumulation unit 102 as a new file. Further, in the case where the terminal device 100 has a content as a result of compressing the content by the predetermined operation in Step S407, the existing content is replaced by the compressed content, and the compressed content is accumulated in the content accumulation unit 102.

According to the above configuration, in selecting a content to be shared from the terminal device 100 by the user, after the content stored in the terminal device 100 is transmitted to the server device 300, the content is deleted from the terminal device 100. Then, an evaluation value of the content is calculated in the server device 300, based on the operation history information with respect to the content during a predetermined period, and the content stored in the server device 300 is controlled, based on the calculated evaluation value. Accordingly, for instance, it is possible to delete from the terminal device 100 a content having a low evaluation value between the friends on the SNS during a predetermined period, while storing the content in the server device 300 as it is. On the other hand, it is possible to transmit a content having a high evaluation value from the server device 300 to the terminal device 100. Accordingly, in response to user's selecting a content to be transmitted from the terminal device 100 to the server device 300, the selected content is immediately deleted from the terminal device 100 to thereby reduce the capacity of contents to be accumulated in the terminal device 100. Further, a content having a high evaluation value is accumulated in the terminal device 100. Accordingly, the owner user of the terminal device 100 can browse a content of interest between the users at any time.

In this example, in the control information generation processing of Step S410 in FIG. 33B, control information is generated by calculating an evaluation value of a content, based on a sum of operation history information with respect to the content during an evaluation period, after the evaluation period is over. This is merely an example. Control information may be generated every predetermined time interval, in place of being generated only once after a predetermined evaluation period is over. In the above configuration, the processings of Steps S411 to Step S413 in FIG. 33B are performed every predetermined time interval.

In the example shown in FIG. 18, the evaluation period of evaluation period ID "V1" is one week from 2012/5/1 17:00 to 2012/5/8 17:00. In this example, let it be assumed that a time interval at which control information is generated is one week after the date and time when a previous evaluation period has started. Then, the control information generating unit 306 sets a next evaluation period following the evaluation period of evaluation period ID "V1" with respect to the content of content ID "C-00001" in the sever device 300 of server ID "S-001" to a time period from 2012/5/8 17:00 to 2012/5/15 17:00. Then, the control information generating unit 306 registers the next evaluation period into the second evaluation period information table (see FIG. 20) by attaching the evaluation period ID "V1-1" to the next evaluation period. Likewise, the control information generating unit 306 sets a next evaluation period following the evaluation period of evaluation period ID "V2" with respect to the content of content ID "C-00002" in the server device 300 of server ID "S-001", and registers the next evaluation period into the second evaluation period information table (see FIG. 20) by attaching the evaluation period ID "V2-1" to the next evaluation period. Likewise, the control information generating unit 306 sets a next evaluation period following the evaluation period of evaluation period ID "V3" with respect to the content of content ID "C-00005" in the server device 300 of server ID "S-001", and registers the next evaluation period into the second evaluation period information table (see FIG. 20) by attaching the evaluation period ID "V3-1" to the next evaluation period.

In this example, let it be assumed that the accumulated operation history information table shown in FIG. 21 is obtained as an accumulated operation history information table concerning the evaluation periods of evaluation period IDs "V1-1", "V2-1", and "V3-1" of each of the contents in the server device 300 of server ID "S-001". In this case, the following is the control information generated by the control information generation processing of Step S110 by the same content evaluation value calculation method and the same control information determination method as described above.

In the example of the accumulated operation history information table shown in FIG. 21, in the case where the content evaluation values are calculated by the same calculation method as described above, the evaluation value of the content of content ID "C-00001" during the evaluation period of evaluation period ID "V1-1" is "38.66", the evaluation value of the content of content ID "C-00002" during the evaluation period of evaluation period ID "V2-1" is "61.24", and the evaluation value of the content of content ID "C-00005" during the evaluation period of evaluation period ID "V3-1" is "8.33". Accordingly, the control information generating unit 306 generates control information having the control contents "TRANSMIT CONTENT TO TERMINAL DEVICE", "VALIDATE CONTENT PROTECTING FUNCTION AND TRANSMIT CONTENT TO TERMINAL DEVICE", and "DO NOTHING" with respect to the aforementioned three contents respectively by the same control information determination method as described above.

As described above, whereas the control information of the content of content ID "C-00001" has the control contents "VALIDATE CONTENT PROTECTING FUNCTION AND TRANSMIT CONTENT TO TERMINAL DEVICE" during the evaluation period of evaluation period ID "V1", the control information of the content of content ID "C-00001" has the control contents "TRANSMIT CONTENT TO TERMINAL DEVICE" during the evaluation period of evaluation period ID "V1-1". Specifically, the state of the content of content ID "C-00001" is changed from a state in which the content protecting function is validated in the terminal device 100 after the evaluation period of evaluation period ID "V1" is over, to a state in which the content protecting function is invalidated in the terminal device 100 after the evaluation period of evaluation period ID "V1-1" is over.

Further, whereas the control information of the content of content ID "C-00001" has the control contents "DO NOTHING" during the evaluation period of evaluation period ID "V2", the control information of the content of content ID "C-00001" has the control contents "VALIDATE CONTENT PROTECTING FUNCTION AND TRANSMIT CONTENT TO TERMINAL DEVICE" during the evaluation period of evaluation period ID "V2-1". Specifically, the state of the content of content ID "C-00002" is changed from a state in which a content is deleted from the terminal device 100 and the terminal device 100 does not have a content after the evaluation period of evaluation period ID "V2" is over, to a state in which the content protecting function is validated in the terminal device 100 and the terminal device 100 has a content after the evaluation period of evaluation period ID "V2-1" is over.

Further, whereas the control information of the content of content ID "C-00005" has the control contents "TRANSMIT CONTENT TO TERMINAL DEVICE" during the evaluation period of evaluation period ID "V3", the control information of the content of content ID "C-00005" has the control contents "DO NOTHING" during the evaluation period of evaluation period ID "V3-1". Specifically, the state of the content of content ID "C-00005" is changed from a state in which the terminal device 100 has a content after the evaluation period of evaluation period ID "V3" is over, to a state in which the content is deleted and the terminal device 100 does not have a content after the evaluation period of evaluation period ID "V3-1" is over.

According to the above configuration, even if a content is temporarily deleted from the terminal device 100 because the evaluation value on "LIKE" or a comment from the friends with respect to the content in the server device 300 such as an SNS server for a certain predetermined period is low, it is possible to transmit the content to the terminal device 100 from the SNS server, as far as the evaluation value during another predetermined period thereafter is increased. Thus, the above configuration makes it possible for the user to browse the content, as a content of interest between the users on the SNS at any time.

Further, the embodiment is made based on the premise that the terminal content control unit 107 of the terminal device 100 transmits a content of the terminal device 100 to two or more server devices 300. In this case, let it be assumed that, in the control information generation processing of Step S110 to be performed by two or more server devices 300, the control information generating unit 306 generates control information having the control contents such that the accumulated operation history information registered in the accumulated operation history information table is managed in association with a content, regardless of the evaluation value of the content. Further, let it be assumed that the content control unit 307 transmits to the terminal device 100 the control information in association with the accumulated operation history information. In this case, in the case where the terminal device 100 has received control information with respect to a content from two or more server devices 300, the terminal content control unit 107 of the terminal device 100 may control the content to be managed by the terminal device 100 by calculating an evaluation value of the content based on the accumulated operation history information of the two or more server devices 300, and by generating control information with respect to the content based on the calculated evaluation value.

The following is a detailed description on a case, in which the terminal device 100 transmits the content of content ID "C-00001" to the server device 300 of server ID "S-001" and to the server device 300 of server ID "S-002". In this case, let it be assumed that the control information generated in the server device 300 of server ID "S-001" and the control information generated in the server device 300 of server ID "S-002" respectively have the control contents such that the accumulated operation history information that follows next should be managed in association with the content of content ID "C-00001".

First of all, let it be assumed that the accumulated operation history information of the server device 300 of server ID "S-001" is such that the number of "LIKEs" is 6, the number of comments is 6, the number of affirmative expressions is 3, the number of negative expressions is 0, the number of times of browsing operations is 12, the browsing time is 16 minutes and 06 seconds, and the number of times of download operations is 2. Further, let it be assumed that the accumulated operation history information of the server device 300 of server ID "S-002" is such that the number of "LIKEs" is 4, the number of comments is 3, the number of affirmative expressions is 1, the number of negative expressions is 1, the number of times of browsing operations is 8, the browsing time is 8 minutes and 32 seconds, and the number of times of download operations is 3.

In this case, in receiving from the server devices 300 of server IDs "S-001" and "S-002" the control information with respect to the content of content ID "C-00001" and the accumulated operation history information, the terminal content control unit 107 of the terminal device 100 generates control information with respect to the content of content ID "C-00001", based on the received accumulated operation history information.

In generating control information, first of all, the terminal content control unit 107 calculates an evaluation value of the content of content ID "C-00001". Specifically, for instance, the terminal content control unit 107 calculates an average value of sums in each of the elements of the accumulated operation history information with respect to the content of content ID "C-00001" in each of the server devices 300 of server IDs "S-001" and "S-002"; and calculates an evaluation value of the content with use of the aforementioned computational algorithm, in which a content having a large average value has a high evaluation value. In this example, there is described a content evaluation value calculation method with use of an average value of accumulated operation history information of each of the server devices 300 of server IDs "S-001" and "S-002". This is merely an example. As far as the method is a method of utilizing accumulated operation history information of each of the server devices 300 of server IDs "S-001" and "S-002", the terminal content control unit 107 may calculate an evaluation value of a content, with use of a method, in which the accumulated operation history information of both of the server devices 300 is summed up.

As described above, the content evaluation value calculation method is a method, in which the evaluation value of a content is added by "1.0", each time the number of "LIKEs", the number of comments, the number of affirmative expressions, the number of times of browsing operations, and the number of times of download operations are incremented by one; the evaluation value of a content is added by "0.01", each time the browsing time is incremented by one second; and the evaluation value of a content is subtracted by "1.0", each time the number of negative expressions is incremented by one.

First of all, in the case where the average value of accumulated operation history information with respect to the content of content ID "C-00001" received from each of the server devices 300 of server IDs "S-001" and "S-002" is calculated, the average value of the number of "LIKES" is 5, the average value of the number of comments is 4.5, the average value of the number of affirmative expressions is 2, the average value of the number of negative expressions is 0.5, the average value of the number of times of browsing operations is 10, the average value of the browsing time is 12 minutes and 19 seconds, and the average value of the number of times of download operations is 2.5. Accordingly, the terminal content control unit 107 calculates the evaluation value of the content as: $5+4.5+2+(-1)\times0.5+10+0.01\times(739)+2.5=30.89$.

As described above, in this embodiment, a content having a high evaluation value is determined to be a content of interest between the users. In view of the above, a content having a high evaluation value is stored in the terminal device 100 so that the user can browse the content of interest between the users at any time. On the other hand, a content having a low evaluation value is determined to be a content of less interest between the users, and is handled as an object to be deleted from the terminal device 100 of the user for reducing the capacity of contents to be accumulated in the terminal device 100. In this embodiment, control information is generated in accordance with a content evaluation value based on the above idea.

In view of the above, control information with respect to a content to be managed by the terminal device 100 of the owner user is generated as follows. For instance, in the case where the evaluation value of a content is smaller than 30, the terminal content control unit 107 generates control information having the control contents "DELETE" if the terminal device 100 has a content to be controlled, and the terminal content control unit 107 generates control information having the control contents "DO NOTHING" if the terminal device 100 does not have a content to be controlled. Further, in the case where a content evaluation value is not smaller than 30 but smaller than 60, the terminal content control unit 107 generates control information having the control contents "DO NOTHING" if the terminal device 100 has a content to be controlled, and the terminal content control unit 107 generates control information having the control contents "RECEIVE CONTENT TO BE CONTROLLED FROM ONE OF SERVER DEVICES" if the terminal device 100 does not have a content to be controlled. Further, in the case where a content evaluation value is not smaller than 60, the terminal content control unit 107 generates control information having the control contents "VALIDATE CONTENT PROTECTING FUNCTION" if the terminal device 100 has a content to be controlled, and the terminal content control unit 107 generates control information having the control contents "RECEIVE CONTENT TO BE CONTROLLED FROM ONE OF SERVER DEVICES AND VALIDATE CONTENT PROTECTING FUNCTION" if the terminal device 100 does not have a content to be controlled.

In the example of the content of content ID "C-00001", the evaluation value of the content is 30.89. Accordingly, the terminal content control unit 107 generates control information having the control contents "DO NOTHING" if the terminal device 100 has the content of content ID "C-00001". On the other hand, if the terminal device 100 does not have the content of content ID "C-00001", the terminal content control unit 107 generates control information having the control contents "RECEIVE CONTENT OF CONTENT ID "C-00001" FROM ONE OF SERVER DEVICES". Then, the terminal content control unit 107 performs a control defined by the generated control information with respect to the content.

As described above, according to the first embodiment, it is possible to control the contents accumulated in the terminal device 100, based on user operation history information with respect to the contents shared with external devices such as the server devices 300. As a result of the control, it is possible to specify a content of interest, out of the contents accumulated in the terminal device 100, based on the operation history information with respect to the shared contents.

For instance, even in the case where a content of the terminal device 100 is transmitted to plural server devices 300 such as SNS servers, it is possible to calculate an evaluation value of the content, based on operation history information accumulated during a predetermined period with respect to the content in the SNS servers, and it is possible to generate control information, based on the calculated evaluation value. Accordingly, for instance, it is possible to delete, from the terminal device 100, a content whose sum of the numbers of "LIKEs" or the numbers of comments from the friends with respect to the content in the server devices 300 such as SNS servers during a predetermined period is small. On the other hand, it is possible to store in the terminal device 100 a content whose sum of the number of "LIKEs" or the number of comments is large, or to validate the content protecting function of preventing content deletion. Thus, the embodiment is advantageous in reducing the capacity of contents to be accumulated in the terminal device 100, while reducing cumbersome operations of the user. Further, the embodiment is advantageous in providing support for the user in reducing the capacity of contents to be accumulated in the terminal device 100. Furthermore, the embodiment is advantageous in allowing the user to browse a content of interest between the users at any time on a plurality of SNSs.

Second Embodiment

In the first embodiment, there has been described the server device 300 which is configured to generate control information for controlling the contents accumulated in the terminal device 100, based on the user operation history with respect to the contents shared between external devices such as the server devices 300. In the second embodiment, there is described an example of a server device 300 which is operable to change the control contents determined based on the evaluation value of a content calculated by the method of the first embodiment in accordance with a performance or a state of a terminal device 100.

Figure 34:
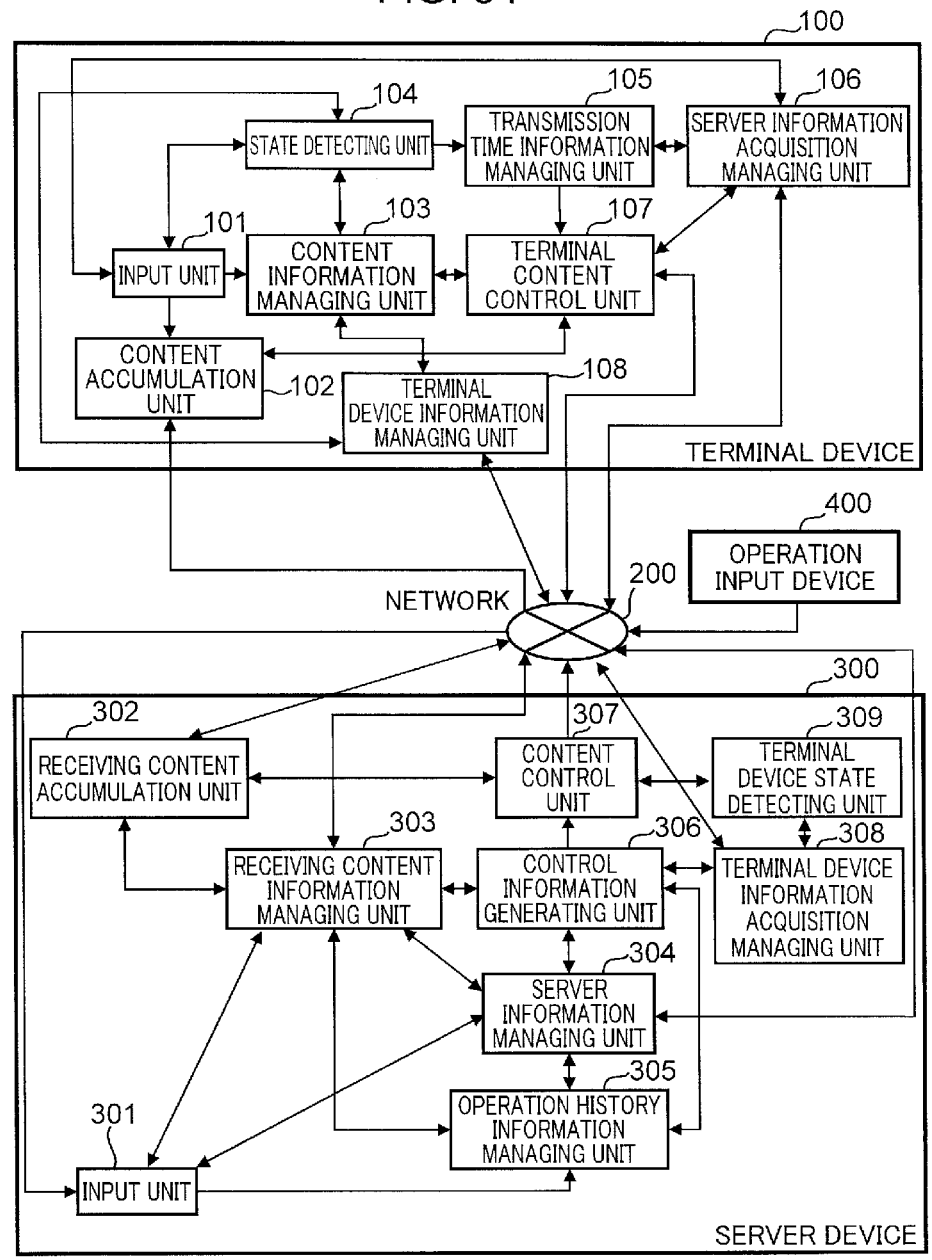
FIG. 34 is a block diagram showing a configuration of a system including a content control device according to a second embodiment of the invention.

FIG. 34 is a block diagram showing a configuration of a system including a content control device according to the second embodiment. The constituent elements in FIG. 34 substantially the same as those in FIG. 1 are indicated with the same reference numerals, and the description thereof is omitted herein.

Referring to FIG. 34, the terminal device 100 is provided with a terminal device information managing unit 108, in addition to the constituent elements shown in FIG. 1. The server device 300 is provided with a terminal device information acquisition managing unit 308 and a terminal device state detecting unit 309, in addition to the constituent elements shown in FIG. 1. In this embodiment, the server device 300 corresponds to a content control device.

The terminal device information managing unit 108 acquires and manages terminal device information (e.g. performance information of the terminal device 100 or use state information of the terminal device 100), which is the information relating to the terminal device 100. Acquisition of the terminal device information is performed every predetermined time interval (e.g. every one minute), for instance.

The terminal device information acquisition managing unit 308 acquires and manages terminal device information to be managed by the terminal device information managing unit 108 of the terminal device 100. In this example, the terminal device information acquisition managing unit 308 acquires the terminal device information every predetermined time interval (e.g. every one minute), for instance.

The terminal device state detecting unit 309 detects whether the terminal device 100 is in a predetermined state. In this example, the terminal device state detecting unit 309 detects whether the terminal device 100 is in a predetermined state by referring to the terminal device information to be managed by the terminal device information acquisition managing unit 308.

In the following, an operation of the system including the content control device having the above configuration is described referring to FIGS. 35 to 39.

FIG. 35 is a diagram showing an example of a second content information table to be managed by the terminal device 100 in the second embodiment. The second content information table is a table to be generated and managed by the content information managing unit 103. The content information managing unit 103 manages operation history information indicative of a history on input operations with respect to a content acquired through the input unit 101 by the user who owns the terminal device 100, with use of the terminal device 100. The second content information table shown in FIG. 35 is provided with "CONTENT ID", "OPERATION HISTORY", and "TRANSMISSION HISTORY".

"OPERATION HISTORY" is a history on operations by the user who owns the terminal device 100, and is provided with the elements "BROWSING TIME" and "NUMBER OF TIMES OF BROWSING OPERATIONS". "BROWSING TIME" is a period of time when the user who owns the terminal device 100 has browsed a content with use of the terminal device 100. "NUMBER OF TIMES OF BROWSING OPERATIONS" is the number of times the user who owns the terminal device 100 has browsed a content with use of the terminal device 100.

"TRANSMISSION HISTORY" is a history on transmission of a content, and is provided with the elements "RECIPIENT SERVER ID" and "TRANSMISSION DATE AND TIME". "RECIPIENT SERVER ID" is identification information of the server device 300 as a content recipient. "TRANSMISSION DATE AND TIME" is a date and time when a content has been transmitted to the server device 300. For instance, the content of content ID "C-00003" is such that the period of time when the user who owns the terminal device 100 has browsed the content with use of the terminal device 100 is "3 MINUTES AND 08 SECONDS", the number of times the user has browsed the content is "14", "RECIPIENT SERVER ID" of the server device 300 as a content recipient is "S-002", and "TRANSMISSION DATE AND TIME" of the content is "2012/4/20 17:00". The mark "-" is registered in the columns of "RECIPIENT SERVER ID" and "TRANSMISSION DATE AND TIME" of a content that has not been transmitted to the server device 300.

FIG. 36 is a diagram showing an example of a first terminal device information table to be managed by the terminal device 100 in the second embodiment. The first terminal device information table is a table to be generated and managed by the terminal device information managing unit 108. In this example, the terminal device information indicates performance information of the terminal device 100 and use state information of the terminal device 100. The details of the first terminal device information table are as follows.

The first terminal device information table shown in FIG. 36 is provided with the elements "TERMINAL DEVICE ID", "SCREEN RESOLUTION", "CAPACITY LIMIT", "REMAINING CAPACITY", and "PLACE INFORMATION". "TERMINAL DEVICE ID" is identification information of the terminal device 100. "SCREEN RESOLUTION" is a resolution of a display unit provided in the terminal device 100. "CAPACITY LIMIT" is a maximum value of the capacity of contents storable in the terminal device 100. "REMAINING CAPACITY" is a value obtained by subtracting, from the value of "CAPACITY LIMIT", the sum of the sizes of the contents stored in the terminal device 100, and is a value indicating the remaining amount of the capacity of contents storable in the terminal device 100. "PLACE INFORMATION" is place information (latitude and longitude) of the terminal device 100.

"SCREEN RESOLUTION" and "CAPACITY LIMIT" correspond to the performance information, and "REMAINING CAPACITY" and "PLACE INFORMATION" correspond to the use state information.

In the example shown in FIG. 36, the terminal device 100 of terminal device ID "D-001" is such that the screen resolution is "800×480 pixels", the capacity limit is 16 GB, the remaining capacity is 5.6 GB, and the place information is "(35.358256.138.677559)".

FIG. 37 is a diagram showing an example of a second terminal device information table to be managed by the terminal device 100 in the second embodiment. The second terminal device information table is a table to be generated and managed by the terminal device information managing unit 108, as well as the first terminal device information table shown in FIG. 36. The second terminal device information table shown in FIG. 37 is provided with the elements "TERMINAL DEVICE ID", "SCHEDULE ID", and "SCHEDULE DATE AND TIME", and date and time information of schedules is registered in the second terminal device information table.

"SCHEDULE ID" is identification information of a schedule registered in a schedule book application of the terminal device 100, for instance. "SCHEDULE DATE AND TIME" indicates the date and time of a schedule. For instance, the schedule of schedule ID "P-00001" is registered in the terminal device 100 of terminal device ID "D-001", and 2012/5/26 13:00 is registered as the date and time of the schedule.

FIG. 38 is a diagram showing an example of a third terminal device information table to be managed by the server device of server ID "S-001" in the second embodiment. The third terminal device information table is a table to be acquired and managed by the terminal device information acquisition managing unit 308 by acquiring from the terminal device 100 the information registered in the first terminal device information table (see FIG. 36) every predetermined time interval. The third terminal device information table shown in FIG. 38 is provided with the element "SERVER ID" in addition to the elements in the first terminal device information table shown in FIG. 36. "SERVER ID" is identification information of the server device 300.

FIG. 39 is a diagram showing an example of a fourth terminal device information table to be managed by the server device of server ID "S-001" in the second embodiment. The fourth terminal device information table is a table to be acquired and managed by the terminal device information acquisition managing unit 308 by acquiring from the terminal device 100 the information registered in the second terminal device information table (see FIG. 37) every predetermined time interval. The fourth terminal device information table shown in FIG. 39 is provided with the element "SERVER ID", in addition to the elements in the second terminal device information table shown in FIG. 37.

In the following, content processing to be performed in this embodiment is described referring to FIGS. 40A to 42. By performing this content processing, it is possible to suppress the capacity of contents to be accumulated in the terminal device 100 as much as possible, while reducing cumbersome operations of the user. Further, it is possible to provide support for the user in reducing the capacity of contents to be accumulated in the terminal device 100. Furthermore, it is possible to store a content of interest between the users in the terminal device 100. Let it be assumed that the user who owns the terminal device 100 is the user "A", and the server devices 300 connected to the terminal device 100 via a network 200 are the server devices 300 of server IDs "S-001", "S-002", and "S-003" as well as the first embodiment.

First of all, a flow of the content processing to be performed in the second embodiment is described referring to FIGS. 40A and 40B.

Since Steps S501 to S502 are substantially the same as Steps S101 to S102 shown in FIG. 24A, the description thereof is omitted herein. In the case where the content accumulation unit 102 does not have a content as a result of processing of Step S502 (N in Step S502), the content processing is finished. On the other hand, in the case where the content accumulation unit 102 has a content (Y in Step S502), the content information managing unit 103 generates the first content information table (see FIG. 3) with respect to all the contents accumulated in the content accumulation unit 102, and registers meta-information extracted from the contents into the first content information table (Step S503). In this example, the content information managing unit 103 may extract meta-information from EXIF (Exchangeable Image File Format) information recorded in the contents. The meta-information of a content includes the content ID of the content, a storage path of the content in the terminal device 100, a size of the content, a photographing date and time of the content, and a type of the content.

Further, the content information managing unit 103 generates the second content information table (see FIG. 35), and registers, into the second content information table, operation history information indicative of a history on input operations with respect to a content by the user "A" who owns the terminal device 100 every predetermined time interval, with use of the terminal device 100 (Step S503). In this example, the operation history information includes a browsing time of a content, the number of times of browsing operations of the content, the server ID of the server device 300 as a content recipient, and a date and time when the content has been transmitted. Further, the unit of the predetermined period may be one day, one week, or one month.

Since Step S504 is substantially the same as Step S104 shown in FIG. 24A, the description thereof is omitted herein.

Subsequently, the terminal device information managing unit 108 acquires terminal device information of the terminal device 100 every predetermined time interval, generates the first terminal device information table and the second terminal device information table, and registers the acquired terminal device information into the first terminal device information table (see FIG. 36) and into the second terminal device information table (see FIG. 37) (Step S505). In this example, the unit of the predetermined period may be one minute, one hour, or one day.

Specifically, the terminal device ID, "SCREEN RESOLUTION" of the terminal device 100, "CAPACITY LIMIT" of the terminal device 100, "REMAINING CAPACITY" of the terminal device 100, and "PLACE INFORMATION" of the terminal device 100 are registered in the first terminal device information table. Further, the terminal device ID, "SCHEDULE ID" registered in the terminal device 100, and "SCHEDULE DATE AND TIME" registered in the terminal device 100 are registered in the second terminal device information table. Since the detailed description on the elements in the first and second terminal device information tables have been described in the foregoing section, the description thereof is omitted herein.

Subsequently, the state detecting unit 104 detects whether the terminal device 100 is in a predetermined state, based on the terminal device information registered in the first terminal device information table and in the second terminal device information table (Step S506). In this example, the predetermined state includes a state that "REMAINING CAPACITY" registered in the first terminal device information table is equal to or lower than a predetermined threshold value (e.g. 0.5 GB), a state that "PLACE INFORMATION" registered in the first terminal device information table coincides with a predetermined place designated by the user in advance, a state that a current date and time is earlier than "SCHEDULE DATE AND TIME" registered in the second terminal device information table by a predetermined time (e.g. one week), and a state that the date and time managed by the terminal device 100 coincides with a predetermined timing (e.g. at 0:00 every day).

According to the above configuration, the terminal device 100 can transmit a content to the server device 300, in the case where the remaining capacity of the terminal device 100 is equal to or lower than a threshold value, in the case where a current date and time coincides with the date and time managed by the terminal device 100, in the case where the terminal device 100 is present in a predetermined place, and in the case where a current date and time is earlier than the schedule date and time registered in the terminal device 100 by a predetermined time.

In the case where it is not detected that the terminal device 100 is in the predetermined state (N in Step S506), the state detecting unit 104 returns the processing to Step S506, and detects whether the terminal device 100 is in the predetermined state, based on the terminal device information registered in the first terminal device information table and in the second terminal device information table.

On the other hand, in the case where the state detecting unit 104 detects that the terminal device 100 is in the predetermined state (Y in Step S506), the transmission time information managing unit 105 performs the transmission time information determination processing (Step S507). The details of the transmission time information determination processing will be described later referring to FIG. 41.

Since Steps S508 to S510 are substantially the same as Steps S107 to S109 shown in FIG. 24B, the description thereof is omitted herein.

In the following, the terminal device information acquisition managing unit 308 of the server device 300 acquires from the terminal device 100 the terminal device information registered in the first terminal device information table (see FIG. 36) and in the second terminal device information table (see FIG. 37) every predetermined time interval, and registers the acquired terminal device information into the third terminal device information table (see FIG. 38) and into the fourth terminal device information table (see FIG. 39) (Step S511). In this example, the unit of the predetermined period may be one minute, one hour, or one day.

Subsequently, the control information generating unit 306 performs the control information generation processing (Step S512). The details of the control information generation processing will be described later referring to FIG. 42.

Subsequently, the terminal device state detecting unit 309 detects whether the terminal device 100 is in the predetermined state, based on the terminal device information registered in the third terminal device information table and in the fourth terminal device information table (Step S513). In this example, the predetermined state includes a state that "REMAINING CAPACITY" registered in the third terminal device information table is equal to or lower than a predetermined threshold value (e.g. 0.5 GB), a state that "PLACE INFORMATION" registered in the third terminal device information table (see FIG. 38) coincides with a predetermined place designated by the user in advance, a state that a current date and time is earlier than the schedule date and time registered in the fourth terminal device information table (see FIG. 39) by a predetermined time (e.g. one week), and a state that the date and time managed by the terminal device 100 coincides with a predetermined timing (e.g. at 0:00 every day).

According to the above configuration, the server device 300 can detect a state of the terminal device 100. Accordingly, the server device 300 can transmit to the terminal device 100 the control information indicative of deleting a content from the terminal device 100, in the case where the remaining capacity of the terminal device 100 is equal to or lower than a threshold value, in the case where the date and time managed by the terminal device 100 coincides with a predetermined timing, in the case where the terminal device 100 is present in a predetermined place, and in the case where a current date and time is earlier than the schedule date and time registered in the terminal device 100 by a predetermined time.

Subsequently, in the case where it is not detected that the terminal device 100 is in the predetermined state (N in Step S513), the state detecting unit 104 returns the processing to Step S513, and detects whether the terminal device 100 is in the predetermined state, based on the terminal device information registered in the third terminal device information table and in the fourth terminal device information table. On the other hand, in the case where the state detecting unit 104 detects that the terminal device 100 is in the predetermined state (Y in Step S513), the state detecting unit 104 performs the processing of Step S514. In this example, as far as the predetermined state of the terminal device 100 is not detected, the processing of Step S514 and thereafter is not performed. Alternatively, the processing of Step S514 and thereafter may be performed, regardless of the predetermined state of the terminal device 100.

Since Steps S514 to S517 are substantially the same as Steps S111 to S114 shown in FIG. 24B, the description thereof is omitted herein.

Figure 41:
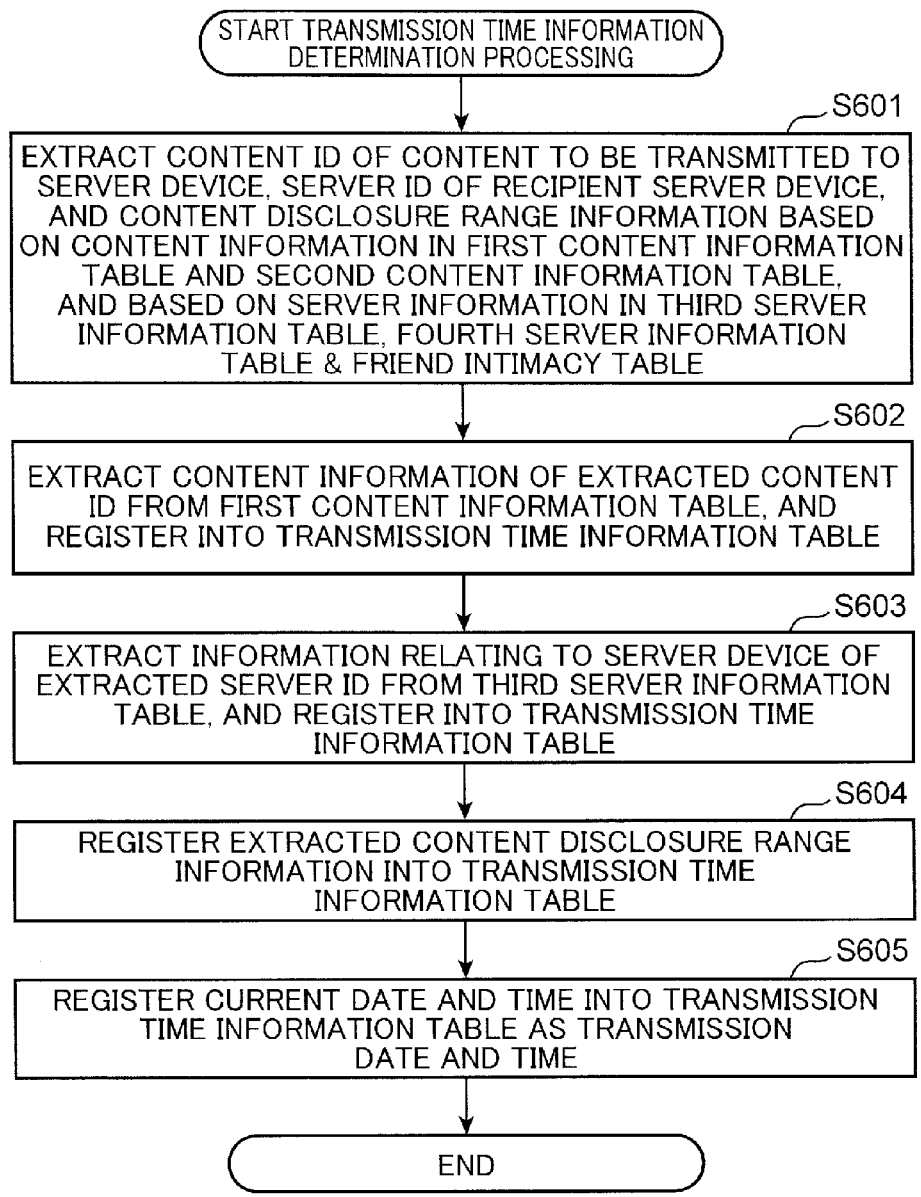
FIG. 41 is a flowchart showing a flow of transmission time information determination processing in the second embodiment.

In the following, a flow of the transmission time information determination processing to be performed by the transmission time information managing unit 105 shown in Step S507 is described referring to FIG. 41.

First of all, the transmission time information managing unit 105 extracts the content ID of a content to be transmitted to the server device 300, the server ID of a server device 300 as a recipient, and the level of content disclosure range, based on the content information registered in the first content information table (see FIG. 3) and in the second content information table, based on the server information registered in the third server information table (see FIG. 7) and in the fourth server information table (see FIG. 8), and based on the degrees of intimacy registered in the friend intimacy table (see FIG. 9) (Step S601).

In this example, the description has been made based on the premise that the user "A" himself or herself has selected all the information i.e. a content to be shared between the server devices 300, a server device 300 as a content recipient, and a content disclosure range. This is merely an example. The user "A" does not have to select all the information, and does not have to select one of the information. In the configuration, a predetermined value may be set to the information that has not been selected by the user "A".

Further, as described in the first embodiment, the method for determining a content to be transmitted to the server device 300 may be a method such that the transmission time information managing unit 105 automatically determines a content, without depending on user selection.

For instance, the transmission time information managing unit 105 may determine contents of a predetermined number as a content to be transmitted in the descending order of "SIZE" registered in the first content information table to be managed by the terminal device 100 shown in FIG. 3. Alternatively, the transmission time information managing unit 105 may determine contents of a predetermined number as a content to be transmitted in the order from an oldest "PHOTOGRAPHING DATE AND TIME" to a latest "PHOTOGRAPHING DATE AND TIME" registered in the first content information table shown in FIG. 3.

Specifically, the transmission time information managing unit 105 selects, as a content to be transmitted, the content of content ID "C-00003" whose size is largest i.e. 4.7 MB, or selects, as a content to be transmitted, the content of content ID "C-00001" whose photographing date and time is oldest i.e. 2012/4/7 14:33.

Further, as described in the first embodiment, the transmission time information managing unit 105 can determine, as a content to be transmitted, a content in the descending order from a largest size, which is registered in the first content information table to be managed by the terminal device 100 shown in FIG. 3, and which does not exceed "CONTENT SIZE LIMIT" registered in the third server information table shown in FIG. 7.

Specifically, in the case where the recipient server device of a content is the server device 300 of server ID "S-003", the transmission time information managing unit 105 selects, as a content to be transmitted, the content of content ID "C-00002" whose size is 2.5 MB, which is largest, but does not exceed 3 MB, because 3 MB is registered in "CONTENT SIZE LIMIT".

Further, the method for determining a content to be transmitted to the server device 300 may be a method such that the transmission time information managing unit 105 determines contents of a predetermined number as a content to be transmitted in the order from a shortest "BROWSING TIME" to a longest "BROWSING TIME" registered in the second content information table shown in FIG. 35. Alternatively, the transmission time information managing unit 105 may determine contents of a predetermined number as a content to be transmitted in the order from a smallest "NUMBER OF TIMES OF BROWSING OPERATIONS" to a largest "NUMBER OF TIMES OF BROWSING OPERATIONS" registered in the second content information table shown in FIG. 35. Alternatively, the transmission time information managing unit 105 may determine a content to be transmitted by specifying a content that has not been transmitted to the server device 300 from "TRANSMISSION HISTORY" indicative of a history on transmission of contents to the server device 300, which is registered in the second content information table shown in FIG. 35 and in the order from the specified non-transmitted content.

Specifically, the transmission time information managing unit 105 may select the content of content ID "C-00002" whose "BROWSING TIME" in the second content information table is shortest i.e. 50 seconds, or may select the content of content ID "C-00005" whose "NUMBER OF TIMES OF BROWSING OPERATIONS" is smallest i.e. 4, or may select one of the contents of content IDs "C-00001", "C-00002", and "C-00005", whose "TRANSMISSION HISTORY" to the server device 300 is unregistered.

Further, the method for determining a server device 300 as a content recipient may be one of the methods described in the first embodiment. For instance, it is possible to determine a server device 300 as a content recipient in the descending order of the value of "CONTENT SIZE LIMIT" registered in the third server information table shown in FIG. 7. Alternatively, the transmission time information managing unit 105 may determine a server device 300 as a content recipient in the descending order of "REMAINING CAPACITY" registered in the third server information table shown in FIG. 7.

Specifically, the transmission time information managing unit 105 may select the server device 300 of server ID "S-002" whose "CONTENT SIZE LIMIT" registered in the third server information table is largest i.e. 10 MB. Alternatively, the transmission time information managing unit 105 may select the server device 300 of server ID "S—002" whose "REMAINING CAPACITY" registered in the third server information table is unlimited and accordingly largest.

Alternatively, as described in the first embodiment, the transmission time information managing unit 105 may determine a server device 300 as a content recipient in the descending order of "FRIEND NUMBER" in "USER RELATIONSHIP INFORMATION" registered in the fourth server information table shown in FIG. 8. Specifically, the transmission time information managing unit 105 may determine, as a recipient server device 300, the server device 300 of server ID "S-001" whose "FRIEND NUMBER" is largest i.e. ten.

Further, for instance, the transmission time information managing unit 105 may determine a server device 300 as a recipient in the descending order of the number of registrations in "TRANSMISSION HISTORY" in the second content information table shown in FIG. 35. Further, the transmission time information managing unit 105 may determine a server device 300 as a recipient in the order from a server device 300 which has transmitted a content at a previous transmission date and time registered in "TRANSMISSION HISTORY". Specifically, the transmission time information managing unit 105 may determine, as a recipient server device 300, the server device of server ID "S-002" whose number of registrations in "TRANSMISSION HISTORY" is largest i.e. "2". Alternatively, the transmission time information managing unit 105 may determine, as a recipient server device 300, the server device 300 of server ID "S-002" which has transmitted a content at a previous transmission date and time registered in "TRANSMISSION HISTORY" i.e. on "2012/4/21 15:15".

Further, the transmission time information managing unit 105 may utilize a predetermined level e.g. "FRIEND" as a content disclosure range.

Since Steps S602 to S605 are substantially the same as Steps S202 to S205 shown in FIG. 25, the description thereof is omitted herein.

Figure 42:
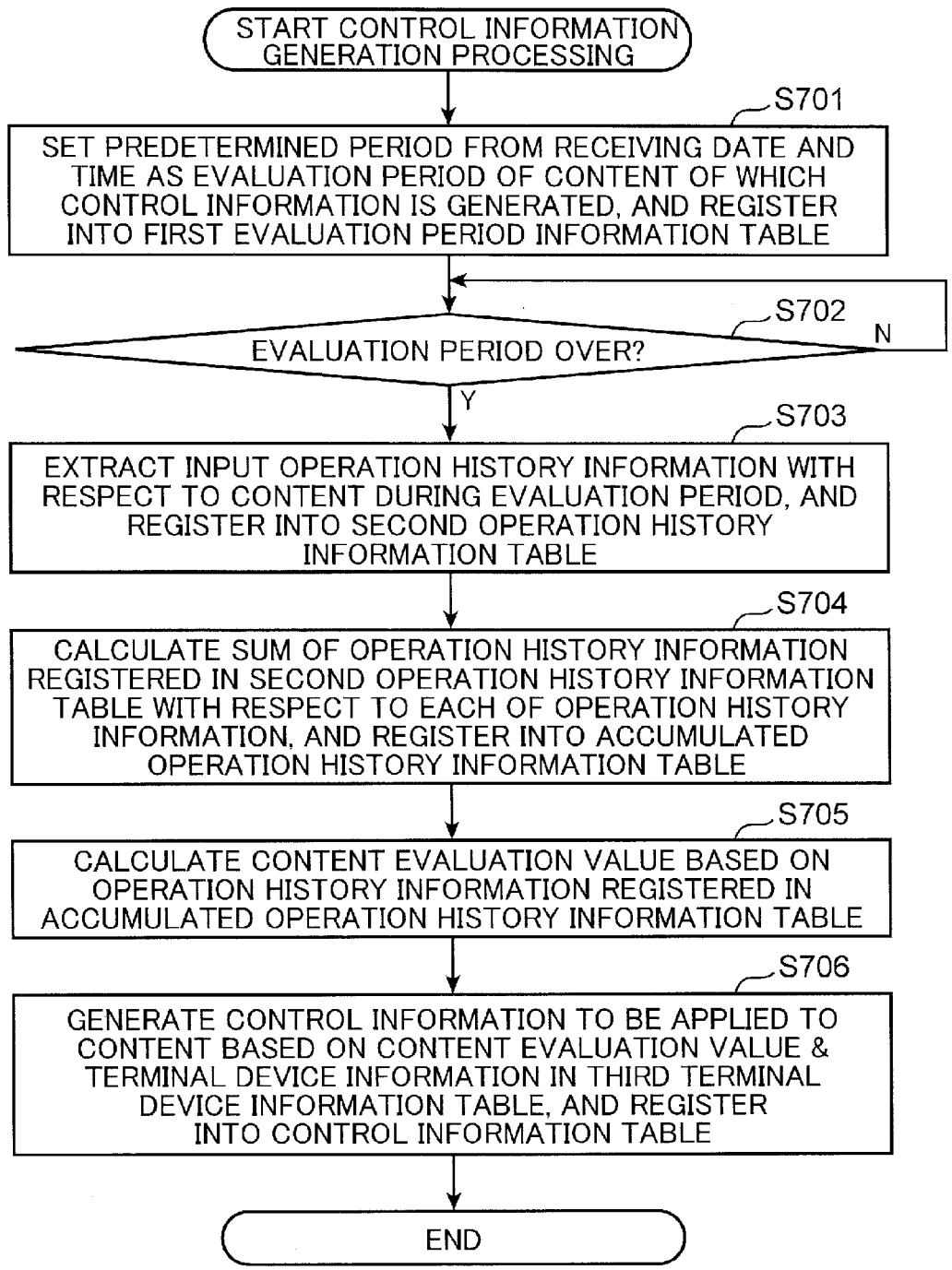
FIG. 42 is a flowchart showing a flow of control information generation processing in the second embodiment.

In the following, a flow of the control information generation processing to be performed by the control information generating unit 306 shown in Step S512 is described referring to FIG. 42. In this example, there is described a case, in which control information is generated with respect to the content of content ID "C-00001" of the server device 300 of server ID "S-001".

Since Steps S701 to S705 are substantially the same as Steps S301 to S305 shown in FIG. 26, the description thereof is omitted herein.

Subsequently, the control information generating unit 306 generates control information to be applied to a content, based on the content evaluation value calculated in Step S705 and based on the terminal device information in the third terminal device information table (see FIG. 38), registers the generated control information into the control information table (Step S706), and finishes the control information generation processing.

Specifically, the control information generating unit 306 extracts, from the content information table shown in FIG. 11, "CONTENT ID" and "STORAGE PATH IN TERMINAL DEVICE" of a content whose evaluation value has been calculated in Step S305, and registers the extracted "CONTENT ID" and "STORAGE PATH IN TERMINAL DEVICE" into the control information table (see FIG. 19) in association with "CONTROL INFORMATION ID". Subsequently, the control information generating unit 306 generates control information to be applied to the content, based on the content evaluation value calculated in Step S705, and based on the terminal device information registered in the third terminal device information table, and registers the generated control information into the control information table (see FIG. 19).

In this embodiment, the control information is defined such that a content having a high evaluation value is determined to be a content of interest between the users. In view of the above, a content having a high evaluation value is stored in the terminal device 100 of the user so that the user can browse a content of interest between the users at any time. On the other hand, a content having a low evaluation value is determined to be a content of less interest between the users, and is handled as an object to be deleted from the terminal device 100 of the user for reducing the capacity of contents to be accumulated in the terminal device 100. The control information generating unit 306 evaluates a content and generates control information based on the above idea.

In this embodiment, for instance, the control contents of control information determined by the method of the first embodiment can be changed in accordance with a performance or a state of the terminal device 100.

For instance, a reference evaluation value of a content in generating control information "DELETE" is set to be small, as "REMAINING CAPACITY" of terminal device information increases; and a reference evaluation value of a content in generating control information "VALIDATE CONTENT PROTECTING FUNCTION" is set to be large, as "REMAINING CAPACITY" of terminal device information decreases.

For instance, in the case where "REMAINING CAPACITY" of terminal device information is not smaller than 60% of "CAPACITY LIMIT", if the content evaluation value is smaller than 30, the control information generating unit 306 generates control information having the control contents "DELETE"; if the content evaluation value is not smaller than 30 but smaller than 60, the control information generating unit 306 generates control information having the control contents "DO NOTHING"; and if the content evaluation value is not smaller than 60, the control information generating unit 306 generates control information having the control contents "VALIDATE CONTENT PROTECTING FUNCTION". Further, for instance, in the case where "REMAINING CAPACITY" of terminal device information is not smaller than 30% but smaller than 60% of "CAPACITY LIMIT", if the content evaluation value is smaller than 45, the control information generating unit 306 generates control information having the control contents "DELETE"; if the content evaluation value is not smaller than 45 but smaller than 75, the control information generating unit 306 generates control information having the control contents "DO NOTHING"; and if the content evaluation value is not smaller than 75, the control information generating unit 306 generates control information having the control contents "VALIDATE CONTENT PROTECTING FUNCTION".

Further, for instance, in the case where "REMAINING CAPACITY" of terminal device information is smaller than 30% of "CAPACITY LIMIT", if the content evaluation value is smaller than 60, the control information generating unit 306 generates control information having the control contents "DELETE"; if the content evaluation value is not smaller than 60 but smaller than 90, the control information generating unit 306 generates control information having the control contents "DO NOTHING"; and if the content evaluation value is not smaller than 90, the control information generating unit 306 generates control information having the control contents "VALIDATE CONTENT PROTECTING FUNCTION".

Specifically, in the third terminal device information table shown in FIG. 38, "REMAINING CAPACITY" is 5.6 GB, and "CAPACITY LIMIT" is 16 GB. Accordingly, "REMAINING CAPACITY" is 35% of "CAPACITY LIMIT", which corresponds to a case, in which the remaining capacity is not smaller than 30% but smaller than 60% of the capacity limit. Therefore, the control information generating unit 306 generates control information having the control contents "DELETE" if the content evaluation value is smaller than 45; generates control information having the control contents "DO NOTHING" if the content evaluation value is not smaller than 45 but smaller than 75; and generates control information having the control contents "VALIDATE CONTENT PROTECTING FUNCTION" if the content evaluation value is not smaller than 75.

The control information determination method is such that the reference evaluation value of a content in determining a content to be deleted is set to be large in order to increase the number of contents to be deleted, based on the idea that the capacity of contents storable in the terminal device 100 should be secured, as "REMAINING CAPACITY" of the terminal device 100 decreases. Contrary to the above, the control information determination method is such that the reference evaluation value of a content in determining a content to be deleted is set to be small in order to decrease the number of contents to be deleted, based on the idea that the contents of interest should be stored in the terminal device 100 as many as possible, rather than securing the capacity of contents storable in the terminal device 100, as the remaining capacity of the terminal device 100 increases.

Further, in the aforementioned control information generation method, in the case where the control information indicates information other than "DELETE", the control information generating unit 306 may generate control information to be transmitted to the terminal device 100, after compressing a content in accordance with the perfoimance information of the terminal device 100, or after compressing a content to a predetermined size, with use of the use state information of the terminal device 100 and the performance information of the terminal device 100, if the capacity of contents storable in the terminal device 100 is equal to or lower than a predetermined threshold value.

Specifically, in the case where "REMAINING CAPACITY" of the terminal device 100 in the first terminal device information table shown in FIG. 36 is equal to or lower than a predetermined threshold value (e.g. the remaining capacity is 40% of the capacity limit), the control information generating unit 306 may add control information indicative of constantly compressing a content to a size substantially equal to "SCREEN RESOLUTION" of the terminal device 100 registered in the first terminal device information table.

For instance, the control information "DO NOTHING", which is generated by the aforementioned control information generation method, may be read as "COMPRESS TO SIZE SUBSTANTIALLY EQUAL TO SCREEN RESOLUTION OF TERMINAL DEVICE", and the control information "VALIDATE CONTENT PROTECTING FUNCTION" may be read as "COMPRESS TO SIZE SUBSTANTIALLY EQUAL TO SCREEN RESOLUTION OF TERMINAL DEVICE, AND VALIDATE CONTENT PROTECTING FUNCTION".

In this example, the size of a content which has undergone compression is substantially equal to "SCREEN RESOLUTION". The embodiment is not limited to the above. For instance, a content may be compressed to a predetermined size. In the above configuration, it is possible to store contents of interest between the users in the terminal device 100 as many as possible, even in the case where "REMAINING CAPACITY" of the terminal device 100 is small.

According to the second embodiment, it is possible to control the contents accumulated in the terminal device 100, based on the user operation history information with respect to a content shared between the external devices such as the server devices 300, and based on the information relating to a performance or a state of the terminal device 100. As a result of the above control, it is possible to specify a content of interest, out of the contents accumulated in the terminal device 100, based on the operation history information with respect to the shared contents.

For instance, in detecting a predetermined state of the terminal device 100, a content to be transmitted to the server device 300 is determined based on the content information, and the content stored in the terminal device 100 is transmitted to the server device 300. Then, in the server device 300, an evaluation value of the content is calculated, based on the operation history information with respect to the content during a predetermined period by the user whose input operation with respect to the content is permitted; and the content stored in the terminal device 100 is controlled, based on the calculated evaluation value. According to the above configuration, for instance, it is possible to transmit a content in the terminal device 100 to the server device 300, without the need of user operation of selecting a content to be shared between the server devices 300 through the terminal device 100, in the case where the remaining capacity of contents in the terminal device 100 is equal to or lower than a predetermined threshold value, or in the case where the date and time managed by the terminal device 100 coincides with a predetermined timing, or in the case where the terminal device 100 is present in a predetermined place, or in the case where a current date and time coincides with a timing earlier than the schedule date and time registered in the terminal device 100 by a predetermined time. Further, it is possible to delete, from the terminal device 100, a content having a low evaluation value on "LIKE" or a comment from the friends on the server device 300 such as an SNS server during a predetermined period. On the other hand, it is possible to store a content having a high evaluation value into the terminal device 100 as it is, or to validate the content protecting function of preventing content deletion. Thus, the above configuration is advantageous in reducing the capacity of contents to be accumulated in the terminal device 100, while reducing cumbersome operations of the user. Further, the above configuration is advantageous in providing support for the user in reducing the capacity of contents to be accumulated in the terminal device 100. Furthermore, the above configuration is advantageous in allowing the user to browse a content of interest between the users at any time.

The foregoing embodiments are merely an example embodying the invention. The invention is not limited to the foregoing embodiments, but may be modified in various ways, as far as such modification does not depart from the gist of the invention.

For instance, in the foregoing embodiments, the server device 300 is configured to accumulate contents transmitted from the terminal device 100, and to accumulate operation history information with respect to the accumulated contents. Alternatively, not the server device 300 but a content managing device other than the server device 300 may accumulate contents transmitted from the terminal device 100, and may accumulate operation history information with respect to the accumulated contents.

Figure 43:
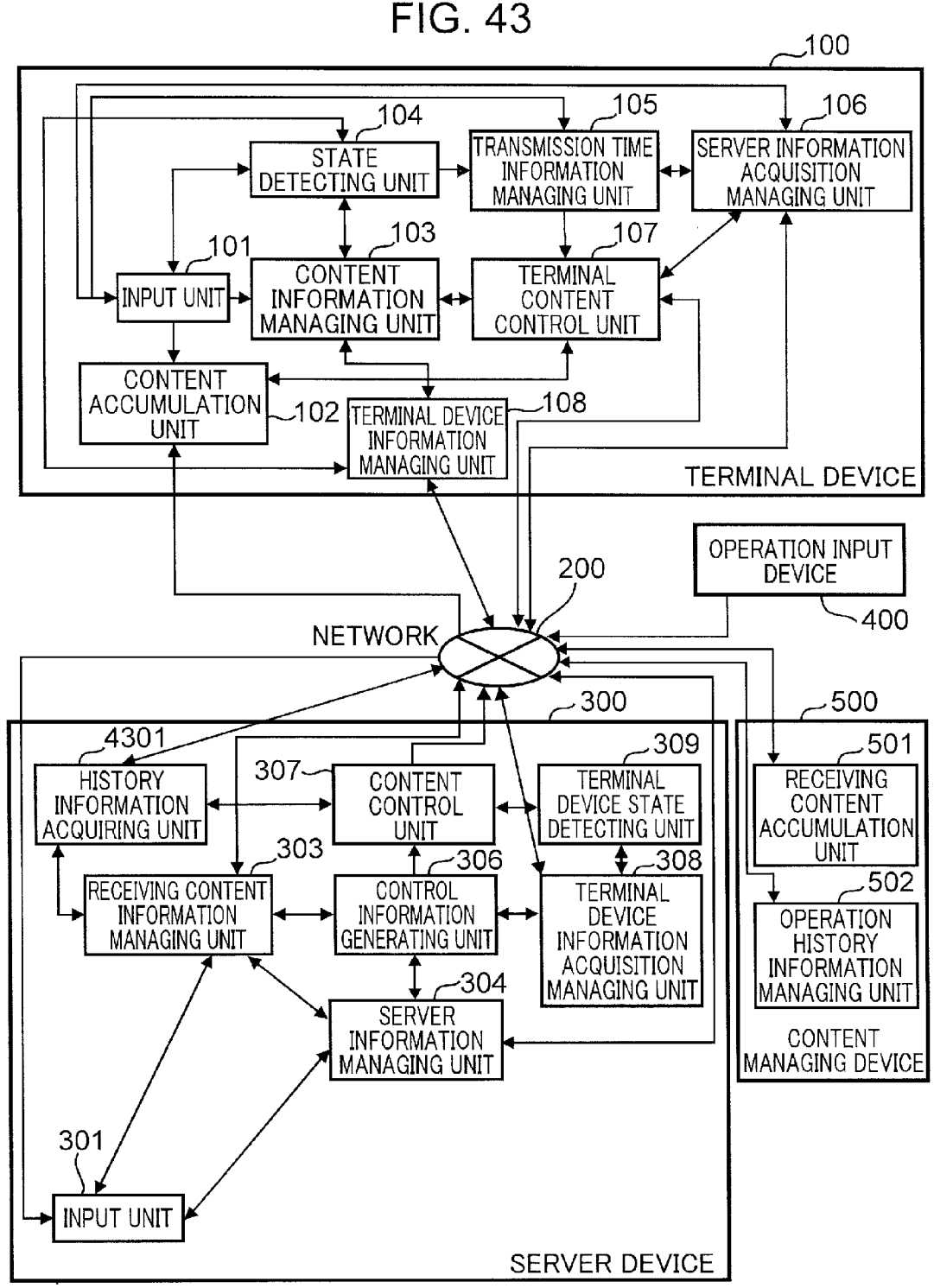
FIG. 43 is a diagram showing an example of a configuration of a system, in the case where a content management device other than the server device manages the contents and the operation history information.

FIG. 43 is a diagram showing an example of a configuration of a system, in the case where a content managing device 500 other than the server device 300 accumulates contents and operation history information.

In the above modification, the server device 300 is provided with a history information acquiring unit 4301 which acquires operation history information from the content managing device 500. A content control unit 307 may generate control information, based on the operation history information acquired by the history information acquiring unit 4301.

Further, in the above modification, not the server device 300 but the content managing device 500 is provided with a receiving content accumulation unit 501 and an operation history information managing unit 502.

Figure 44:
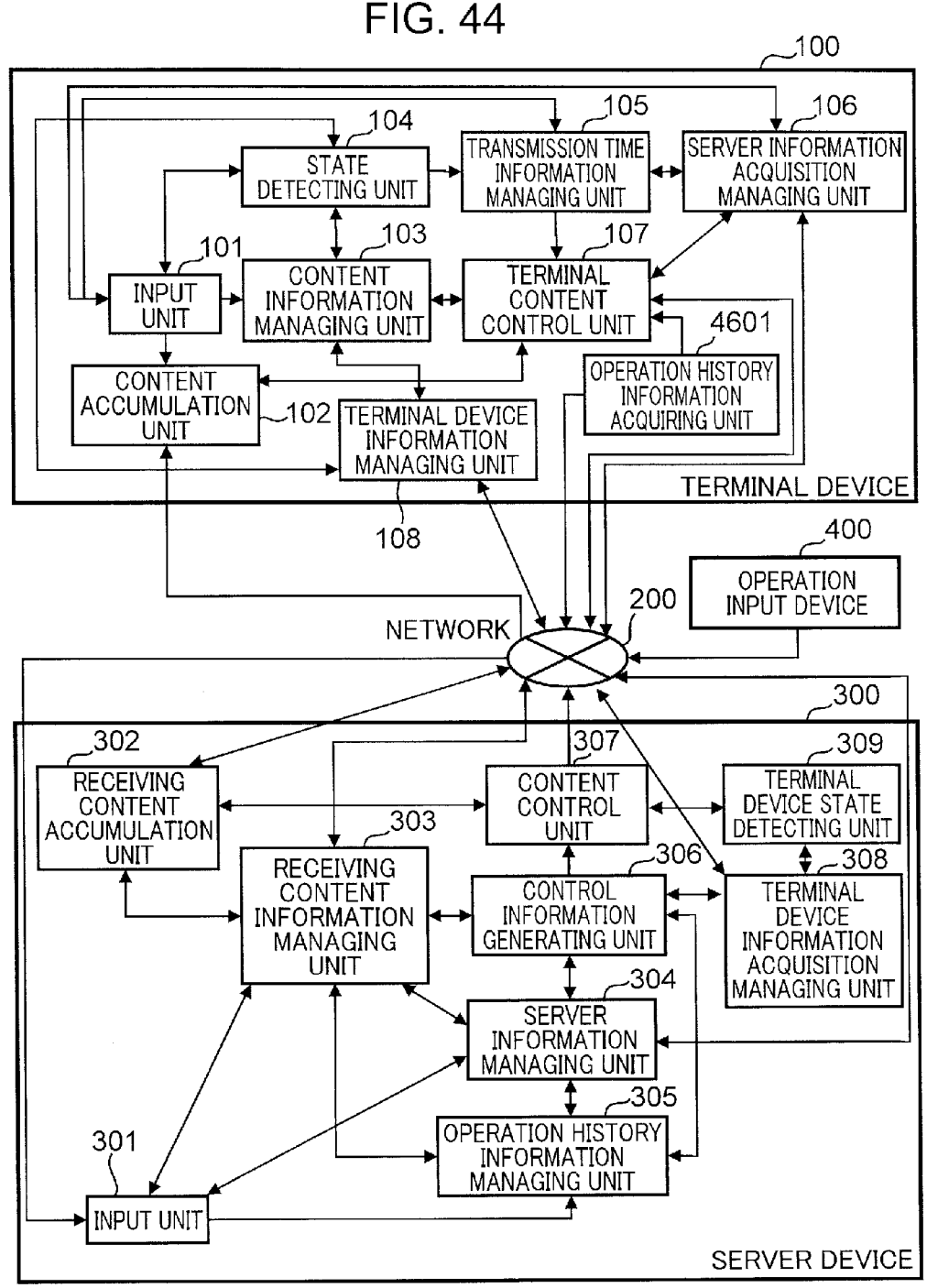
FIG. 44 is a diagram showing an example of a configuration of a system, in the case where an operation history information acquiring unit is provided in the terminal device.

Further, in the foregoing embodiments, the terminal content control unit 107 performs the controls with respect to a content by receiving control information from the server device 300, based on operation history information with respect to shared contents. The embodiments are not limited to the aforementioned example. For instance, as shown in FIG. 44, a terminal device 100 is provided with an operation history information acquiring unit 4601 which acquires operation history information with respect to a content which has been transmitted from the terminal device 100 to the server device 300. The terminal content control unit 107 has a function of the control information generating unit 306 of the server device 300. The terminal content control unit 107 may generate control information, based on the operation history information acquired by the operation history information acquiring unit 4601, and may control the contents accumulated in the terminal device 100, based on the generated control information.

In the following, a hardware configuration of the terminal device 100, the server device 300, and the operation input device 400 according to the foregoing embodiments is described.

FIG. 45 is a block diagram showing an example of a hardware configuration of a computer to be applied to the terminal device 100, the server device 300, and the operation input device 400 according to the first and second embodiments. The computer is provided with an input device 4401, an ROM (Read Only Memory) 4402, a CPU (Central Processing Unit) 4403, an RAM (Random Access Memory) 4404, an external storage device 4405, a display device 4406, a recording medium driving device 4407, and a communication device 4408. Each of the functional blocks is connected to an internal bus. Various data is inputted or outputted via the bus, and various processings are executed under the control of the CPU 4403.

The input device 4401 is constituted of a keyboard and a mouse, and is used for allowing the user to input various data. A system program such as BIOS (Basic Input/Output System) is stored in the ROM 4402. The external storage device 4405 is constituted of a hard disk drive, and a predetermined OS (Operating System) and a content processing program are stored in the external storage device 4405. The CPU 4403 reads the OS and the content processing program from the external storage device 4405, and controls the operation of each of the functional blocks. The RAM 4404 is used as a working area for the CPU 4403.

The display device 4406 is constituted of a liquid crystal display or an organic EL display, for instance, and displays various images under the control of the CPU 4403. The recording medium driving device 4407 is constituted of a DVD drive or a flexible disk drive. A recording medium 4409 is constituted of a computer-readable recording medium such as a DVD-ROM, and a content control program which causes a computer to function as the terminal device 100 and the server device 300 is recorded in the recording medium 4409.

The communication device 4408 is constituted of a communication device for connecting a computer to the Internet. Data is transmitted and received to and from other device via the Internet under the control of the CPU 4403.

The input unit 101, 301 shown in FIG. 1, etc. is constituted of the input device 4401, the CPU 4403, and the communication device 4408, and is implemented by causing the CPU 4403 to execute the content control program. Further, the content accumulation unit 102, 302 shown in FIG. 1, etc. is constituted of the CPU 4403, the external storage device 4405, and the communication device 4408, and is implemented by causing the CPU 4403 to execute the content control program. Further, the content information managing unit 103, the transmission time information managing unit 105, the server information managing unit 304, and the operation history information managing unit 305 shown in FIG. 1, etc. are constituted of the CPU 4403 and a storage device (the RAM 4404 and the external storage device 4405), and are implemented by causing the CPU 4403 to execute the content control program.

Further, the state detecting unit 104 and the control information generating unit 306 shown in FIG. 1, etc. are constituted of the CPU 4403, and are implemented by causing the CPU 4403 to execute the content control program. Further, the terminal content control unit 107, the server information acquisition managing unit 106, the receiving content information managing unit 303, and the content control unit 307 shown in FIG. 1, etc. are constituted of the CPU 4403 and the communication device 4408, and are implemented by causing the CPU 4403 to execute the content control program.

As described above, the steps explained in the foregoing embodiments are described by a content control program, and are implemented by reading the content control program from a memory and causing the CPU 4403 to execute the content control program.

Further, the content control program may be stored in a recording medium such as a DVD for distribution. Furthermore, the content control program may be widely distributed via a transmission medium such as the Internet.

Each of the functional blocks described in the foregoing embodiments may be implemented as an LSI (Large Scale Integration), which is an integrated circuit. In the above configuration, each of the functional blocks may be individually configured into a one-chip device, or a part or all of the functional blocks may be configured into a one-chip device. In this example, the integrated circuit is an LSI. The integrated circuit may also be called as an IC (Integrated Circuit), a system LSI, a super LSI or an ultra LSI, depending on the degree of integration of the circuit. Further, the circuit integration method is not limited to an LSI method. The integrated circuit may be implemented by a dedicated circuit or a general-purpose processor. Further, an FPGA (Field Programmable Gate Array) capable of programming after fabricating an LSI, or a reconfigurable processor capable of reconfiguring connection or setting of circuit cells within the LSI may also be used. Alternatively, each of these functional blocks may perform computation with use of a DSP (Digital Signal Processor) or a CPU (Central Processing Unit). Further, these processing steps can be processed by recording these processing steps in a recording medium as a program, and by executing the program Summary of Embodiments (1) A content control device according to an aspect of the invention is a content control device connected to a terminal device via a network. The content control device is provided with a receiving content accumulation unit which accumulates contents received from the terminal device; an operation history information managing unit which manages operation history information indicative of a history on user input operations with respect to a first content accumulated in the receiving content accumulation unit through an operation input device and the terminal device connected via the network; a control information generating unit which generates control information for controlling a second content based on the operation history information, the second content being a content corresponding to the first content and accumulated in the terminal device; and a content control unit which transmits the generated control information to the terminal device.

According to the above configuration, control information for controlling the second content corresponding to the first content is generated, based on the operation history information indicative of a history on user input operations with respect to the first content accumulated in the content control device for sharing a content between the users through the terminal device and the operation input device. There is a tendency that a content of high interest between the users has a large number of user operations. In view of the above, generating the control information based on the operation history information for controlling the second content is advantageous in specifying a second content of high interest between the users, out the second contents accumulated in the terminal device.

(2) The control information may include an instruction indicative of causing a display unit to display the second content in association with predetermined information.

According to the above configuration, it is possible to display the second contents as a list with the predetermined information attached to the second contents. As a result of the above control, the owner user of the terminal device can easily specify a second content of high interest between the users, out of the second contents displayed as a list.

(3) The predetermined information may be the operation history information with respect to the first content.

According to the above configuration, it is possible to display the second contents as a list with the operation history information attached to the second contents. As a result of the above control, the owner user of the terminal device can easily specify a second content of high interest between the users, out of the second contents displayed as a list.

(4) The control information generating unit may calculate an evaluation value indicative of a degree of user interest in the first content based on the operation history information, and may generate the control information based on the calculated evaluation value.

According to the above configuration, it is possible to express the degree of user interest in the first content shared between the content control devices by the evaluation value.

(5) The control information generating unit may generate control information indicative of deleting the second content, in the case where the evaluation value is lower than a predetermined threshold value.

According to the above configuration, it is possible to delete, from the terminal device, the second content, corresponding to the first content, which is less frequently operated by the user and whose evaluation value is calculated to be low.

(6) The control information generating unit may generate control information indicative of protecting the second content from deletion, in the case where the evaluation value is higher than a predetermined threshold value.

According to the above configuration, it is possible to prevent deletion, from the terminal device, of the second content, corresponding to the first content, which is more frequently operated by the user and whose evaluation value is calculated to be high.

(7) The terminal device may compress or delete the content after transmitting the content to the content control device, and the control information generating unit may generate control information indicative of causing the terminal device to acquire, from the content control device, the second content corresponding to the first content and whose evaluation value is higher than a predetermined threshold value.

According to the above configuration, even in the case where the system is configured to delete from the terminal device a content transmitted to the content control device or to compress a content transmitted to the content control device for securing the capacity, the terminal device can acquire the second content corresponding to the first content and of high interest between the users. Accordingly, it is possible to accumulate in the terminal device only the contents of high interest between the users, whereby the capacity of the memory resource in the terminal device is secured. Further, the terminal device acquires the second content from the content control device after receiving the control information. Accordingly, it is possible to reduce the data amount in transmitting the control information from the content control device. This is advantageous in promptly transmitting the control information to the terminal device.

(8) The terminal device may compress or delete the content after transmitting the content to the content control device, the control information generating unit may generate control information indicative of causing the terminal device to accumulate the second content corresponding to the first content and whose evaluation value is higher than a predetermined threshold value, and the content control unit may transmit to the terminal device the control information in association with the second content.

According to the above configuration, even in the case where the system is configured to delete from the terminal device a content transmitted to the content control device or to compress a content transmitted to the content control device for securing the capacity, the terminal device can acquire the second content corresponding to the first content and of high interest between the users. Accordingly, it is possible to accumulate in the terminal device only the contents of high interest between the users, whereby the capacity of the memory resource in the terminal device is secured. Further, since the second content is transmitted together with the control information, it is possible to reduce the number of processing steps in accumulating the second content in the terminal device.

(9) The content control unit may transmit to the terminal device the first content in association with the control information.

According to the above configuration, the first content itself is accumulated in the terminal device.

(10) The content control unit may process the first content, and transmit to the terminal device the processed content in association with the control information.

According to the above configuration, the processed first content is accumulated in the terminal device. An example of the processing is compressing the first content in such a manner as to coincide with the remaining capacity or the screen resolution of the terminal device.

(11) The content control device may be further provided with a terminal device information acquisition managing unit which acquires terminal device information relating to a performance or a state of the terminal device, wherein the control information generating unit generates the control information, based on the operation history information and the terminal device information.

According to the above configuration, it is possible to control the second content, taking into consideration of the performance or the state of the terminal device, in addition to the evaluation value.

(12) The terminal device information may include a remaining capacity storable of the second content by the terminal device, and the control information generating unit may calculate an evaluation value indicative of a degree of user interest in the first content based on the operation history information, generate control information indicative of deleting the second content corresponding to the first content and whose evaluation value is lower than a predetermined reference evaluation value, and set the reference evaluation value to be high, as the remaining capacity decreases.

According to the above configuration, in the case where the remaining capacity is high, it is possible to accumulate a large number of second contents in the terminal device; and in the case where the remaining capacity is low, it is possible to reduce the number of second contents to be accumulated in the terminal device. As a result of the above control, it is possible to appropriately consume the memory resource in the terminal device.

(13) The operation history information may include at least one of agreement information with respect to the first content, comment information with respect to the first content, the number of times of browsing operations of the first content, and the number of times of download operations of the first content.

According to the above configuration, the control information is generated with use of at least one of the agreement information with respect to the first content, the comment information with respect to the first content, the number of times of browsing operations of the first content, and the number of times of download operations of the first content. Thus, it is possible to control the second content, taking into consideration of these information.

(14) The control information generating unit may calculate at least one of a sum of the numbers of inputs of the agreement information, a sum of the numbers of pieces of the comment information, a sum of the numbers of times of the browsing operations, and a sum of the numbers of times of the download operations during a predetermined evaluation period, calculate an evaluation value indicative of a degree of user interest in the first content based on the calculated sum, and generate the control information based on the calculated evaluation value.

According to the above configuration, the evaluation value is calculated with use of at least one of the sum of the numbers of inputs of the agreement information, the sum of the numbers of pieces of the comment information, the sum of the numbers of times of the browsing operations, and the sum of the numbers of times of the download operations. Thus, it is possible to calculate the evaluation value of the first content to be high, as the first content has a larger number of times of inputs of these information.

(15) A content control device according to another aspect of the invention is a content control device connected to a terminal device and to a content managing device via a network. The content control device is provided with an operation history information acquiring unit which acquires operation history information indicative of a history on operations with respect to a first content transmitted from the terminal device and accumulated in the content managing device through an operation input device and the terminal device connected via the network; and a content control unit which generates control information for controlling a second content, based on the operation history information, the second content being a content corresponding to the first content and accumulated in the terminal device.

According to the above configuration, even in the case where the system is configured to accumulate the first content in the content managing unit, in place of in the content control device, the effects substantially the same as (1) can be obtained.

(16) A terminal device according to yet another aspect of the invention is a terminal device for accumulating contents. The terminal device is provided with a terminal content control unit which controls a second content, based on operation history information indicative of a history on user input operations with respect to a first content transmitted from the terminal device and accumulated in a server device connected via a network through an operation input device and the terminal device connected via the network, the second content being a content corresponding to the first content and accumulated in the terminal device.

According to the above configuration, it is possible to provide a terminal device which controls the second content corresponding to the first content, based on the operation history information with respect to the first content shared between the server devices.

(17) The terminal device may be further provided with an operation history information acquiring unit which acquires the operation history information from the server device, wherein the terminal content control unit generates control information for controlling the second content, based on operation history information acquired by the operation history information acquiring unit.

According to the above configuration, it is possible to configure the terminal device such that the control information is generated after the operation history information is acquired.

(18) The terminal content control unit may receive control information for controlling the second content generated in the server device based on the operation history information, and control the second content based on the control information.

According to the above configuration, it is possible to configure the terminal device such that the terminal device controls the second content after receiving the control information generated in the server device.

INDUSTRIAL APPLICABILITY

The content control device of the invention is advantageously applied to a video recorder, a home server, a digital still camera, a digital video camera, a personal computer, an enterprise-oriented computer (workstation), a digital TV receiver loaded with a function of retrieving image content, a settop box, a car navigation system, a projector, a mobile terminal, a music component system, a digital photo frame, and a remote controller terminal for device control.

The invention claimed is:

1. A content control device connected to a terminal device via a network, comprising:
   a non-transitory memory storing a program; and
   a hardware processor that executes the program and causes the content control device to operate as:
   a receiving content accumulation unit which accumulates contents received from the terminal device;

an operation history information managing unit which manages operation history information indicative of a history on user input operations with respect to a first content accumulated in the receiving content accumulation unit through an operation input device and the terminal device connected via the network;

a control information generating unit which generates control information for controlling a second content based on the operation history information, the second content being a content corresponding to the first content and accumulated in the terminal device; and a content control unit which transmits the generated control information to the terminal device, wherein the control information generating unit calculates an evaluation value indicative of a degree of user interest in the first content based on the operation history information, and generates the control information indicative of protecting the second content from deletion, in the case where the evaluation is higher than a predetermined threshold value.

2. The content control device according to claim 1, wherein the control information generating unit generates control information indicative of deleting the second content, in the case where the evaluation value is lower than a predetermined threshold value.

3. The content control device according to claim 1, further comprising:

a terminal device information acquisition managing unit which acquires terminal device information relating to a performance or a state of the terminal device, wherein the control information generating unit generates the control information, based on the operation history information and the terminal device information.

4. The content control device according to claim 3, wherein the terminal device information includes a remaining capacity storable of the second content by the terminal device, and the control information generating unit calculates an evaluation value indicative of a degree of user interest in the first content based on the operation history information, generates control information indicative of deleting the second content corresponding to the first content and whose evaluation value is lower than a predetermined reference evaluation value, and sets the reference evaluation value to be high, as the remaining capacity decreases.

5. A content control device connected to a terminal device via a network, comprising:

a non-transitory memory storing a program; and a hardware processor that executes the program and causes the content control device to operate as:

a receiving content accumulation unit which accumulates contents received from the terminal device;

an operation history information managing unit which manages operation history information indicative of a history on user input operations with respect to a first content accumulated in the receiving content accumulation unit through an operation input device and the terminal device connected via the network;

a control information generating unit which generates control information for controlling a second content based on the operation history information, the second content being a content corresponding to the first content and accumulated in the terminal device; and a content control unit which transmits the generated control information to the terminal device, wherein the control information generating unit calculates an evaluation value indicative of a degree of user interest in the first content based on the operation history information, and generates the control information based on the calculated evaluation value wherein the terminal device compresses or deletes the content after transmitting the content to the content control device, and the control information generating unit generates control information indicative of causing the terminal device to acquire, from the content control device, the second content corresponding to the first content and whose evaluation value is higher than a predetermined threshold value.

6. A content control device connected to a terminal device via a network, comprising:

a non-transitory memory storing a program; and a hardware processor that executes the program and causes the content control device to operate as:

a receiving content accumulation unit which accumulates contents received from the terminal device;

an operation history information managing unit which manages operation history information indicative of a history on user input operations with respect to a first content accumulated in the receiving content accumulation unit through an operation input device and the terminal device connected via the network;

a control information generating unit which generates control information for controlling a second content based on the operation history information, the second content being a content corresponding to the first content and accumulated in the terminal device; and a content control unit which transmits the generated control information to the terminal device, wherein the control information generating unit calculates an evaluation value indicative of a degree of user interest in the first content based on the operation history information, and generates the control information based on the calculated evaluation value, the terminal device compresses or deletes the content after transmitting the content to the content control device, the control information generating unit generates control information indicative of causing the terminal device to accumulate the second content corresponding to the first content and whose evaluation value is higher than a predetermined threshold value, and the content control unit transmits to the terminal device the control information in association with the second content.

7. The content control device according to claim 6, wherein the content control unit transmits to the terminal device the first content in association with the control information.

8. The content control device according to claim 6, wherein the content control unit processes the first content, and transmits to the terminal device the processed content in association with the control information.

9. A content control device connected to a terminal device utilized by a first user via a network, comprising:

a non-transitory memory storing a program; and a hardware processor that executes the program and causes the content control device to operate as:

a receiving content accumulation unit which accumulates contents received from the terminal device;

an operation history information managing unit which manages operation history information indicative of a history on input operations by a second user different from the first user with respect to a first content shared via a Social Networking Service and accumulated in the receiving content accumulation unit through an operation input device connected via he network;

a control information generating unit which generates control information for controlling a second content based on the operation history information, the second content being a content corresponding to the first content and accumulated in the terminal device; and a content control unit which transmits the generated control information to the terminal device, wherein the operation history information includes at least one of agreement information with respect to the first content, comment information with respect to the first content, the number of times of browsing operations of the first content, and the number of times of download operations of the first content, and the control information generating unit calculates at least one of a sum of the numbers of inputs of the agreement information, a sum of the numbers of pieces of the comment information, a sum of the numbers of times of the browsing operations, and a sum of the numbers of times of the download operations during a predetermined evaluation period, calculates an evaluation value indicative of a degree of user interest in the first content based on the calculated sum, and generates the control information based on the calculated evaluation value.

10. A content control device connected to a terminal device and to a content managing device via a network, comprising:

a non-transitory memory storing a program; and a hardware processor that executes the program and causes the content control device to operate as:

an operation history information acquiring unit which acquires operation history information indicative of a history on operations with respect to a first content transmitted from the terminal device and accumulated in the content managing device through an operation input device and the terminal device connected via the network;

a control information generating unit which generates control information for controlling a second content based on the operation history information, the second content being a content corresponding to the first content and accumulated in the terminal device; and a content control unit which transmits the generated control information to the terminal device, wherein the control information generating unit calculates an evaluation value indicative of a degree of user interest in the first content based on the operation history information, and generates the control information indicative of protecting the second content from deletion, in the case where the evaluation is higher than a predetermined threshold value.

11. A terminal device for accumulating contents, comprising:

a non-transitory memory storing a program; and a hardware processor that executes the program and causes the terminal device to operate as:

an operation history information acquiring unit which acquires, from a server, operation history information indicative of a history on user input operations with respect to a first content transmitted from the terminal device and accumulated in the server device connected via a network through an operation input device and the terminal device connected via the network; and a terminal content control unit which generates control information for controlling a second content being a content corresponding to the first content and accumulated in the terminal device, based on the operation history information, wherein the terminal content control unit calculates an evaluation value indicative of a degree of user interest in the first content based on the operation history information, and generates the control information indicative of protecting the second content from deletion, in the case where the evaluation is higher than a predetermined threshold value.

12. A terminal device connected to a server device via a network, wherein the server device includes:

a non-transitory memory storing a program; and a hardware processor that executes the program and causes the server device to operate as:

a receiving content accumulation unit which accumulates contents received from the terminal device;

an operation history information managing unit which manages operation history information indicative of a history on user input operations with respect to a first content accumulated in the receiving content accumulation unit through an operation input device and the terminal device connected via the network;

a control information generating unit which generates control information for controlling a second content based on the operation history information, the second content being a content corresponding to the first content and accumulated in the terminal device; and a content control unit which transmits the generated control information to the terminal device, the control information generating unit calculating an evaluation value indicative of a degree of user interest in the first content based on the operation history information, and generating the control information indicative of protecting the second content from deletion, in the case where the evaluation is higher than a predetermined threshold value, and the terminal device includes:

a non-transitory memory storing a program; and a hardware processor that executes the program and causes the terminal device to operate as:

a terminal content control unit receives control information for controlling the second content generated in the server, and controls the second content based on the control information.

13. A content control method to be performed by a content control device connected to a terminal device via a network, comprising:

a receiving content accumulating step of accumulating contents received from the terminal device;

an operation history information managing step of managing operation history information indicative of a history on user input operations with respect to a first content accumulated in the receiving content accumulating step through an operation input device and the terminal device connected via the network; and a content controlling step of generating control information for controlling a second content based on the operation history information, the second content being a content corresponding to the first content and accumulated in the terminal device, wherein in the control information generating step, an evaluation value indicative of a degree of user interest in the first content is calculated based on the operation history information, and control information indicative of protecting the second content from deletion is generated, in the case where the evaluation value is higher than a predetermined threshold value.

14. A non-transitory computer-readable recording medium which stores a content control program which causes a computer to execute the content control method, comprising:

accumulating contents received from the terminal device;

managing operation history information indicative of a history on user input operations with respect to a first content accumulated through an operation input device and the terminal device connected via the network; and generating control information for controlling a second content based on the operation history information, the second content being a content corresponding to the first content and accumulated in the terminal device, wherein an evaluation value indicative of a degree of user interest in the first content is calculated based on the operation history information, and control information indicative of protecting the second content from deletion is generated, in the case where the evaluation value is higher than a predetermined threshold value.

* * * * *